US009536305B2

(12) United States Patent
Giger et al.

(10) Patent No.: US 9,536,305 B2
(45) Date of Patent: Jan. 3, 2017

(54) METHOD, SYSTEM, SOFTWARE AND MEDIUM FOR ADVANCED INTELLIGENT IMAGE ANALYSIS AND DISPLAY OF MEDICAL IMAGES AND INFORMATION

(71) Applicants: Maryellen L. Giger, Elmhurst, IL (US); Robert Tomek, Chicago, IL (US); Jeremy Bancroft Brown, Chicago, IL (US); Andrew Robert Jamieson, Chicago, IL (US); Li Lan, Hinsdale, IL (US); Michael R. Chinander, Chicago, IL (US); Karen Drukker, Crete, IL (US); Hui Li, Naperville, IL (US); Neha Bhooshan, Potomac, MD (US); Gillian Newstead, Chicago, IL (US)

(72) Inventors: Maryellen L. Giger, Elmhurst, IL (US); Robert Tomek, Chicago, IL (US); Jeremy Bancroft Brown, Chicago, IL (US); Andrew Robert Jamieson, Chicago, IL (US); Li Lan, Hinsdale, IL (US); Michael R. Chinander, Chicago, IL (US); Karen Drukker, Crete, IL (US); Hui Li, Naperville, IL (US); Neha Bhooshan, Potomac, MD (US); Gillian Newstead, Chicago, IL (US)

(73) Assignee: QUANTITATIVE INSIGHTS, INC., Chicago, IL (US)

( * ) Notice: Subject to any disclaimer, the term of this patent is extended or adjusted under 35 U.S.C. 154(b) by 0 days.

(21) Appl. No.: 14/887,678

(22) Filed: Oct. 20, 2015

(65) Prior Publication Data
US 2016/0078624 A1    Mar. 17, 2016

Related U.S. Application Data

(62) Division of application No. 13/305,495, filed on Nov. 28, 2011, now Pat. No. 9,208,556.
(Continued)

(51) Int. Cl.
G06T 7/00 (2006.01)
G06T 11/00 (2006.01)
(Continued)

(52) U.S. Cl.
CPC .......... G06T 7/0016 (2013.01); G06K 9/6253 (2013.01); G06T 7/0012 (2013.01); G06T 7/0079 (2013.01);
(Continued)

(58) Field of Classification Search
CPC .... G06T 7/0012; G06T 7/0079; G06T 7/0081; G06T 11/003; G06T 15/08; G06T 15/20; G06T 17/00; G06T 19/00; G06T 19/20; G06T 2207/10076; G06T 2207/10084; G06T 2207/10136; G06T 2207/20141; G06T 2207/30004; G06T 7/0016; G06T 7/0091; G06T 7/40; G06T 7/602; G06T 2207/10088; G06T 2207/10116; G06T 2207/20081; G06T 2207/30068; G06K 9/6253
See application file for complete search history.

(56) References Cited

U.S. PATENT DOCUMENTS 5,657,362 A   8/1997 Giger et al.
5,768,333 A   6/1998 Abdel-Mottaleb
(Continued)

OTHER PUBLICATIONS

Kupinski MA, Giger ML, "Automated seeded lesion segmentation on digital mammograms," IEEE Trans on Medical Imaging, 17: 510-517, 1998.
(Continued)

Primary Examiner — Manav Seth
(74) Attorney, Agent, or Firm — Oblon, McClelland, Maier & Neustadt, L.L.P.

(57) ABSTRACT

Computerized interpretation of medical images for quantitative analysis of multi-modality breast images including
(Continued)

analysis of FFDM, 2D/3D ultrasound, MRI, or other breast imaging methods. Real-time characterization of tumors and background tissue, and calculation of image-based biomarkers is provided for breast cancer detection, diagnosis, prognosis, risk assessment, and therapy response. Analysis includes lesion segmentation, and extraction of relevant characteristics (textural/morphological/kinetic features) from lesion-based or voxel-based analyses. Combinations of characteristics in several classification tasks using artificial intelligence is provided. Output in terms of 1D, 2D or 3D distributions in which an unknown case is identified relative to calculations on known or unlabeled cases, which can go through a dimension-reduction technique. Output to 3D shows relationships of the unknown case to a cloud of known or unlabeled cases, in which the cloud demonstrates the structure of the population of patients with and without the disease.

14 Claims, 49 Drawing Sheets
(37 of 49 Drawing Sheet(s) Filed in Color)

Related U.S. Application Data

(60) Provisional application No. 61/344,951, filed on Nov. 26, 2010.

(51) Int. Cl.
| | |
|---|---|
| *G06T 15/08* | (2011.01) |
| *G06T 15/20* | (2011.01) |
| *G06T 17/00* | (2006.01) |
| *G06T 19/20* | (2011.01) |
| *G06K 9/62* | (2006.01) |
| *G06T 7/60* | (2006.01) |
| *G06T 7/40* | (2006.01) |

(52) U.S. Cl.
CPC .............. *G06T 7/0091* (2013.01); *G06T 7/40* (2013.01); *G06T 7/602* (2013.01); *G06T 11/003* (2013.01); *G06T 15/08* (2013.01); *G06T 15/20* (2013.01); *G06T 17/00* (2013.01); *G06T 19/20* (2013.01); *G06T 2207/10076* (2013.01); *G06T 2207/10084* (2013.01); *G06T 2207/10088* (2013.01); *G06T 2207/10116* (2013.01); *G06T 2207/10136* (2013.01); *G06T 2207/20081* (2013.01); *G06T 2207/20141* (2013.01); *G06T 2207/30004* (2013.01); *G06T 2207/30068* (2013.01)

(56) References Cited

U.S. PATENT DOCUMENTS

| | | | |
|---|---|---|---|
| 5,836,872 A | 11/1998 | Kenet et al. | |
| 6,901,156 B2 | 5/2005 | Giger et al. | |
| 7,155,043 B2 | 12/2006 | Daw | |
| 7,176,466 B2* | 2/2007 | Rousso | ............... G01T 1/161 |
| | | | 250/363.02 |
| 7,184,582 B2 | 2/2007 | Giger et al. | |
| 7,231,074 B2 | 6/2007 | Raunig | |
| 7,298,883 B2 | 11/2007 | Giger et al. | |
| 7,333,648 B2 | 2/2008 | Edic et al. | |
| 7,466,848 B2 | 12/2008 | Metaxas et al. | |
| 7,598,088 B2* | 10/2009 | Balas | ................ A61B 1/303 |
| | | | 436/164 |
| 7,599,542 B2* | 10/2009 | Brockway | ............ G06T 7/0012 |
| | | | 382/128 |
| 7,646,902 B2 | 1/2010 | Chan et al. | |
| 7,689,016 B2 | 3/2010 | Stoecker et al. | |
| 7,756,317 B2* | 7/2010 | Huo | ................ G06T 7/0012 |
| | | | 382/128 |
| 7,761,240 B2 | 7/2010 | Saidi et al. | |
| 7,773,791 B2 | 8/2010 | Simon et al. | |
| 7,983,732 B2* | 7/2011 | Chen | ................ G06T 7/0012 |
| | | | 382/128 |
| 8,295,575 B2* | 10/2012 | Feldman | ............. G06K 9/6252 |
| | | | 382/131 |
| 9,235,887 B2* | 1/2016 | Buckler | ............... G06T 7/0012 |
| 2004/0190763 A1 | 9/2004 | Giger et al. | |

OTHER PUBLICATIONS

Yuan Y, Giger ML, Li H, Suzuki K, Sennett C, "A dual-stage method for lesion segmentation on digital mammograms," Medical Physics 34: 4180-4193, 2007.

Chen W, Giger ML, Bick U, "A fuzzy c-means (FCM) based approach for computerized segmentation of breast lesions in dynamic contrast-enhanced MR images," Academic Radiology 13: 63-72, 2006.

Chen W, Giger ML, Bick U, Newstead G, "Automatic identification and classification of characteristic kinetic curves of breast lesions on DCE-MRI," Medical Physics, 33: 2878-2887, 2006.

Rose, C.J. Mills, S., et al., "Quantifying spatial heterogeneity in Dynamic Contrast-Enhanced MRI Parameter Maps," Magn. Reson. Med 65, 488-499 (2009).

Kupinski, MA, Giger, ML "Feature selection with limited datasets." Med. Phys. 26, 2176-2182, 1999.

Jamieson A, Giger ML, Drukker K, Li H, Yuan Y, Bhooshan N, "Exploring non-linear feature space dimension reduction and data representation in breast CADx with Laplacian eigenmaps and t-SNE," Medical Physics, 37: 339-351, 2010.

Jamieson AR, Giger ML, Drukker K, Pesce L, "Enhancement of breast CADx with unlabeled data," Medical Physics, 37: 4155-4172, 2010.

* cited by examiner

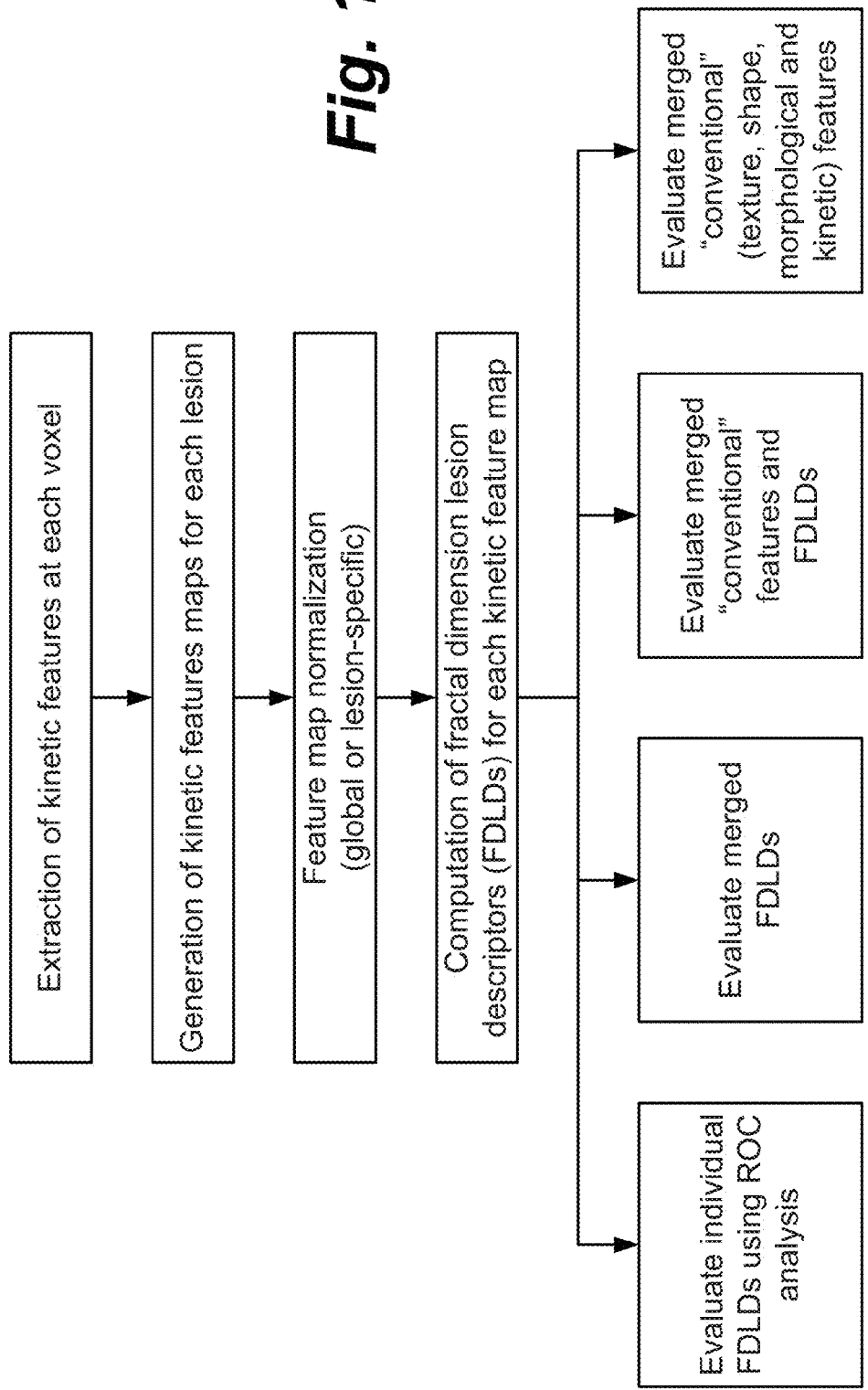

$$F_1 = \frac{\max(S(t)) - S(0)}{S(0)}$$

$$F_2 = t_* \text{ such that } S(t_*) = \max(S(t))$$

$$F_3 = \frac{F_1}{F_2}$$

$$F_4 = \begin{cases} \frac{S(t_*) - S(5)}{S(0)(5 - t_*)}, & t_* < 5 \\ 0, & \text{otherwise} \end{cases}$$

$$F_5 = \frac{S(5) - S(1)}{S(1) - S(0)}$$

$$F_6 = AUC_\tau = A\left(\frac{1 - e^{-\beta\tau}}{\beta} + \frac{e^{-(\alpha+\beta)\tau} - 1}{\alpha+\beta}\right)$$

$$F_7 = \left.\frac{dS}{dt}\right|_{t=0^+} = A\alpha$$

$$F_8 = t_{\text{peak}} = \begin{cases} \frac{1}{\alpha}\ln\left(1 + \frac{\alpha}{\beta}\right), & \beta > 0 \\ 5, & \text{otherwise} \end{cases}$$

$$F_9 = SER = \left(\frac{1 - e^{-\alpha t_1}}{1 - e^{-\alpha t_L}}\right)e^{(t_L - t_1)\beta}$$

$$F_{10} = \kappa_{\text{peak}} = -A\alpha\beta$$

$$F_{11} = A$$

$$F_{12} = \alpha$$

$$F_{13} = \beta$$

*Fig. 12*

$$H_\alpha^{(b)}(X) = \frac{1}{1-\alpha} \log_b \left[ \sum_{i=1}^n p(x_i)^\alpha \right]$$

$$d_\alpha^{(b)} = \lim_{s \to 0} \frac{H_\alpha^{(b)}}{\ln[\frac{1}{s}]}$$

Fig. 14

$$d_1 = \lim_{s \to 0} \frac{\sum_{i=1}^n p(x_i) \ln[p(x_i)]}{\ln[s]}$$

$$d_2 = \lim_{s \to 0} \frac{\ln\left[\sum_{i=1}^n p(x_i)^2\right]}{\ln[s]}$$

Fig. 15

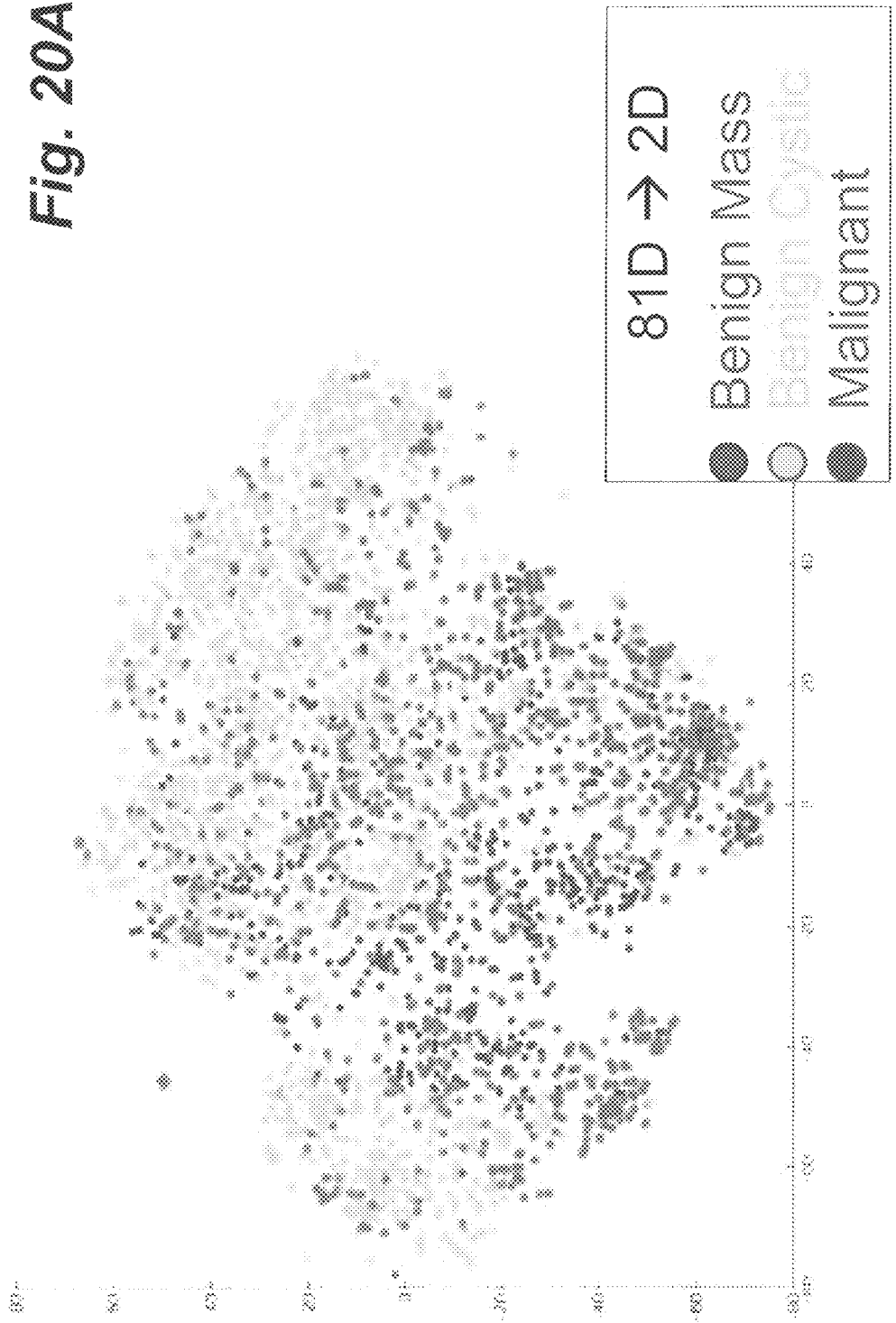

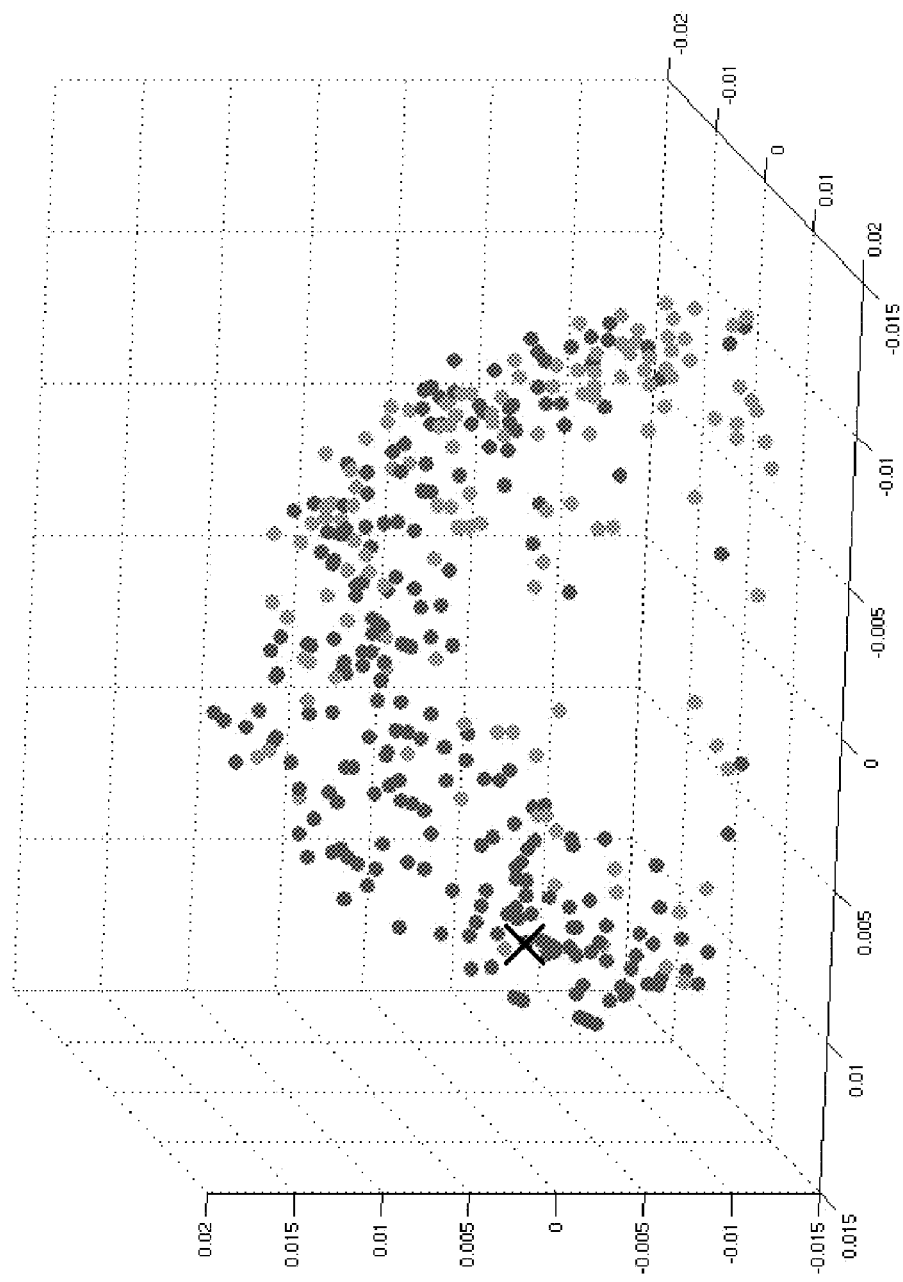

METHOD, SYSTEM, SOFTWARE AND MEDIUM FOR ADVANCED INTELLIGENT IMAGE ANALYSIS AND DISPLAY OF MEDICAL IMAGES AND INFORMATION

CROSS-REFERENCE TO RELATED APPLICATIONS

This application is a division of and claims the benefit of priority under 35 U.S.C. §120 from U.S. Ser. No. 13/305,495 filed Nov. 28, 2011, and claims the benefit of priority of U.S. Provisional Application No. 61/344,951 filed Nov. 26, 2010, the entire contents of each of which is incorporated herein.

BACKGROUND

Field of Disclosure

This disclosure relates generally to the fields of computer-aided diagnosis, quantitative image analysis, and image display workstations. Such systems can output a feature value (e.g., characteristic; image-based phenotype) or an estimate of a lesion's probability of disease state (PM) (which can be a probability of malignancy, cancer subtypes, risk, prognostic state, and/or response to treatment), usually determined by training a classifier on datasets.

Discussion of the Background

Breast cancer is a leading cause of death in women, causing an estimated 46,000 deaths per year. Mammography is an effective method for the early detection of breast cancer, and it has been shown that periodic screening of asymptomatic women does reduce mortality. Many breast cancers are detected and referred for surgical biopsy on the basis of a radiographically detected mass lesion or a cluster of microcalcifications. Although general rules for the differentiation between benign and malignant mammographically identified breast lesions exist, considerable misclassification of lesions occurs with current methods. On average, less than 30% of masses referred for surgical breast biopsy are actually malignant.

The clinical management and outcome of women with breast cancer vary. Various prognostic indicators can be used in management including patient age, tumor size, number of involved lymph nodes, sites of recurrence, disease free interval, estrogen receptor expression, as well as newer biological markers. It has been shown that in many cases biologic features of the primary tumor can be correlated with outcome, although methods of assessing the biologic features may be invasive, expensive or not widely available. Macroscopic lesion analysis via medical imaging has been quite limited for prognostic indication, predictive models, or patient management, and as a complement to biomarkers.

SUMMARY

The novel development and application of computer vision to this problem is presented here on computer methods to extract information concerning a patient's likely diagnosis, prognosis and expected response to therapy from radiological imaging—morphological and functional serving as aids to, e.g., radiologists, pathologists, and oncologists.

An automatic or interactive method, system, software, and/or medium for a workstation for quantitative analysis of multi-modality breast images to date includes analysis of full-field digital mammography (FFDM), 2D and 3D ultrasound, and MRI. This workstation includes automatic, real-time methods for the characterization of tumors and background tissue, and calculation of image-based biomarkers (image-based phenotypes) for breast cancer diagnosis, prognosis, and response to therapy. The system is fully automated apart from the indication of the location of a potential abnormality by the user—human user or some computer-aided detection device "user." The only input required from the "user" is a click (an indication) on the center of the lesion—in any of the modalities—x-ray, sonography, and/or MRI. The quantitative analysis includes lesion segmentation—in 2D or 3D, depending on the modality, the extraction of relevant lesion characteristics (such as textural, morphological, and/or kinetic features) with which to describe the lesion, and the use of combinations of these characteristics in several classification tasks using artificial intelligence.

The output can be given in terms of a numerical value of the lesion characteristic or probability of disease state, prognosis and/or response to therapy. Similar cases that can be retrieved by feature values, probability of disease state, and/or from the use of dimension-reduction techniques to determine similarity.

Also, the output can be given in terms of 1-D, 2-D, and/or 3-D distributions in which the unknown case is identified relative to calculations on known cases and/or unlabeled cases, which might have gone through a dimension-reduction technique. Output to 3D can show the relationship of the unknown case to a cloud of known and/or unlabeled cases, in which the cloud can demonstrate the structure of the population of patients with and without the disease. This cloud can be rotated freely by the user is they wish to better see the 3D structure of the population dataset and the relationship of the unknown case to the known cases (or even unlabeled cases). Such relationships within this cloud can be used to retrieve "similar" cases based on the dimension reduced pseudo-feature space.

Output can also be calculated and/or displayed in terms lesion-based or voxel-based calculations, and these can include kinetic features, morphological features, and/or both; which can be noted via a color map, which can also be subsequently analyzed. In addition, another option in the display of the numerical and/or graphical output is that the output can be modified relative to the disease prevalence under different clinical scenarios. These classification tasks can include the distinction between (1) malignant and benign lesions (diagnosis), (2) ductal carcinoma in situ lesions from invasive ductal carcinoma lesions (diagnosis, malignancy grades), and (3) malignant lesions with lymph nodes positive for metastasis and those that have remained metastasis-free (prognosis), and/or (4) the description of lesions according to their biomarkers and/or the change between exam dates (response to therapy).

The interactive workstation for quantitative analysis of breast images has the potential to provide radiologists with valuable additional information on which to base a diagnosis and/or assess a patient treatment plan. Ultimately the application can be integrated into the typical interpretation workflow.

The application impacts the area of women's health and specifically that of breast cancer diagnosis and management. The workstation can impact many aspects of patient care, ranging from earlier more accurate diagnosis to better evaluation of the effectiveness of patient treatment plans. Although this application uses breast cancer as an exam, the methods, system, software, and media are applicable to other cancers and diseases.

While many investigators have made great progress in developing methods of computer detection and diagnosis of lesions, human-useful interfaces for communicating the computer output to the user are inadequate. In addition, extensions of the CAD techniques for use in prognosis and response to treatment have not been accomplished.

Accordingly, an object of this disclosure is to provide a method and system that employs either a computer analysis or an intelligent workstation for the computer-assisted interpretation of medical images for use, e.g., in diagnosis, prognosis, risk assessment, and/or assessing response to therapy, as well quantitative image analysis to yield image-based biomarkers (image-based phenotypes).

Objective A

To provide a method of performing lesion-based analysis, voxel-based analysis, and/or both in the assessment of disease state (e.g., cancer, cancer subtypes, prognosis, and/or response to therapy), and a method for the display of such information including kinetic information, morphological information, and/or both that also may utilize varying the disease state prevalence or prognostic state prevalence within the training or clinical case set.

Objective B

To provide a method, after manual, semi-automatic, or automatic segmentation of lesions across single or multiple modalities, to yield (and/or display) tumor characteristics on tumor size, including volume, effective diameter, and surface area, based on various aspects of the tumor, such as presence or absence of a necrotic center or lack of kinetic uptake.

Objective C

To provide a method for the dimension reduction of characteristics (features) of the lesion (tumor) yielding the structure of the lesion types across a population and a visual display of the case in question relative to known cases by use of a cloud, and/or, a method to incorporate unlabeled (unknown) data into the decision making and visualization of the computer output.

Objective D

To provide a method for the dimension reduction of characteristics (features) of the lesion (tumor) yielding a means for conducting similarity searches based on linear and/or nonlinear dimension-reduction techniques to yield similar cases/images for presentation and use.

These and other objects are achieved by providing a new automated method and system that employs an intelligent computer system/workstation for the computer assisted interpretation of medical images as well quantitative image analysis to yield image-based biomarkers (image-based phenotypes).

In particular, according to various aspects of this disclosure, these objectives are achieved by a tangible computer-readable medium storing thereon executable instructions, that when executed by a computer, cause the computer to execute a process for determining a probability of a disease state of a patient, the process includes: obtaining medical data including at least one of a medical image, medical image data, and data representative of a clinical examination of the patient, the medical data including data points for a lesion which are spatially and temporally indexed; reducing the spatially and temporally indexed data points to remove the temporal indexing and to obtain a kinetic curve for each data point; extracting kinetic features of the lesion from each kinetic curve; and displaying the extracted kinetic features.

A corresponding method can also achieve these objectives, the method utilized for determining a probability of a disease state of a patient. The method includes: obtaining medical data including at least one of a medical image, medical image data, and data representative of a clinical examination of the patient, the medical data including data points for a lesion which are spatially and temporally indexed; reducing the spatially and temporally indexed data points to remove the temporal indexing and to obtain a kinetic curve for each data point; extracting kinetic features of the lesion from each kinetic curve; and displaying the extracted kinetic features.

A workstation can also be provided which includes a processor, such as a CPU, which is configured to: obtain medical data including at least one of a medical image, medical image data, and data representative of a clinical examination of the patient, the medical data including data points for a lesion which are spatially and temporally indexed; reduce the spatially and temporally indexed data points to remove the temporal indexing and to obtain a kinetic curve for each data point; extracting kinetic features of the lesion from each kinetic curve; and display the extracted kinetic features on a display screen of the workstation.

In the above aspects, the displaying can include displaying the kinetic features as a color map, where the color map is preferably a washout feature map. Here, calculating is provided by a fractal dimension lesion descriptor to calculate an information dimension and a correlation dimension for the color map. In a further aspect, the information dimension and the correlation dimension for the color map are displayed with other information dimensions and correlation dimensions of other labeled lesions using lesion-specific normalization. Preferably, the correlation dimensions are of fitted time to peak maps.

Also, each data point can be a voxel, and each voxel has one of the kinetic curves. A texture analysis is performed across the voxels, each representing a particular feature from each kinetic curve.

Additionally, morphological features of the lesion can be extracted from the data points, volumetrics of the lesion can be calculated from the morphological features, and the calculated volumetrics can be displayed together with the extracted kinetic features. Here, the data points are voxels which are spatially indexed, the calculating of the volumetrics of the lesion includes segmenting the lesion by identifying the voxels which constitute the lesion, and calculating a volume of the lesion by using volumes of the identified voxels. Also, the calculating of the volumetrics can further include calculating a surface area of the lesion using exterior surfaces of the identified voxels. This "using," in the context of the surface area and the volume, can involve or be a summation process. Also, the calculating the volumetrics of the lesion can include utilizing only those voxels which have most enhancing kinetic curves.

Moreover, extracted kinetic features can be displayed together with an image representing the obtained medical data.

Another aspect of achieving the objectives is achieved by a tangible computer-readable medium storing thereon executable instructions, that when executed by a computer, cause the computer to execute a process for determining a probability of a disease state of a patient. The process includes: obtaining medical data including at least one of a medical image, medical image data, and data representative of a clinical examination of the patient, the medical data including data points as voxels for a lesion which are at least spatially indexed; segmenting the lesion by identifying the voxels which constitute the lesion; and calculating a volume of the lesion by using the volumes of the identified voxels.

Here, the calculating the volume further preferably includes calculating a surface area of the lesion by using exterior surfaces of the identified voxels.

A corresponding method can also achieve these objectives, the method utilized for determining a probability of a disease state of a patient. The method includes: obtaining medical data including at least one of a medical image, medical image data, and data representative of a clinical examination of the patient, the medical data including data points as voxels for a lesion which are at least spatially indexed; segmenting the lesion by identifying the voxels which constitute the lesion; and calculating a volume of the lesion by using the volumes of the identified voxels. Here, the calculating the volume further preferably includes calculating a surface area of the lesion by using exterior surfaces of the identified voxels.

A workstation can also be provided which includes a processor, such as a CPU, which is configured to: obtain medical data including at least one of a medical image, medical image data, and data representative of a clinical examination of the patient, the medical data including data points as voxels for a lesion which are at least spatially indexed; segment the lesion by identifying the voxels which constitute the lesion; and calculate a volume of the lesion by using the volumes of the identified voxels. Here, the calculating of the volume further preferably includes calculating a surface area of the lesion by using exterior surfaces of the identified voxels.

Yet another aspect of achieving the objectives is achieved by a tangible computer-readable medium storing thereon executable instructions, that when executed by a computer, cause the computer to execute a process for determining a probability of a disease state of a patient. The process includes: obtaining medical data including at least one of a medical image, medical image data, and data representative of a clinical examination of the patient; segmenting a lesion indicated in the medical data; extracting features of the lesion based on the segmented lesion; calculating features based on lesion analysis or voxel analyses, the calculated features establishing a high-dimensional feature space for the lesion which is beyond three-dimensions; reducing the high-dimensional feature space to a reduced dimensional space of two or three dimensions; and displaying a data point on the reduced dimensional space which represents the lesion for the patient, together with data points which represent lesions for other patients according to the reduced dimensional space.

A corresponding method can also achieve these objectives, the method utilized for determining a probability of a disease state of a patient. The method includes: obtaining medical data including at least one of a medical image, medical image data, and data representative of a clinical examination of the patient; segmenting a lesion indicated in the medical data; extracting features of the lesion based on the segmented lesion; calculating features based on lesion analysis or voxel analyses, the calculated features establishing a high-dimensional feature space for the lesion which is beyond three-dimensions; reducing the high-dimensional feature space to a reduced dimensional space of two or three dimensions; and displaying a data point on the reduced dimensional space which represents the lesion for the patient, together with data points which represent lesions for other patients according to the reduced dimensional space.

A workstation can also be provided which includes a processor, such as a CPU, which is configured to: obtain medical data including at least one of a medical image, medical image data, and data representative of a clinical examination of the patient; segment a lesion indicated in the medical data; extracting features of the lesion based on the segmented lesion; calculate features based on lesion analysis or voxel analyses, the calculated features establishing a high-dimensional feature space for the lesion which is beyond three-dimensions; reduce the high-dimensional feature space to a reduced dimensional space of two or three dimensions; and display a data point on the reduced dimensional space which represents the lesion for the patient, together with data points which represent lesions for other patients according to the reduced dimensional space.

In the above aspects, the probability of the disease state of the patient can be determined by comparing the location of the data point for the patient with the data points for the other patients, the data points for the other patients identifying a combination disease and non-disease state lesions shown differently in the reduced dimensional space. Preferably, the disease and non-disease state lesions are shown different in the reduced dimensional space by utilizing different colors.

Also, a region can be defined around the data point for the patient about which defines those of the other patients having similar cases to that of the patient, wherein the region is displayed on the reduced dimensional space as a two-dimensional or three-dimensional region depending on whether the reduced dimensional space is two-dimensional or three-dimensional. Additionally, according to a user input, the reduced dimensional space can be rotated about an axis to visually identify relationships and similarities between the patient and the other patients.

Moreover, labeled and unlabeled medical data of the other patients can be obtained, disease and non-disease state lesions in the labeled medical image data and lesions in the unlabeled medical image data can be segmented, and features of the segmented labeled and unlabeled medical image data can be extracted. Dimension reduction on the extracted features from the high-dimensional feature space to the reduced dimensional space can be performed, and a classifier can be trained based on only the labeled medical image data, which is utilized in determining the probability of the disease state of the patient.

BRIEF DESCRIPTION OF THE DRAWINGS

The patent or application file contains at least one drawing executed in color. Copies of this patent or application publication with colors drawings will be provided by the Office upon request and payment of the necessary fee.

A more complete appreciation of this disclosure and many of the attendant advantages thereof will be readily obtained as the same becomes better understood by reference to the following detailed description when considered in connection with the accompanying drawings, wherein:

FIG. 11 illustrates an algorithmic process, by way of a flowchart, for voxel-based and for image-based lesion analysis used in fractal dimension analysis of kinetic feature maps in DCE-MRI in characterizing tumors;

FIG. 12 is a list of equations for converting 4D DCE-MRI image data to 3D image data;

FIG. 14 is a list of equations providing the theory behind using fractal dimension lesion descriptors (FDLDs) to characterize the spatial pattern of lesion enhancement;

FIG. 15 is a list of equations showing implementation of the fractal dimension calculation for breast DCE-MRI lesions to obtain the information dimension and the correlation dimension for each color map image;

FIGS. 20A-B show plots of output after t-SNE dimension reduction on 81 features (an 81 element vector) to 2 pseudo features and to 3 pseudo features, where each data point represents a case, with red being malignant, green being benign masses, and yellow being benign cysts;

FIGS. 21-23 show plots of implementing the dimension reduction on the workstation, where three different rotations of the 3D plot of the dimension reduced feature (pseudo feature) set are shown, red data points correspond to malignant lesions, green data points correspond to benign lesions, and the blue data point corresponds to an unknown case being interpreted;

DETAILED DESCRIPTION

Figure 1:
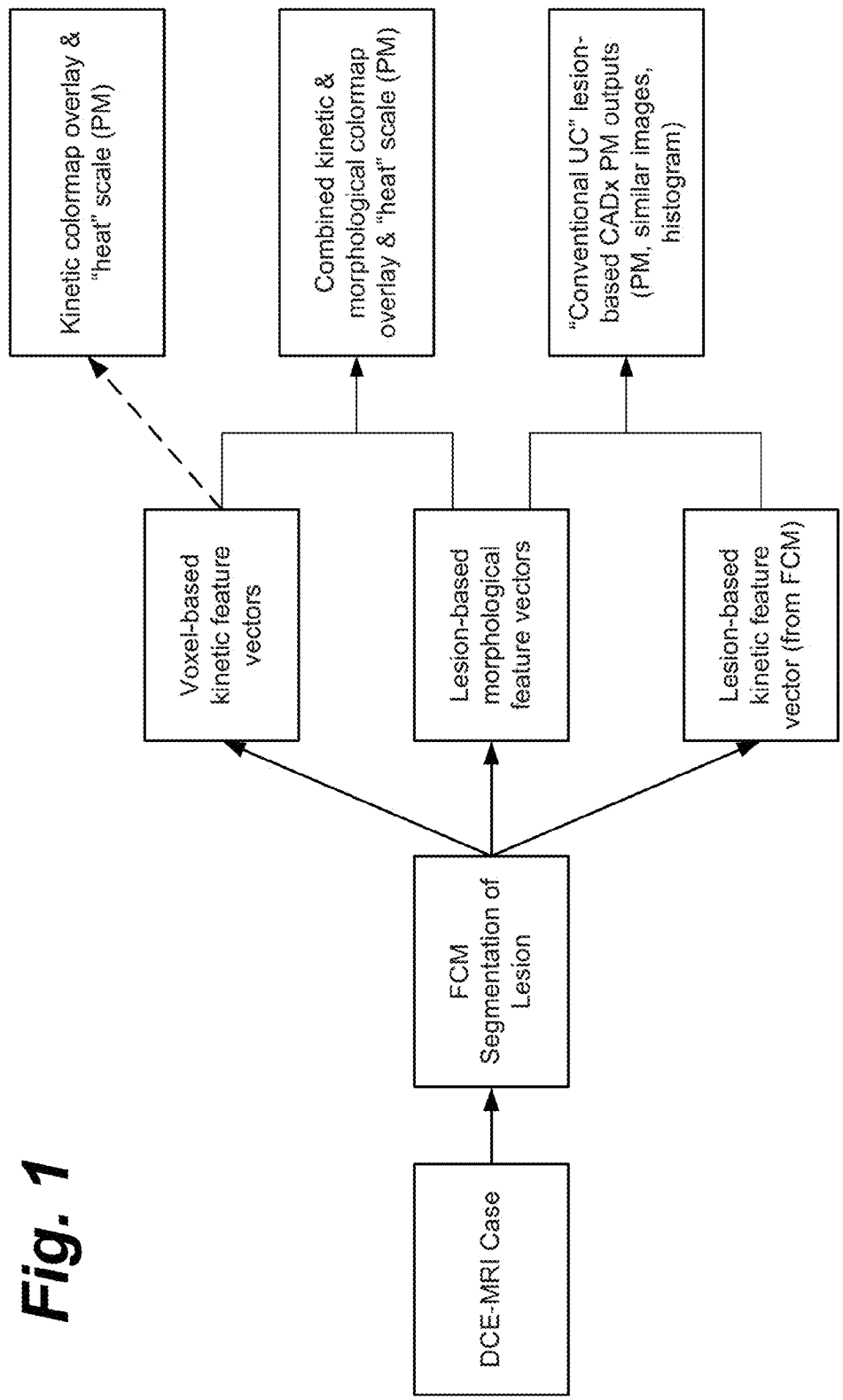
FIG. 1 illustrates an algorithmic process, by way of a flowchart, for incorporating lesion-based and voxel-based analysis into computer interpretation of medical images, illustrating a specific example for a DCE-MRI case.

Embodiments described herein relate to methods and systems for an automatic and/or interactive method, system, software, and/or medium for a workstation for quantitative analysis of multi-modality breast images, which to date includes analysis of full-field digital mammography (FFDM), 2D and 3D ultrasound, and MRI.

According to one embodiment, a method and a system implementing this method determine and/or employ/incorporate lesion-based analysis, voxel-based analysis, and/or both in the assessment of disease state (e.g., cancer, cancer subtypes, prognosis, and/or response to therapy), and a method for the display of such information including kinetic information, morphological information, and/or both that also may utilize varying the disease state prevalence or prognostic state prevalence within the training or clinical case set.

According to another embodiment, a method and a system implementing this method determine and/or employ/incorporate, after manual, semi-automatic, or automatic segmentation of lesions across single or multiple modalities, tumor characteristics on tumor size, including volume, effective diameter, and surface area, based on various aspects of the tumor, such as presence or absence of a necrotic center or lack of kinetic uptake.

According to a further embodiment, a method and a system implementing this method determine and/or employ/ incorporate dimension reduction of characteristics (features) of the lesion (tumor) yielding the structure of the lesion types across a population and a visual display of the case in question relative to known cases by use of a cloud, and/or, a method to incorporate unlabeled (unknown) data into the decision making and visualization of the computer output.

According to yet another embodiment, a method and a system implementing this method determine and/or employ/ incorporate dimension reduction of characteristics (features) of the lesion (tumor) yielding a means for conducting similarity searches based on linear and/or nonlinear dimension-reduction techniques to yield similar cases/images for presentation and use.

In one aspect, the overall method includes an initial acquisition of a set of known medical images that comprise a database, and presentation of the images in digital format. The lesion location in terms of estimated center is input from either a human or computer. The method and system that employs an intelligent workstation for the computer assisted interpretation of medical images includes: access to a database of known medical images with known/confirmed diagnoses of pathological state (e.g., malignant vs. benign, invasiveness of the cancers, presence of positive lymph nodes, tumor grade, response to therapy), computer-extraction of features of lesions within the known database, input method for an unknown case, lesion-based and/or pixel/voxel-based analyses for computer-extraction of features of lesion of the unknown case including aspects of tumor size, morphology, texture, kinetics, calculation of dimension-reduced feature space, and output including, for example, presentation of "similar" cases and/or the computer-estimated features and/or likelihood of pathological state and/or color maps corresponding to the feature analysis overlaid on the lesion and/or could plots showing the unknown lesion relative to known (labeled) and/or unlabeled cases.

Figure 2:
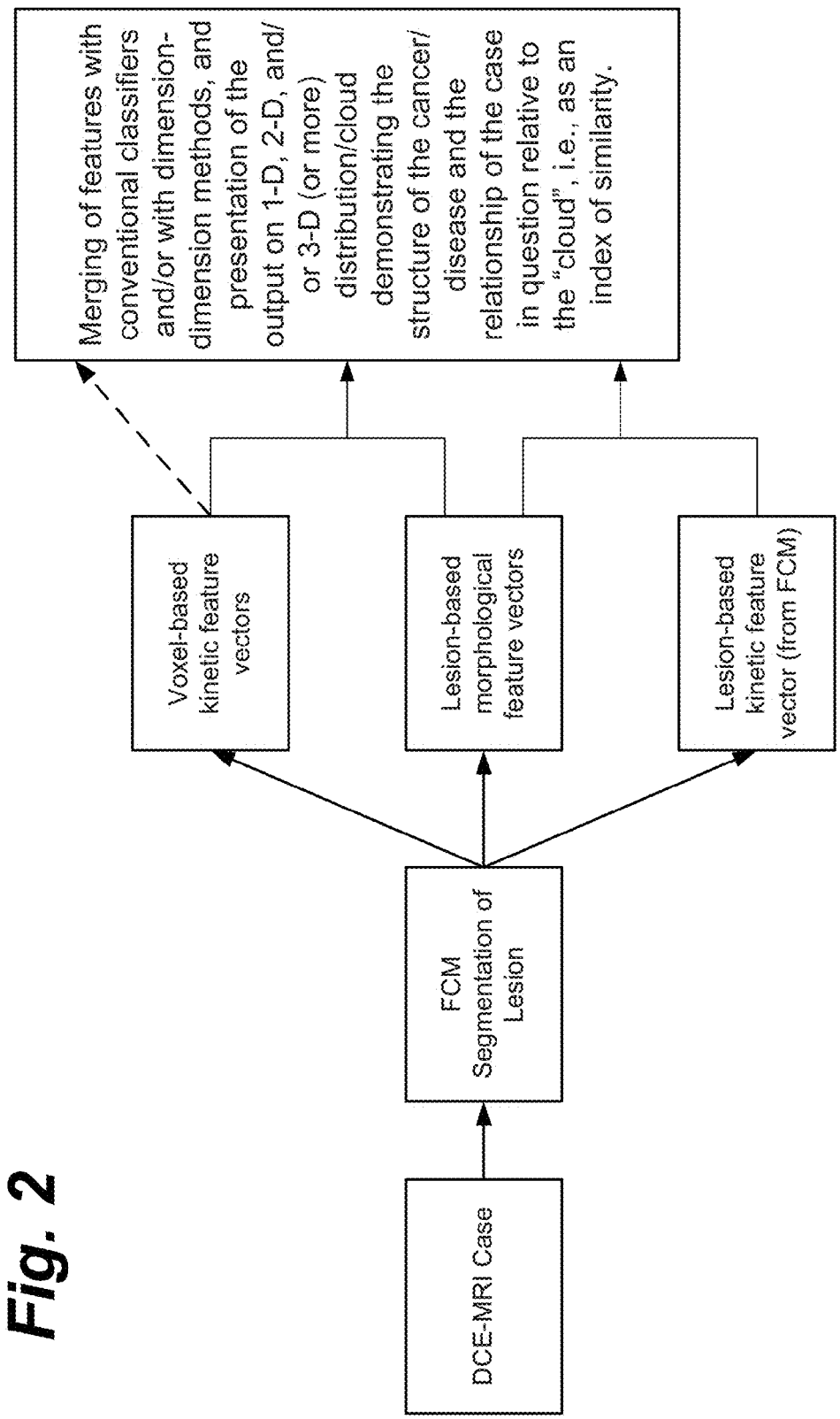
FIG. 2 illustrates an algorithmic process, by way of a flowchart, for incorporating lesion-based and voxel-based analysis into dimension-reduction methods for use in computer interpretation of medical images, illustrating a specific example for a DCE-MRI case.
Figure 3:
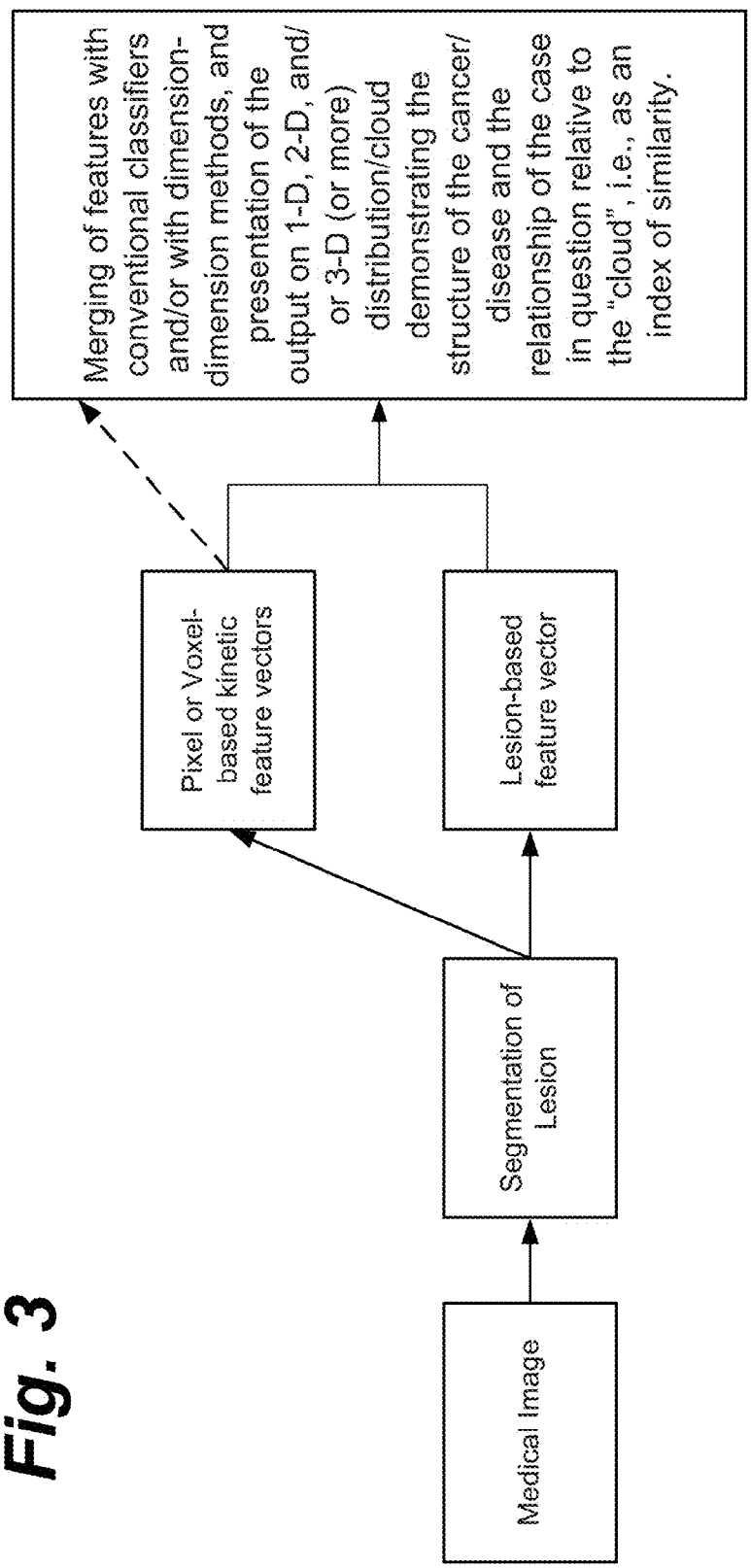
FIG. 3 illustrates an algorithmic process, by way of a flowchart, for incorporating lesion-based and voxel-based analysis into dimension-reduction methods for use in computer interpretation of medical images, illustrating a general case.
Figure 48:
FIG. 48 is a schematic illustration of an exemplary workstation system.
Figure 49:
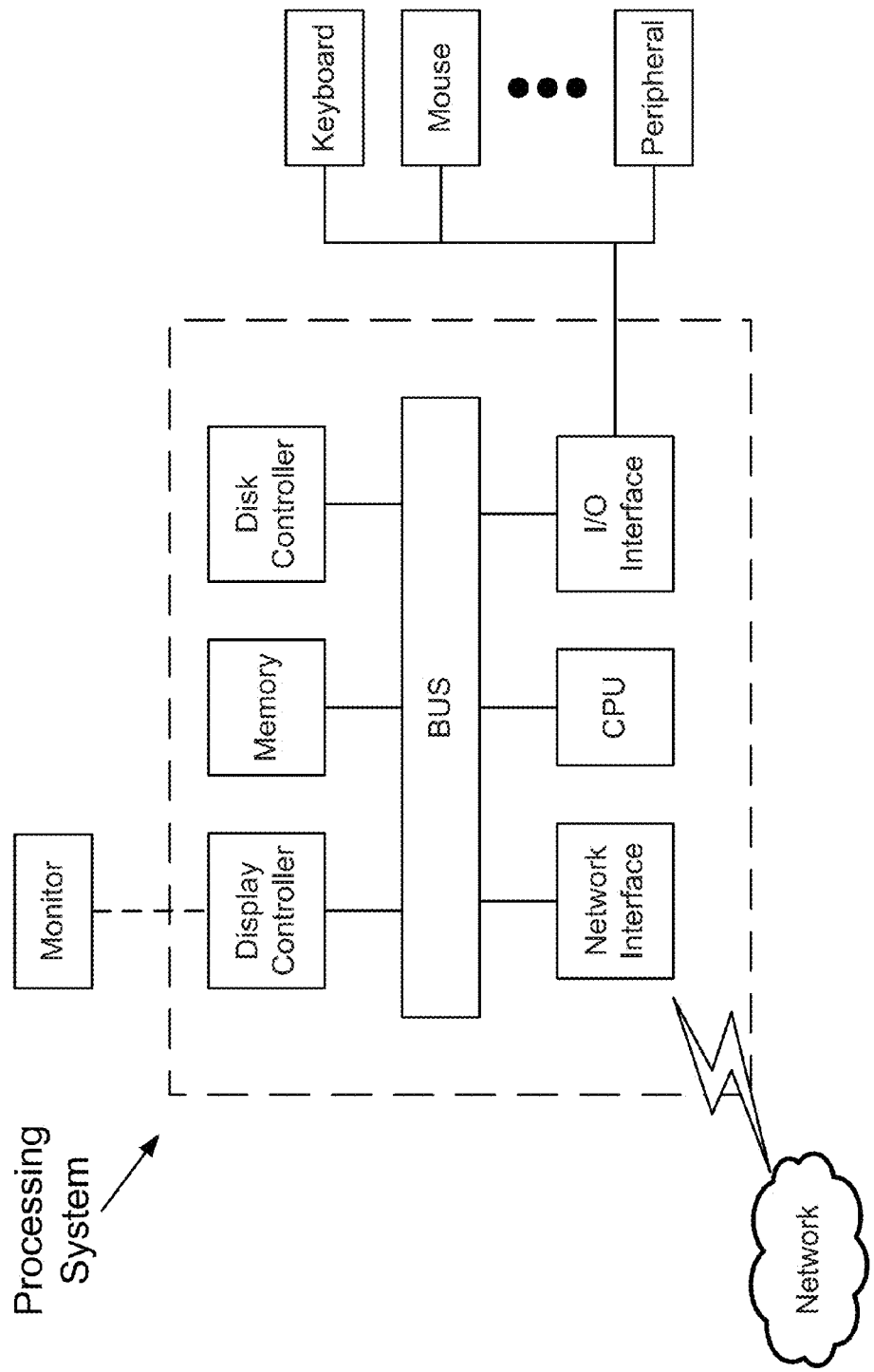
FIG. 49 is a schematic illustration of exemplary hardware of a workstation according to this disclosure.

As schematically summarized in FIGS. 1-3, the workstation includes automatic, real-time methods for the characterization of tumors, and calculation of image-based biomarkers (image-based phenotypes) for breast cancer detection, diagnosis, prognosis, risk assessment, and response to therapy. Hardware for such a workstation is shown in FIGS. 48-49, discussed later in further detail.

In FIG. 1, CADx & QI outputs include PM, similar images, histogram, color map overlays. Also, the PM, histogram and the heat scale can be varies with prevalence chosen. PM refers to a probability of disease state/stage. In FIG. 2, features are merged on a cloud. FIG. 3 relates to a medical image.

A method for automated classification of mass lesions includes: (1) manual, semi-automatic, or automatic segmentation of lesions, (2) feature-extraction including aspects of lesion size, morphology, texture, and kinetics, (3) dimension-reduction of lesion features, (4) classification in terms of disease state, e.g., diagnosis, prognosis, response to therapy, (5) determination and display of similar cases, and (6) display of analyses based on lesion or lesion pixel and/or voxel values.

It is preferable the system is fully automated apart from the indication of the location of a potential abnormality by the user—human user or some computer-aided detection device "user." The only input required from the "user" is a click (an indication) on the center of the lesion—in any of the modalities—x-ray, sonography, and/or MRI. Depending on the modality, the quantitative analysis includes lesion segmentation—in 2D or 3D, which can be manually, semi-automatically, or automatically performed. The extraction of relevant lesion characteristics (such as textural, morphological, and/or kinetic features) with which to describe the lesion, and the use of combinations of these characteristics in several classification tasks are performed using artificial intelligence. The output can be given in terms of a numerical value of the lesion characteristic or probability of disease state, prognosis and/or response to therapy.

The output is utilized to identify similar cases that can be retrieved by feature values, probability of disease state, and/or based on dimension-reduction techniques to determine similarity. Also, the output can be given in terms of 1-D, 2-D, and/or 3-D distributions in which the unknown case is identified relative to calculations on known cases and/or unlabeled cases, which might have gone through a dimension-reduction technique. Output to 3D can show the relationship of the unknown case to a cloud of known and/or unlabeled cases, in which the cloud can demonstrate the structure of the population of patients with and without the disease. This cloud can be rotated freely by the user is they wish to better see the 3D structure of the population dataset and the relationship of the unknown case to the known cases (or even unlabeled cases). Such relationships within this cloud can be used to retrieve "similar" cases based on the dimension reduced pseudo-feature space.

Output can also be calculated and/or displayed in terms of lesion-based or voxel-based calculations, and these can include kinetic features, morphological features, and/or both; which can be noted via a color map, which can also be subsequently analyzed. In addition, another option in the display of the numerical and/or graphical output is that the output can be modified relative to the disease prevalence under different clinical scenarios.

Figure 4:
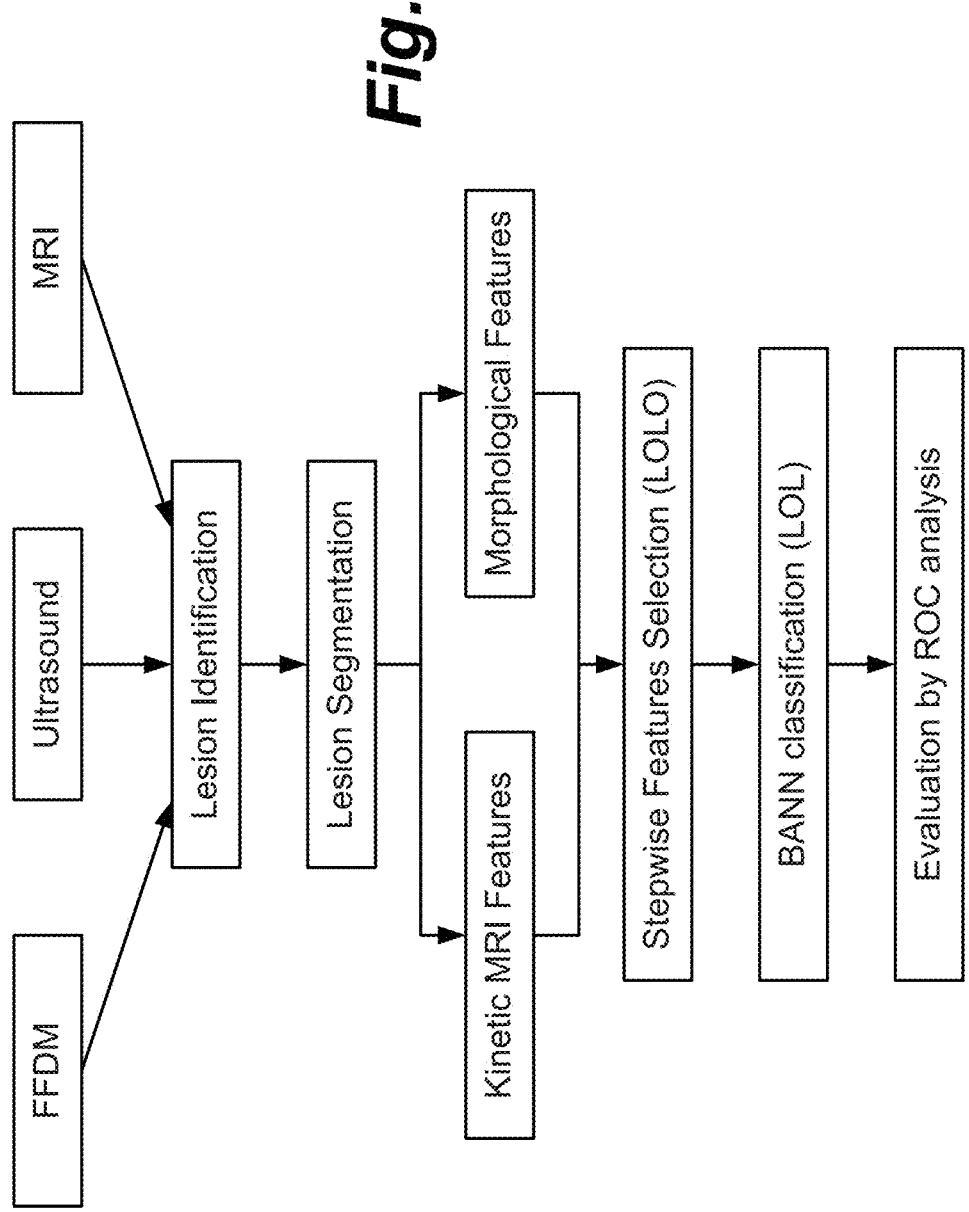
FIG. 4 illustrates an algorithmic process, by way of a flowchart, for multi-modality characterization of breast lesions in the task of distinguishing between malignant and benign lesions.
Figure 5:
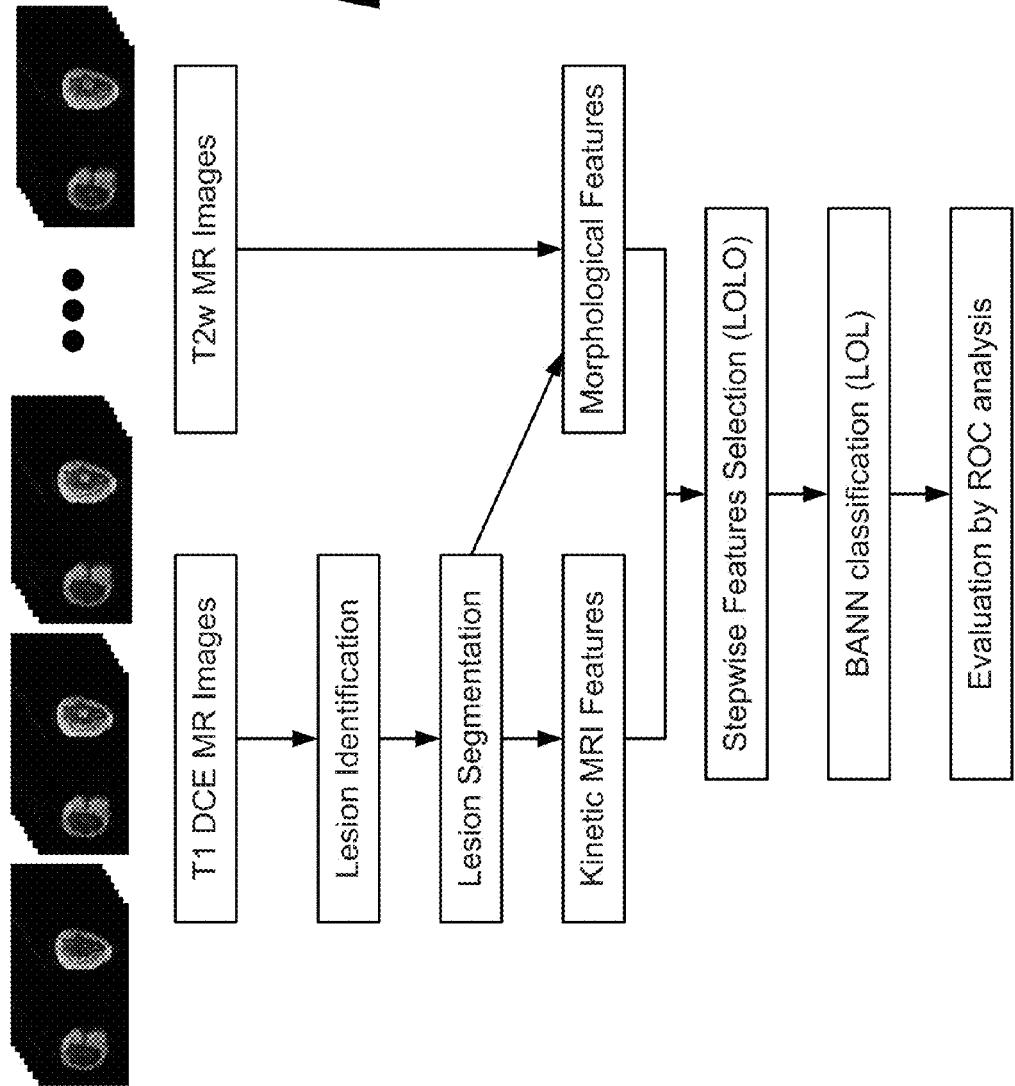
FIG. 5 illustrates an algorithmic process, by way of a flowchart, for characterization of breast lesions on magnetic resonance images obtained from different protocols to yield, e.g., T1 and T2w images, in the task of distinguishing between malignant and benign lesions.

The analyses can include a single modality, multiple modalities (as shown in FIG. 4) and/or multiple acquisition types for a single modality (as shown schematically in FIG. 5 for MRI). These classification tasks can include the distinction between malignant and benign lesions (diagnosis) as in FIGS. 4 and 5. According to FIG. 4, each lesion was segmented using the fuzzy c-means clustering method, kinetic and morphological features are extracted, and (depending on the classification task) a stepwise feature selection is performed with LOLO (leave-one-lesion out). Then, selected features are merged using Bayesian NN using leave-one-lesion-out cross-validation, and the performance of the neural network classifier is evaluated using ROC analysis. FIG. 5 adapts this process according to T1 DCE MR images and T2w MR images.

Figure 6:
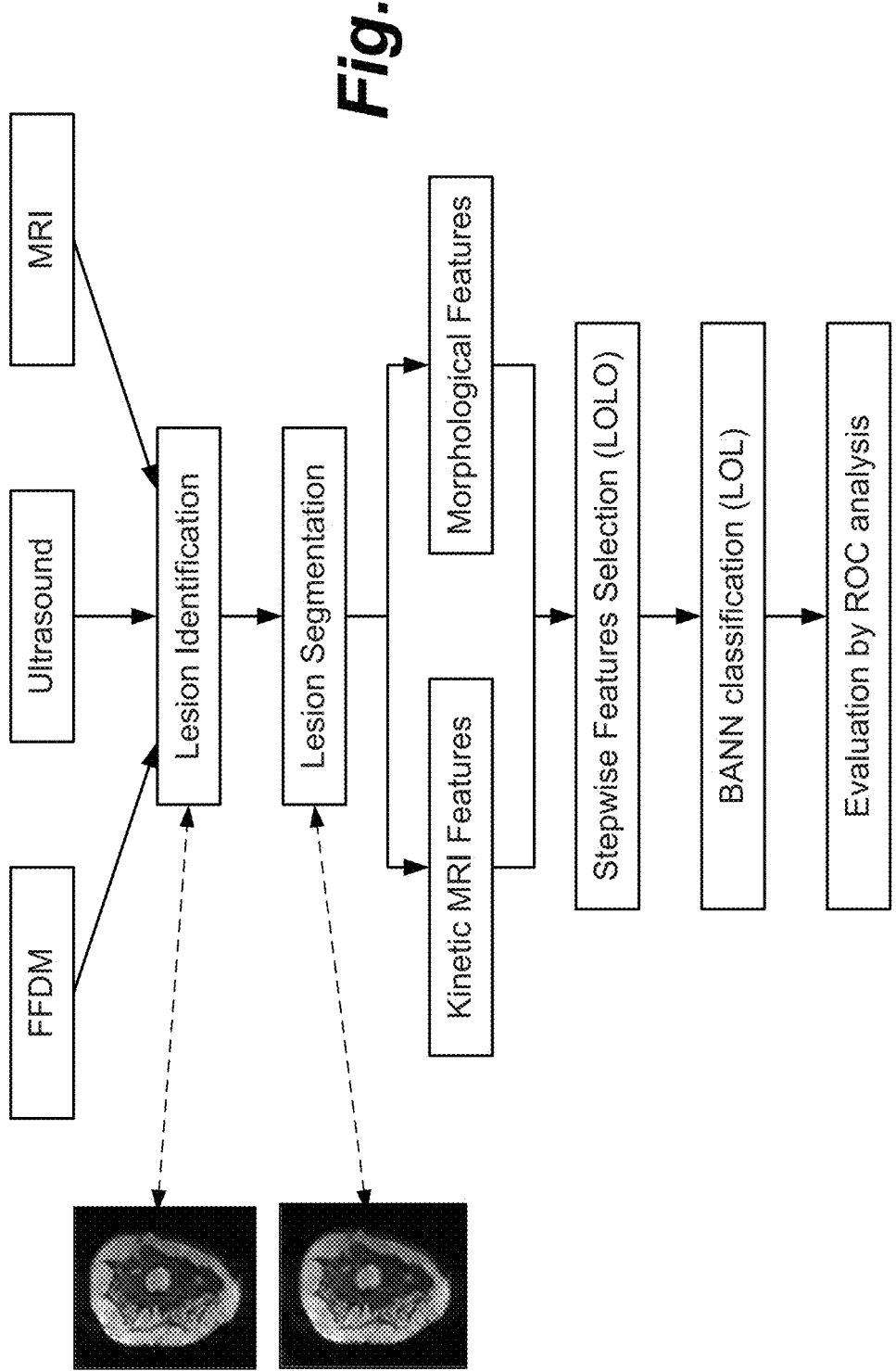
FIG. 6 illustrates an algorithmic process, by way of a flowchart, for multi-modality characterization of breast lesions in the task of assessing prognosis in terms of, e.g., invasiveness, lymph node metastasis, and histological grade.
Figure 7:
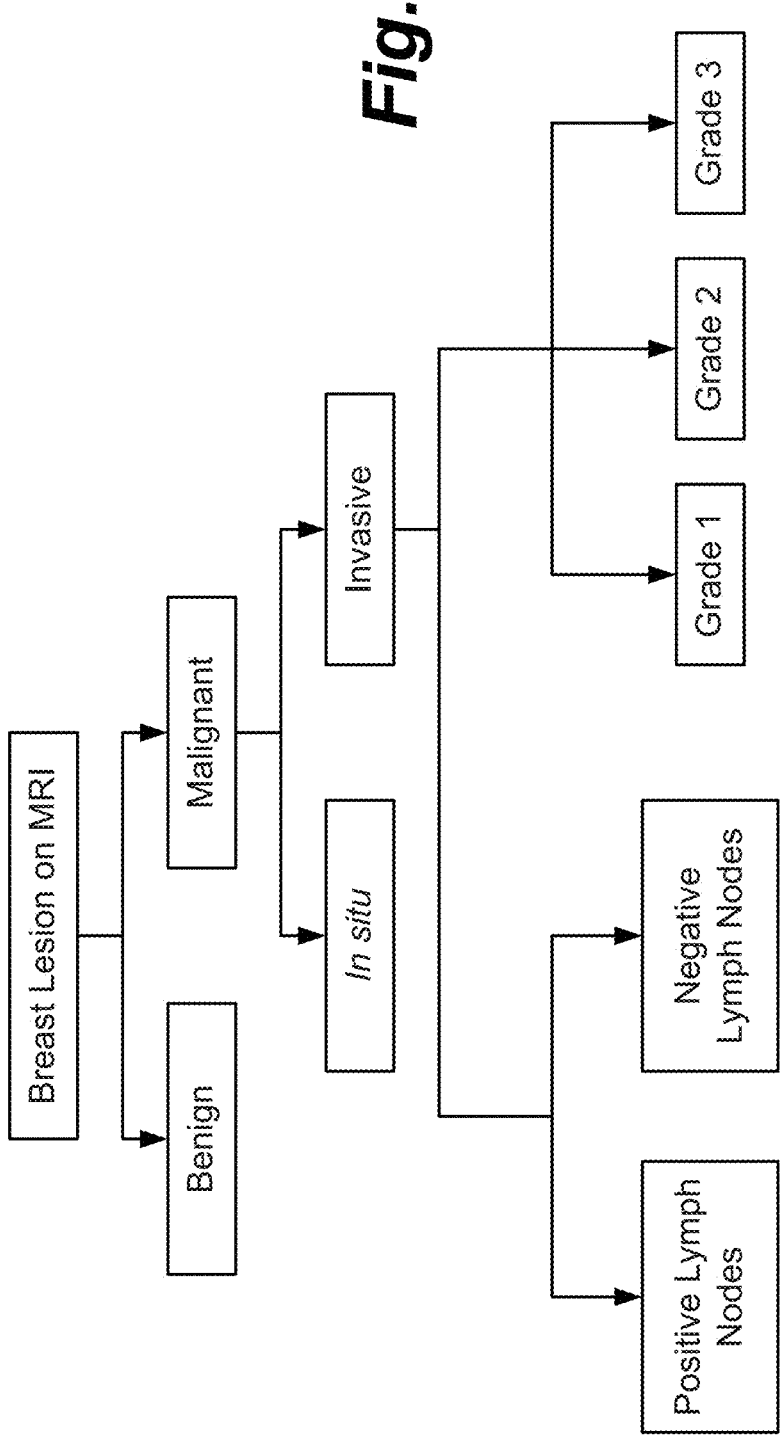
FIG. 7 illustrates an algorithmic process, by way of a flowchart, of an exemplary prognostic process used in studies.
Figure 8:
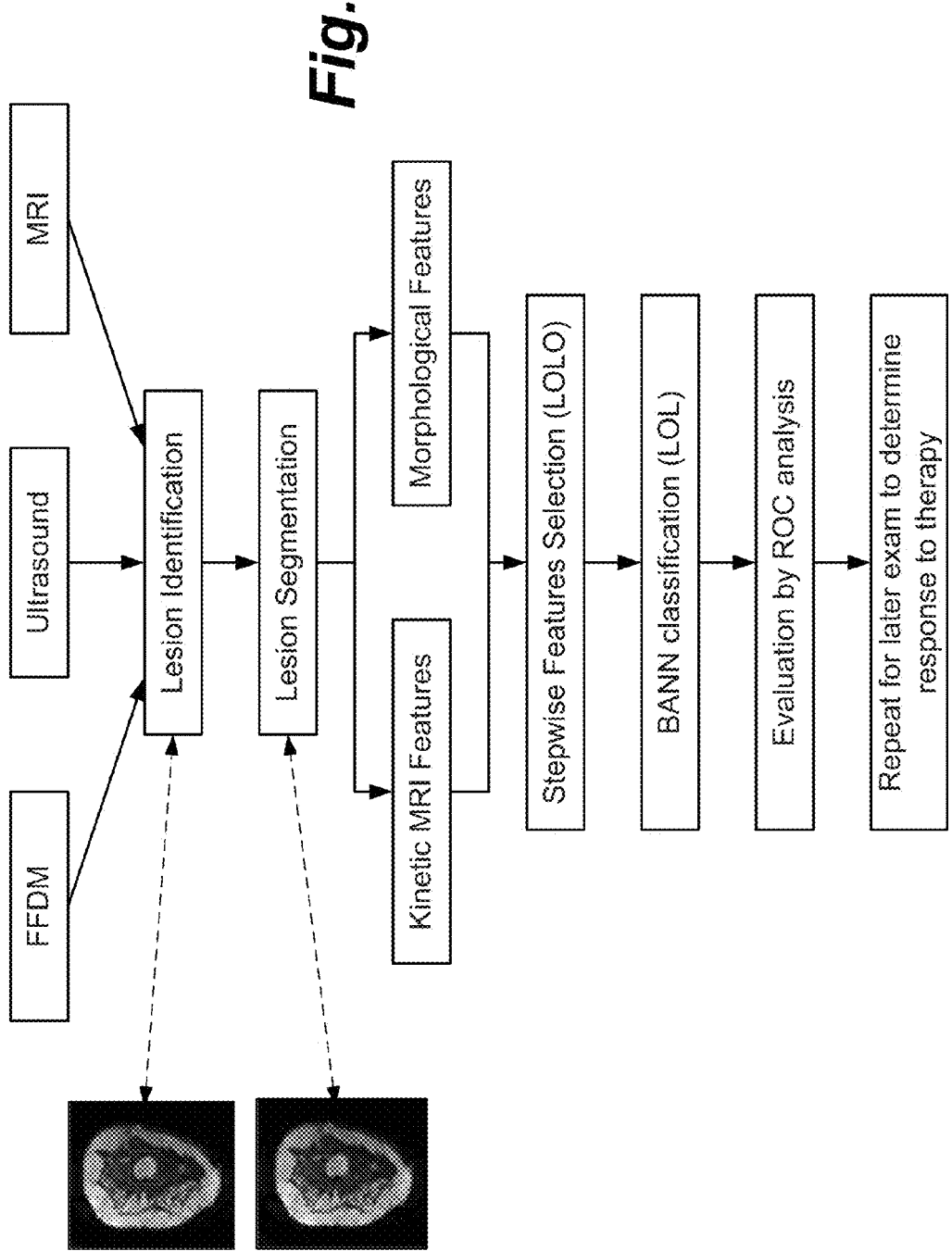
FIG. 8 illustrates an algorithmic process, by way of a flowchart, for multi-modality characterization of breast lesions in the task of predicting response to therapy based on analyses of the tumor prior to the start of therapy.
Figure 9:
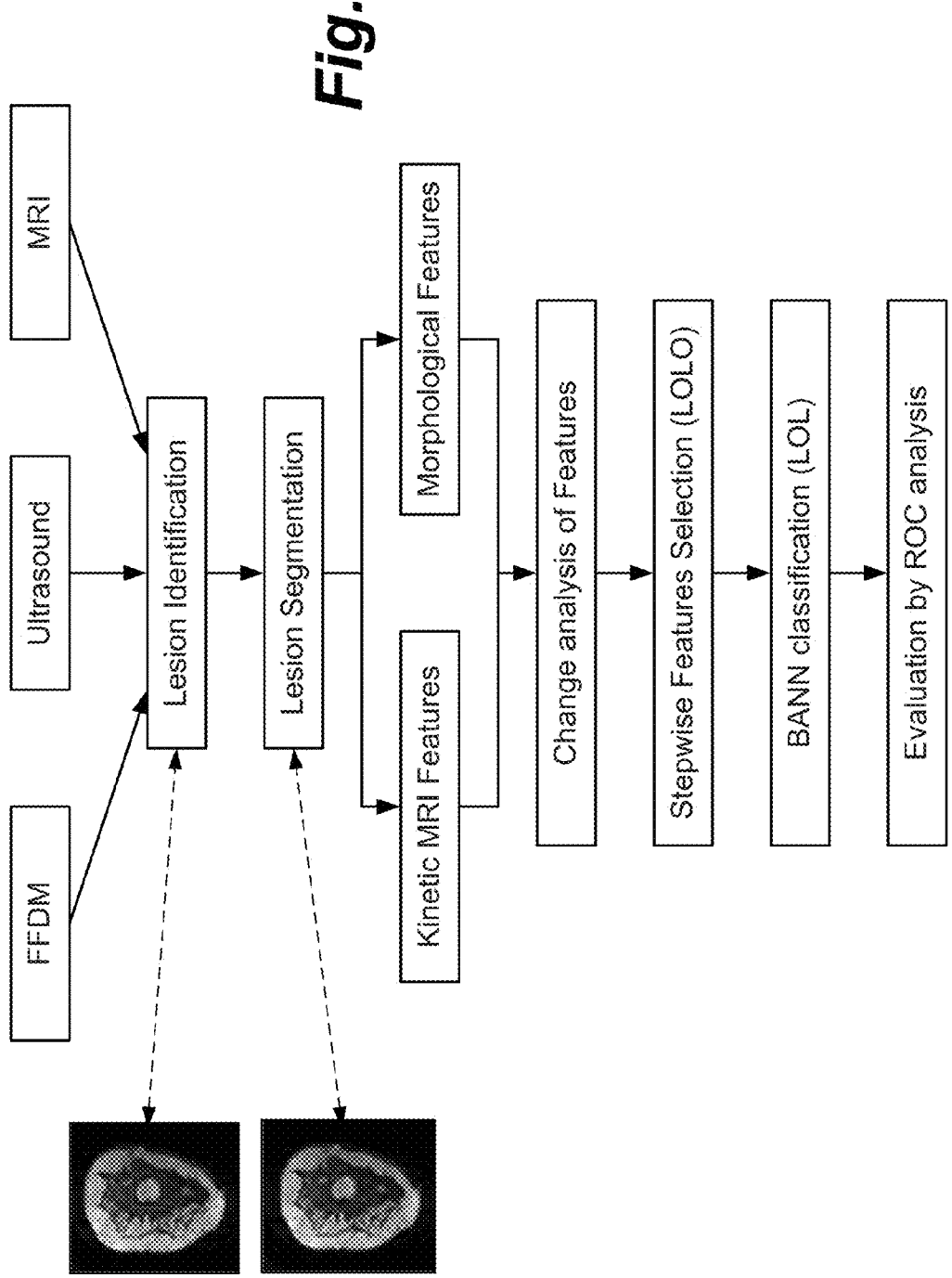
FIG. 9 illustrates an algorithmic process, by way of a flowchart, for multi-modality characterization of breast lesions in the task of predicting response to therapy based on analyses of the tumor during therapy, i.e., at various intervals during the treatment, including change analysis to assess the change in tumor features during therapy could be accomplished by calculating, e.g., the arithmetic change of feature values, the slope of change, or other change trend assessments.

Also, as shown in FIG. 6, the classification task can be for estimating a prognostic marker based on, for example, ductal carcinoma in situ lesions from invasive ductal carcinoma lesions (diagnosis, malignancy grades) and malignant lesions with lymph nodes positive for metastasis and those that have remained metastasis-free (prognosis), and, with references to FIGS. 7-9, as a marker for response to therapy which could be used in characterizing lesions according to their biomarkers and/or the change between exam dates (response to therapy). In FIG. 6, the features include invasiveness, lymph node metastasis and histological grade.

As per FIG. 8, examination in whole or part can be repeated to determine a responsiveness to therapy. Also, as per FIG. 9, analysis of particular features can be changed in the repeated examination.

Turning to FIG. 7, once the lesion is acquired on MRI, the first step is diagnostic classification (distinguish benign and malignant lesions which has been extensively studied). The goal is to see how much information can be extracted from the MR images in evaluating the prognostic nature of the breast lesion. After being established as malignant, the next step is to evaluate whether it's invasive or in situ. And then once it's known as invasive, to evaluate lymph node status and tumor grade. By developing these image-based biomarkers as surrogates for prognosis, predictive markers can then be developed which combine prognosis and therapy for therapy assessment.

The segmentation of a mass from the background parenchyma can be accomplished multiple ways, e.g., based on gray levels (see Kupinski M A, Giger M L, "Automated seeded lesion segmentation on digital mammograms," IEEE Trans on Medical Imaging, 17: 510-517, 1998, and Yuan Y, Giger M L, Li H, Suzuki K, Sennett C, "A dual-stage method for lesion segmentation on digital mammograms," *Medical Physics* 34: 4180-4193, 2007) or voxel based kinetic information (see Chen W, Giger M L, Bick U, "A fuzzy c-means (FCM) based approach for computerized segmentation of breast lesions in dynamic contrast-enhanced MR images," Academic Radiology 13: 63-72, 2006).

In clinical practice, the location of the mass can be identified either by a radiologist or by a computer-detection scheme and then fed into the classification scheme for an output on the likelihood of disease state. In order to correct for the non-uniformity of the background distribution and to enhance image contrast for better segmentation of masses, background trend correction and histogram equalization techniques may be applied to the lesion region of interest.

Objective A

Many lesion characteristics are used by radiologists in classifying masses. Different characteristics of these features are associated with different levels of probabilities of malignancy, prognosis, risk assessment, and/or response to therapy.

Commercial breast DCE-MRI workstations in clinical usage provide the radiologist with color maps indicating characteristics of early and delayed-phase tissue enhancement. Although this output method conveniently summarizes kinetic data, it does not analyze the data in order to estimate lesion malignancy, prognosis, or response to therapy status. The purpose of one presented study was to link computer-aided diagnosis (CADx) with lesion visualization by applying a CADx algorithm to the kinetic curves of individual lesion voxels, thus generating color maps indicative of an estimate of the probability of malignancy for each lesion voxel.

Figure 10:
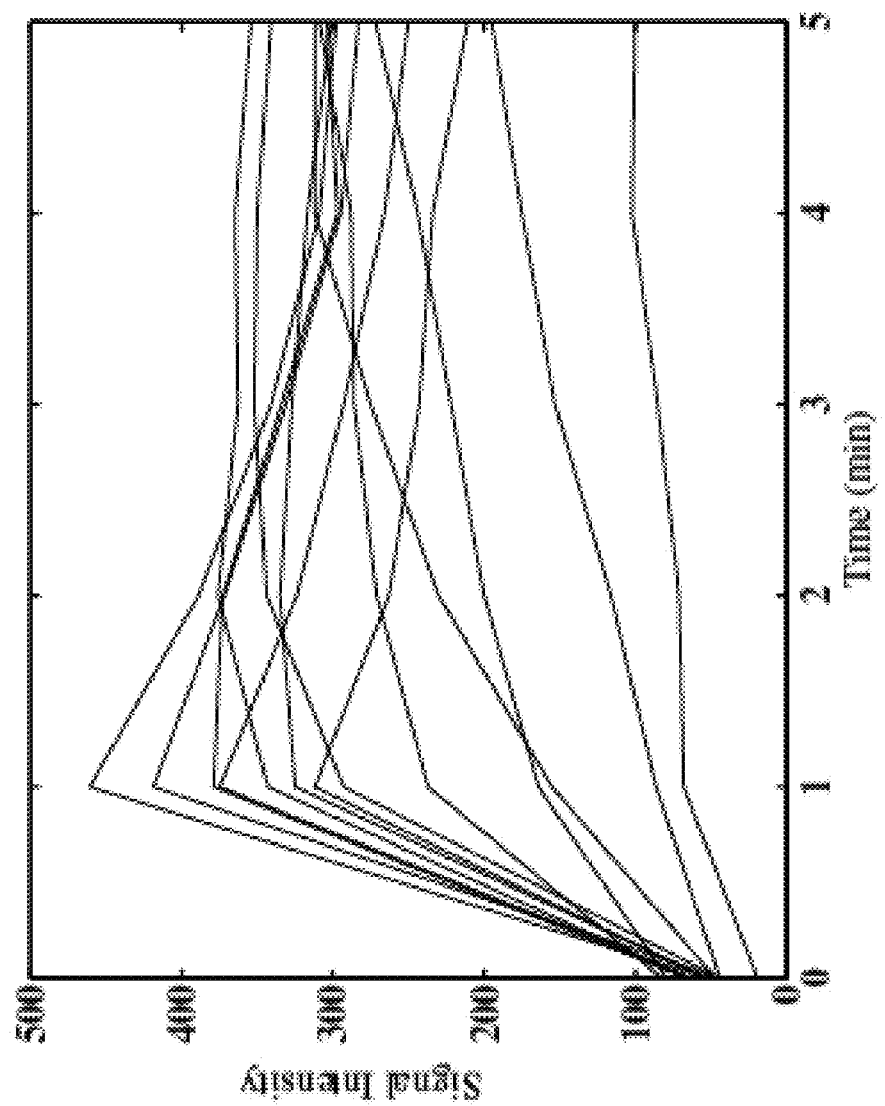
FIG. 10 shows heterogeneous kinetic curves from voxels within a breast tumor on DCE-MRI.

FIG. 10 is a graph of kinetic curves from a single breast lesion, and illustrates how, within a breast lesion, different kinetic curves (one for each lesion voxel) can exist. The spatial pattern of lesion enhancement can be related to disease status. See Chen W, Giger M L, Bick U, Newstead G, "Automatic identification and classification of characteristic kinetic curves of breast lesions on DCE-MRI," Medical Physics, 33: 2878-2887, 2006. Two breast DCE-MRI databases (T1-weighted, 4 to 6 time points) were used. Database 1 (DB1) contained 121 lesions and database 2 (DB2) contained 181 lesions. Each lesion was automatically segmented and summarized by a "characteristic kinetic curve" (CKC) using previously developed fuzzy C-means (FCM) algorithms. Kinetic, textural and morphological features were extracted from the lesion data and CKCs in the training database, and these features were used to train a linear discriminant analysis (LDA) classifier. Using ROC analysis, the classifier was then evaluated on the basis of its ability to classify individual voxels in the testing database as belonging to either benign or malignant lesions.

This evaluation was performed for (a) all voxels, and (b) the FCM-selected most enhancing voxels. The classifier was first trained on DB1 and tested on DB2; after this, the classifier was trained on DB2 and tested on DB1. The area under the ROC curve (AUC) was used as a figure of merit. Finally, we developed a CADx workstation prototype that generated lesion probability of malignancy (PM) color maps based upon the individual voxel kinetic analysis. For training on DB1 and testing on DB2, we obtained an all-voxel AUC of 0.80±0.002 and a most enhancing voxel AUC of 0.82±0.005. For training on DB2 and testing on DB1, we obtained an all-voxel AUC of 0.79±0.001 and a most enhancing voxel AUC of 0.78±0.006. The workstation prototype was moderately successful at the task of voxel classification, and may provide a useful visual link between CADx output and the radiologist in clinical applications. While breast DCE-MRI workstations in current usage merely summarize kinetic data, the CADx workstation prototype presented here generates lesion images based on a computer interpretation of the data.

It was investigated whether CADx performance on breast DCE-MRI can be improved by estimating the spatial complexity of lesion kinetic feature maps using generalized fractal dimension lesion descriptors (FDLDs). A database of 181 histologically classified breast lesions visible on DCE-MRI was analyzed as follows. Initially, each lesion was segmented from the parenchyma using our previously developed and validated fuzzy C-means clustering technique. See Chen W, Giger M L, Bick U, "A fuzzy c means (FCM) based approach for computerized segmentation of breast lesions in dynamic contrast-enhanced MR images," Academic Radiology, 13: 63-72, 2006. A kinetic curve was obtained from each lesion voxel, and kinetic features were extracted from each kinetic curve. As schematically shown in FIG. 11, these features were used to generate 3-D kinetic feature maps for each lesion, and generalized FDLDs were calculated for each kinetic feature map.

Figure 13:
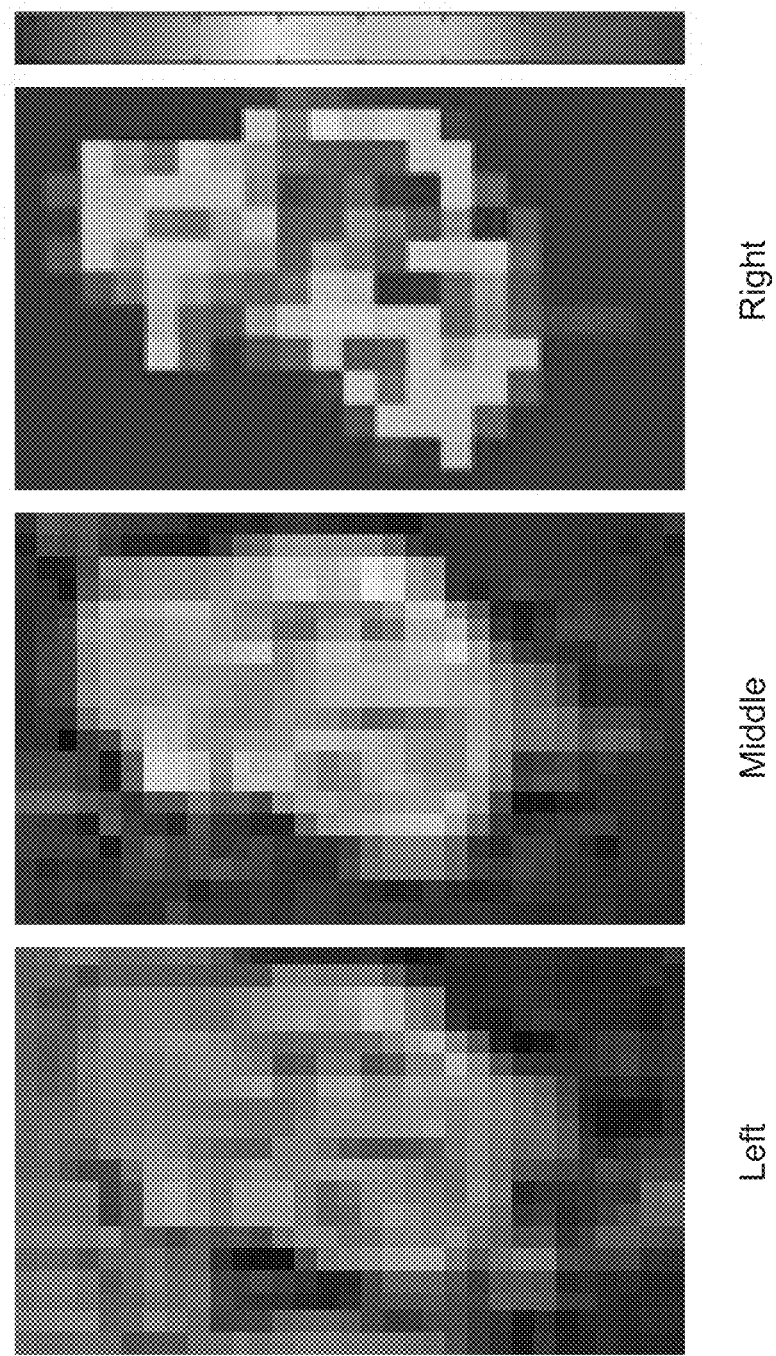
FIG. 13 illustrates an example of a color map image for a washout feature ($F_4$ of FIG. 12), for a representative slice of a malignant lesion, from which map fractal dimension lesion descriptors (FDLD) can be calculated.

FIG. 12 illustrates features $F_1$ to $F_{13}$ for reducing the 4D DCE-MRI image data to 3D image data. The 4D data are 3D over the time, thus yielding at each voxel a kinetic curve. Features, listed in FIG. 12, for each voxel are extracted from the kinetic curves. As per FIG. 12, the 4-D (spatially and temporally indexed) signal data of DCE-MRI can be reduced to 3-D (spatially indexed) feature data by computing kinetic features at each voxel in order to construct a 3-D kinetic feature map. Five kinetic features are extracted directly from a given voxel kinetic curve, denoted by S(t). Eight additional features are extracted from a fitted model function, denoted by $C(t)=A(1-e^{-\alpha t})e^{-\beta t}$. For each feature, one can obtain a color map image as illustrated in FIG. 13, which shows an example of the color map for a representative slice of a malignant lesion. Shown is a washout feature map, on which the FDLD would be calculated. In FIG. 13, a representative slice of a malignant lesion is shown. At left: lesion at first post-contrast time point. At middle: subtracted (first post-contrast minus pre-contrast) lesion image. At right: washout feature map, with redder colors indicating greater washout. The internal complexity of the feature map is difficult for a human observer to characterize, but it can be estimated using a generalized fractal dimension lesion descriptor (FDLD).

FIG. 14 shows equations for the theory behind using fractal dimension lesion descriptors (FDLDs) to characterize the spatial pattern of lesion enhancement. Here, for a discrete probability distribution X, define the Réyni entropy of order α, $H_\alpha^{(b)}(X)$. Using this quantity, define the Réyni dimension of order α for a distribution X stored in a spatial array, $d_\alpha^{(b)}$. See Rose, C. J. Mills, S., et al., "Quantifying spatial heterogeneity in Dynamic Contrast-Enhanced MRI Parameter Maps," Magn. Reson. Med 65, 488-499 (2009). FIG. 15 shows the implementation of the fractal dimension calculation for breast DCE-MRI lesions to obtain the information dimension and the correlation dimension for each color map image. Here, choose b=exp(1) and compute the Réyni dimensions for α=1 (information dimension) and α=2 (correlation dimension), where s is a scale parameter.

Figure 16:
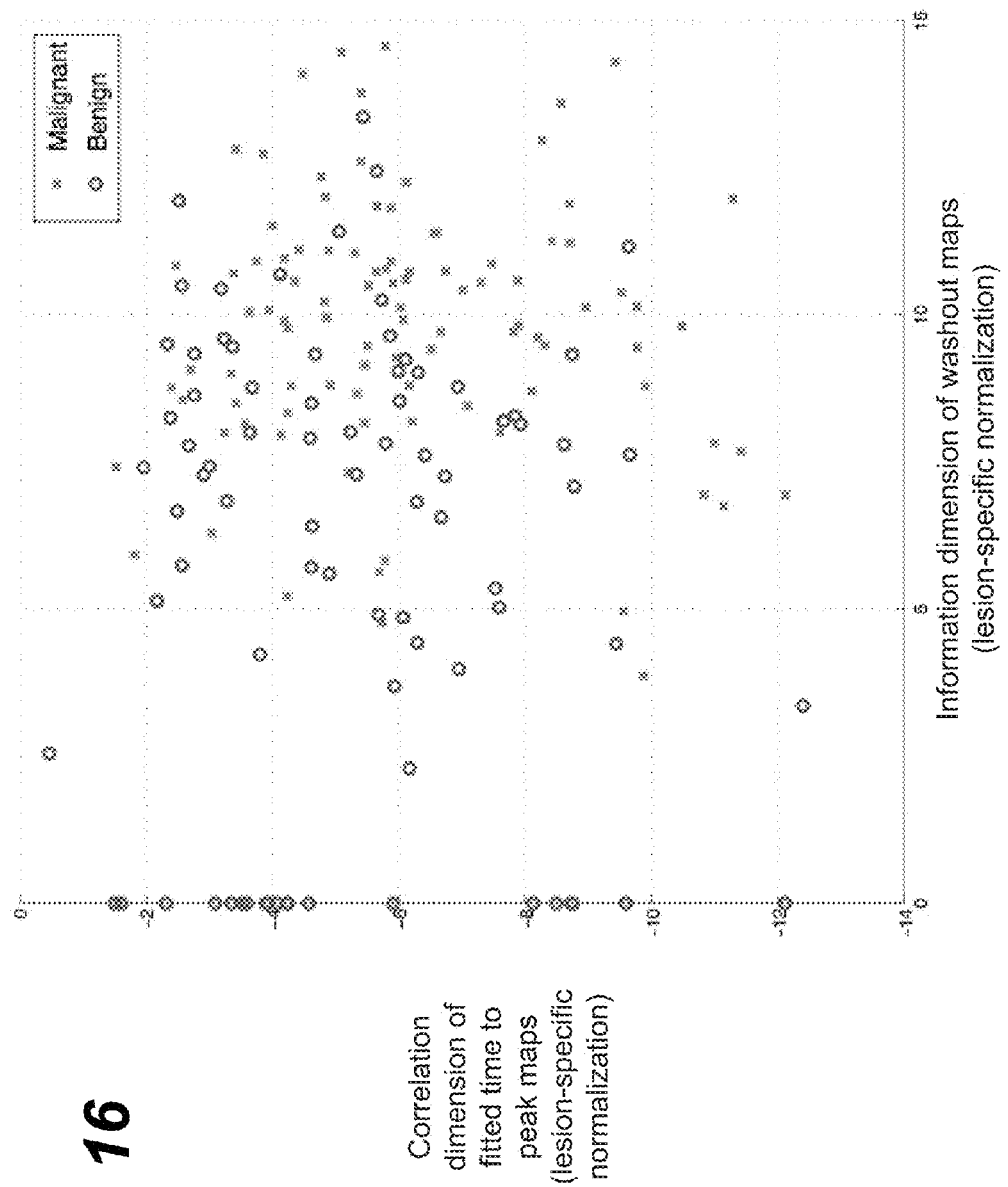
FIG. 16 is a graph of an example of two lesion characteristics from the computerized fractal dimension analysis of kinetic feature maps in DCE-MRI in characterizing tumors for a database of malignant and benign lesions.

Over a database of DCE-MRI cases, FIG. 16 shows the distribution of two of the FDLD features: (a) the information dimension from the pattern of the washout feature color map and (b) the correlation dimension from the fitted time to peak feature color map.

The diagnostic efficacy of the individual FDLDs was then evaluated using ROC analysis. Next, to explore whether the FDLDs could improve the performance of previous CADx methods, a conventional set of kinetic and morphological lesion features was compared with a feature set containing conventional features and FDLDs. Each feature set was merged using linear discriminant analysis (LDA) and evaluated using ROC analysis, together with a leave-one-case-out method to minimize database bias. Finally, the area under the ROC curve (Az) values of the two feature sets were statistically compared using ROCKIT software. The individual FDLDs obtained a maximum performance of Az=0:85. The conventional features achieved Az=0:87, and the FDLDs combined with conventional features gave Az=0:90_0:02. The Az value of the conventional features and FDLDs was significantly higher than the Az value of the conventional features alone (p=0:023). The work suggests that generalized FDLDs could potentially be beneficial to a clinical CADx system for breast DCE-MRI.

Figure 17:
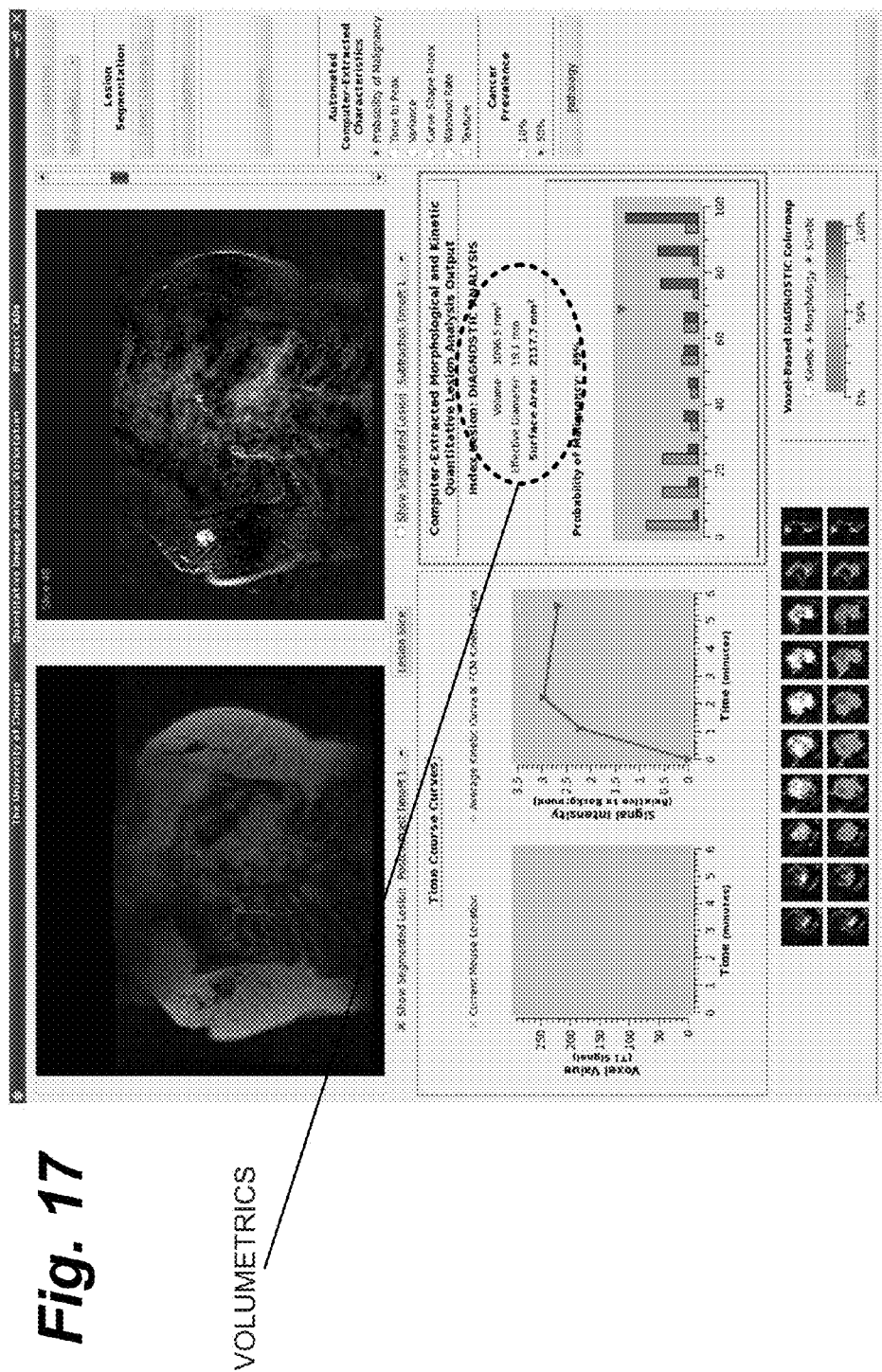
FIG. 17 is an image of a workstation display for a malignant lesions—showing the segmented lesion on DCE-MRI, the average kinetic and most enhancing kinetic curves, the voxel-based diagnostic color map and the lesion's volumetrics of volume, effective diameter and surface area.

FIG. 17 shows an example of the workstation display for malignant lesions—showing the segmented lesion on DCE-MRI, the average kinetic and most enhancing kinetic curves, and the voxel-based diagnostic color map. Also shown are the voxel-based diagnostic color map and the lesion's volumetrics of volume, effective diameter, and surface area, which are encircled with the label VOLUMETRICS.

Objective B

Lesion size is a common characteristic visually estimated by radiologists in their interpretation of breast images for diagnosis, prognosis, and response to therapy. As noted earlier, the 2D or 3D segmentation of a mass from the background parenchyma can be accomplished multiple ways, e.g., based on gray levels (see Kupinski M A, Giger M L, "Automated seeded lesion segmentation on digital mammograms," IEEE Trans on Medical Imaging, 17: 510-517, 1998, and Yuan Y, Giger M L, Li H, Suzuki K, Sennett C, "A dual-stage method for lesion segmentation on digital mammograms," Medical Physics, 34: 4180-4193, 2007), or voxel based kinetic information (see Chen W, Giger M L, Bick U, "A fuzzy c-means (FCM) based approach for computerized segmentation of breast lesions in dynamic contrast-enhanced MR images," Academic Radiology, 13: 63-72, 2006).

On 2D images, such as mammograms, the area and corresponding effective diameter can be calculated with the area corresponding to the number of pixels within the segmented lesion and the effective diameter being the diameter of a sphere having equivalent area as that of the segmented lesion. The area and effective diameter in terms of pixels can be converted to some absolute measure, such as millimeters ($mm^2$ and mm), by using the size of the pixel.

However, for 3D images, the lesion can be segmented in 3D and, thus, size can be represented by volume, and its corresponding effective diameter, with volume corresponding to the number of voxels within the segmented lesion and the effective diameter being the diameter of a sphere having equivalent volume as that of the 3D-segmented lesion. The volume and effective diameter in terms of voxels can be converted to some absolute measure, such as millimeters ($mm^3$ and mm), by using the size of the voxel.

Note that the volume can be calculated by counting all the voxels in the lesion or just using those voxels that are associated with kinetic enhancement. As previously shown in FIG. 10, within a breast lesion, different kinetic curves (one for each lesion voxel) can exist. Using methods to identify the most suspicious voxels with a lesion allows one to calculate the volume using just those voxels. For example, prior investigations in our lab, demonstrated how the use of fuzzy c-means clustering could identify those voxels whose kinetics showed enhancement (the upper curves in FIG. 10) and, thus, only those voxels were use in determining the 'most enhancing" kinetic curve and then the associated kinetic features (see Chen W, Giger M L, Bick U, Newstead G, "Automatic identification and classification of characteristic kinetic curves of breast lesions on DCE-MRI," Medical Physics, 33: 2878-2887, 2006). Likewise, those voxels whose kinetics showed enhancement (the upper curves in FIG. 10) would be the only voxels contributing to the calculation of the volume. The type of volume to be calculated will depend on the task—diagnosis, prognosis or response to therapy.

From the 3D segmented lesion, the surface area of the lesion can also be calculated. Surface area is calculated using the edges of voxels within the segmented lesion that are adjacent to the breast parenchyma, and can be given in $mm^2$.

The workstation automatically calculates on DCE-MRI lesions, the "volumetrics," and outputs volume, effective diameter, and surface area as shown in FIG. 17, which shows an example of the workstation display for a malignant lesions—showing the segmented lesion on DCE-MRI, the average kinetic and most enhancing kinetic curves, the voxel-based diagnostic color map, and the lesion's volumetrics.

Objective C

Another component of the workstation that can be chosen is the use of dimension reduction of characteristics (features) of the lesion (tumor) yielding the structure of the lesion types across a population and a visual display of the case in question relative to known cases by use of a cloud, and/or, a method to incorporate unlabeled (unknown) data into the decision making and visualization of the computer output.

The number of lesion features characterizing size, morphology, texture, and/or kinetics of a lesion, that are extracted from lesions, e.g., on mammography, ultrasound, and/or MRI, can be quite large—perhaps numbering up to 81 features for each lesion. A human cannot visualize 81 features. For human observers, it is most natural to examine a few features at a time using 1D, 2D, or 3D plots. Beyond three dimensions, data visualization is non-trivial. However, diagnostically useful feature space representations likely involve more than three features. Also, important data structure may be non-linear and local. New techniques are proposed for efficient representation of high-dimensional breast image feature spaces. Specifically, unsupervised non-linear, local structure preserving dimension reduction allowing simultaneous examination of global data structure and local case-to-case relationships is proposed. Use of such dimension-reduction methods and the subsequent display can allow a user to discover information contained in these large, high-dimensional image feature datasets, and present the data in 2D and 3D display formats—"clouds."

In addition, use of dimension-reduction methods can serve as a replacement for feature selection methods. Feature-selection methods, both linear and non-linear, can reveal which combinations of features are likely to produce robust classification performance. See Kupinski, M A, Giger, M L "Feature selection with limited datasets." Med. Phys. 26, 2176-2182, 1999. More sophisticated methods, such as a Bayesian neural network, can even estimate classification uncertainty. See Neal, R. M. Bayesian Learning for Neural Networks. (Springer-Verlag New York, Inc.: 1996). The workstation incorporates the output of the use of dimension reduction to help visualize and interpret classifier error. Classifier output (and uncertainty) can be overlaid on the reduced representations to reveal global properties of the decision space and give better context to specific case error points. See Jamieson A, Giger M L, Drukker K, Li H, Yuan Y, Bhooshan N, "Exploring non-linear feature space dimension reduction and data representation in breast CADx with Laplacian eigenmaps and t-SNE," Medical Physics, 37: 339-351, 2010.

Figure 18:
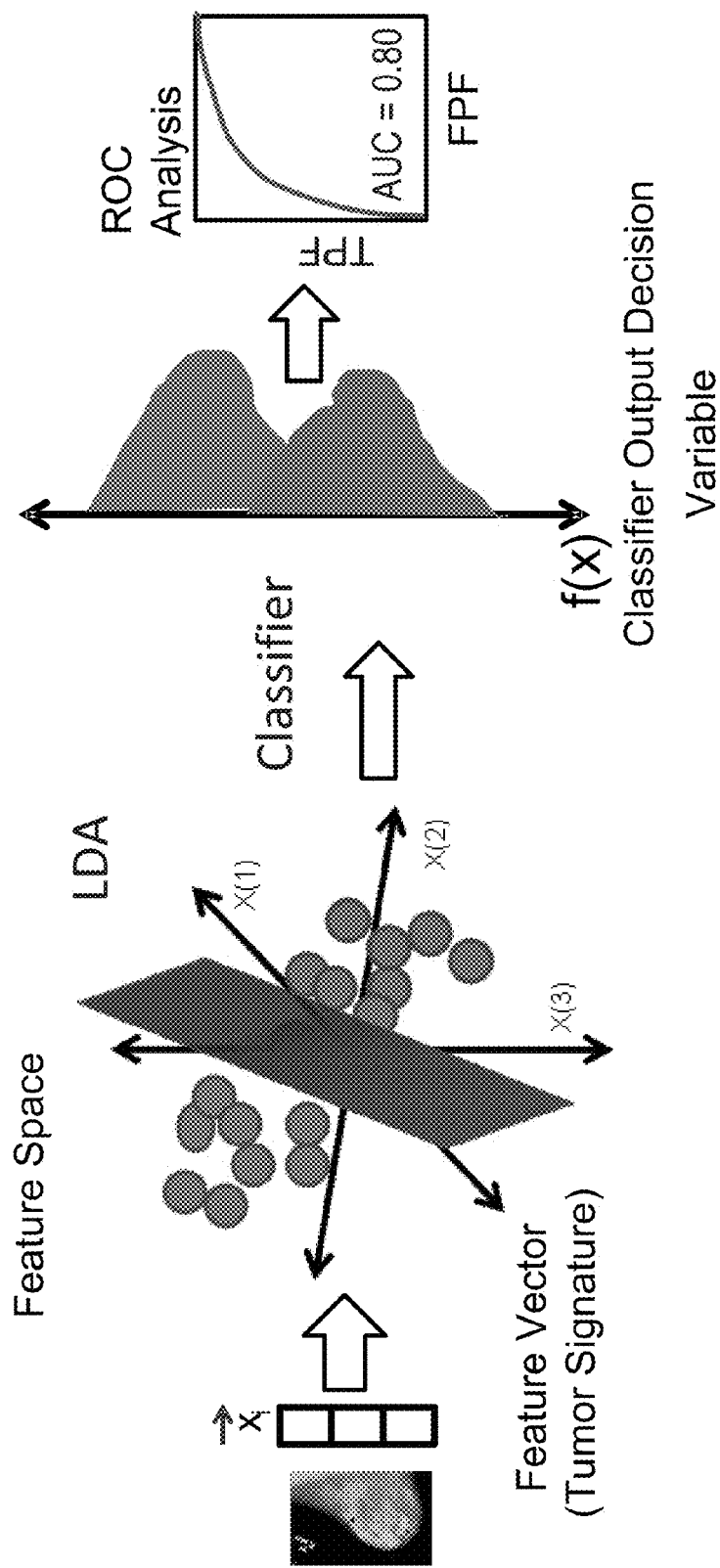
FIG. 18 is a schematic illustrating supervised feature selection and subsequent training of a classifier using as input the three selected features, where output from the classifier is input to ROC analysis to obtain its performance in distinguishing between malignant and benign lesions.
Figure 19:
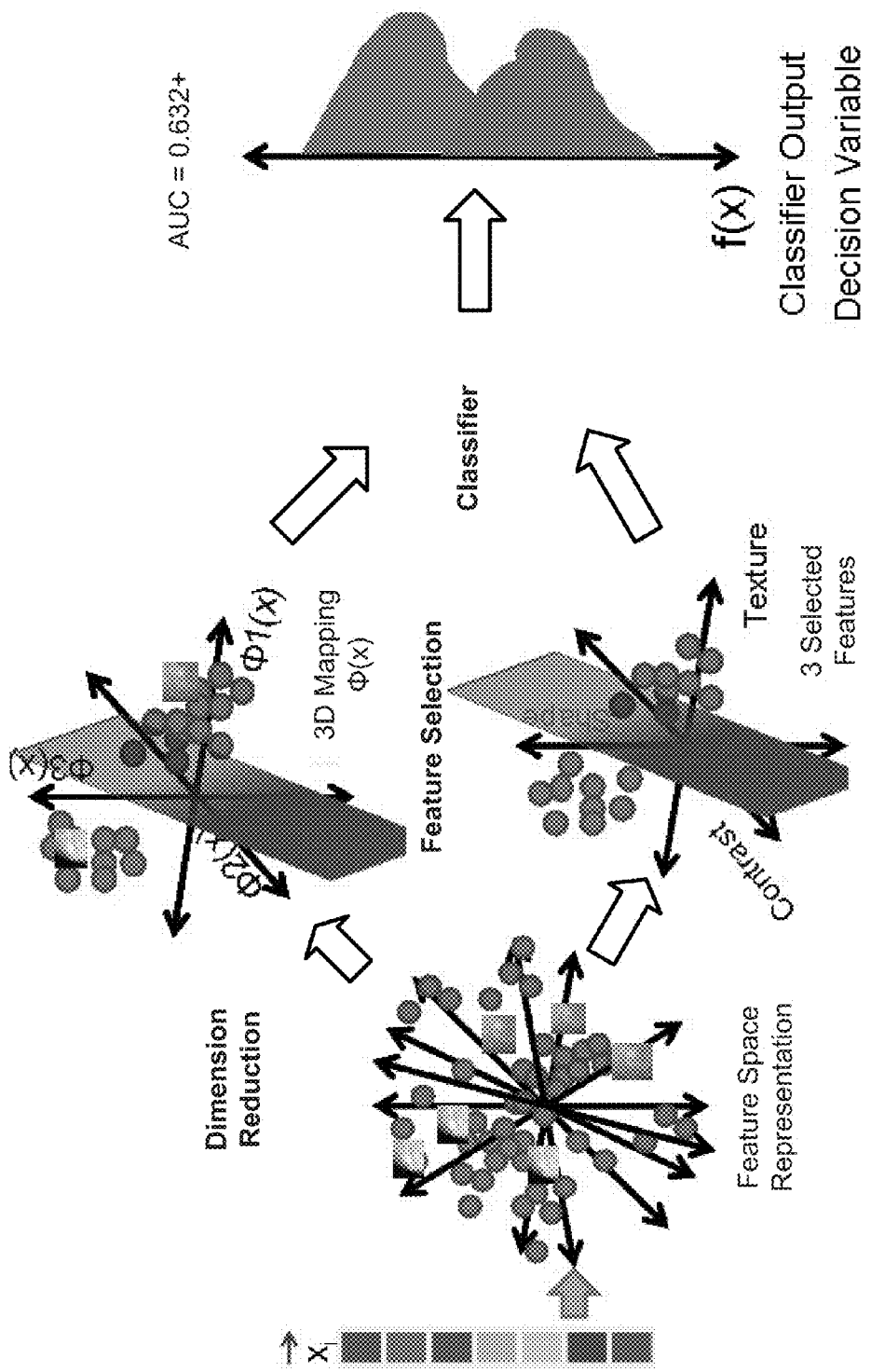
FIG. 19 is a schematic illustrating unsupervised dimension reduction of the feature space instead of feature selection and the subsequent supervised training of a classifier using as input the pseudo-features from the dimension reduction, where output from the classifier is input to ROC analysis to obtain its performance in distinguishing between malignant and benign lesions.

FIG. 18 schematically shows the supervised feature selection and subsequent training of a classifier using as input the three selected features. Output from the classifier is input to ROC analysis to obtain its performance in distinguishing between malignant and benign lesions. FIG. 19 schematically shows the use of unsupervised dimension reduction of the feature space instead of feature selection and the subsequent supervised training of a classifier using as input the pseudo-features from the dimension reduction. Output from the classifier is input to ROC analysis to obtain its performance in distinguishing between malignant and benign lesions.

Figure 20B:
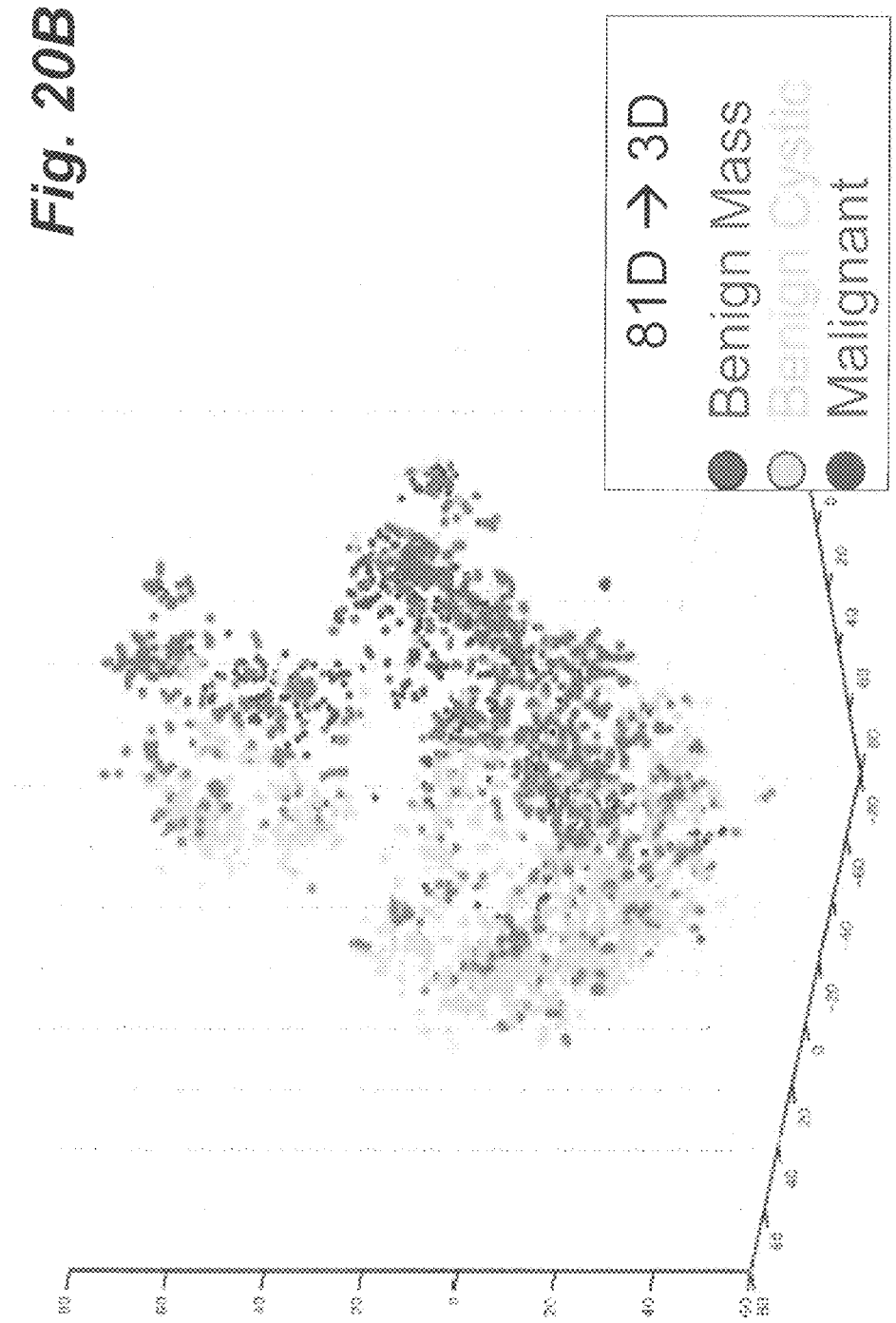

FIGS. 20A-B show output after t-SNE dimension reduction on 81 features (an 81 element vector) to 2 pseudo features (2 element vector) and to 3 pseudo features (3 element vector), respectively. Note that an N-element vector can be viewed as a tumor signature with N number of characteristics. Each data point in FIGS. 20A-B represent a case, with red being malignant, green being benign masses, and yellow being benign cysts, considering 1126 cases and 2956 images (see Jamieson A, Giger M L, Drukker K, Li H, Yuan Y, Bhooshan N, "Exploring non-linear feature space dimension reduction and data representation in breast CADx with Laplacian eigenmaps and t-SNE," Medical Physics, 37: 339-351, 2010, and Jamieson A R, Giger M L, Drukker K, Pesce L, "Enhancement of breast CADx with unlabeled data," Medical Physics, 37: 4155-4172, 2010).

Note that t-SNE dimension reduction can be implemented in a parametric fashion so that a new case can be put through the trained dimension to yield its reduced vector of pseudo features. Implementation on the workstation is illustrated by way of FIGS. 21-23 for three different rotations of the 3D plot of the dimension reduced feature (pseudo feature) set. Note that the red data points correspond to malignant lesions and the green to benign lesions. The blue data point corresponds to an unknown case being interpreted, and is centered on a black X for clarity in identification.

In addition, in the development of computer image analysis systems, access to a large, "well-curated" (detailed profiling of each case) medical image data set is necessary. Unfortunately, there are practical difficulties in assembling large, labeled (histo-pathology and patient biometric information complete) breast image data sets. This is problematic for conventional CADx schemes reliant on supervised classifiers (trained using labeled data). Although not as valuable as labeled data, unlabeled (or partially labeled) data is often abundant and readily available. Computer systems using unlabeled breast image data has been developed to enhance CADx. The use of unlabeled data information can act as a "regularizing" factor aiding classifier robustness. See Jamieson A R, Giger M L, Drukker K, Pesce L, "Enhancement of breast CADx with unlabeled data," Medical Physics, 37: 4155-4172, 2010.

Figure 24:
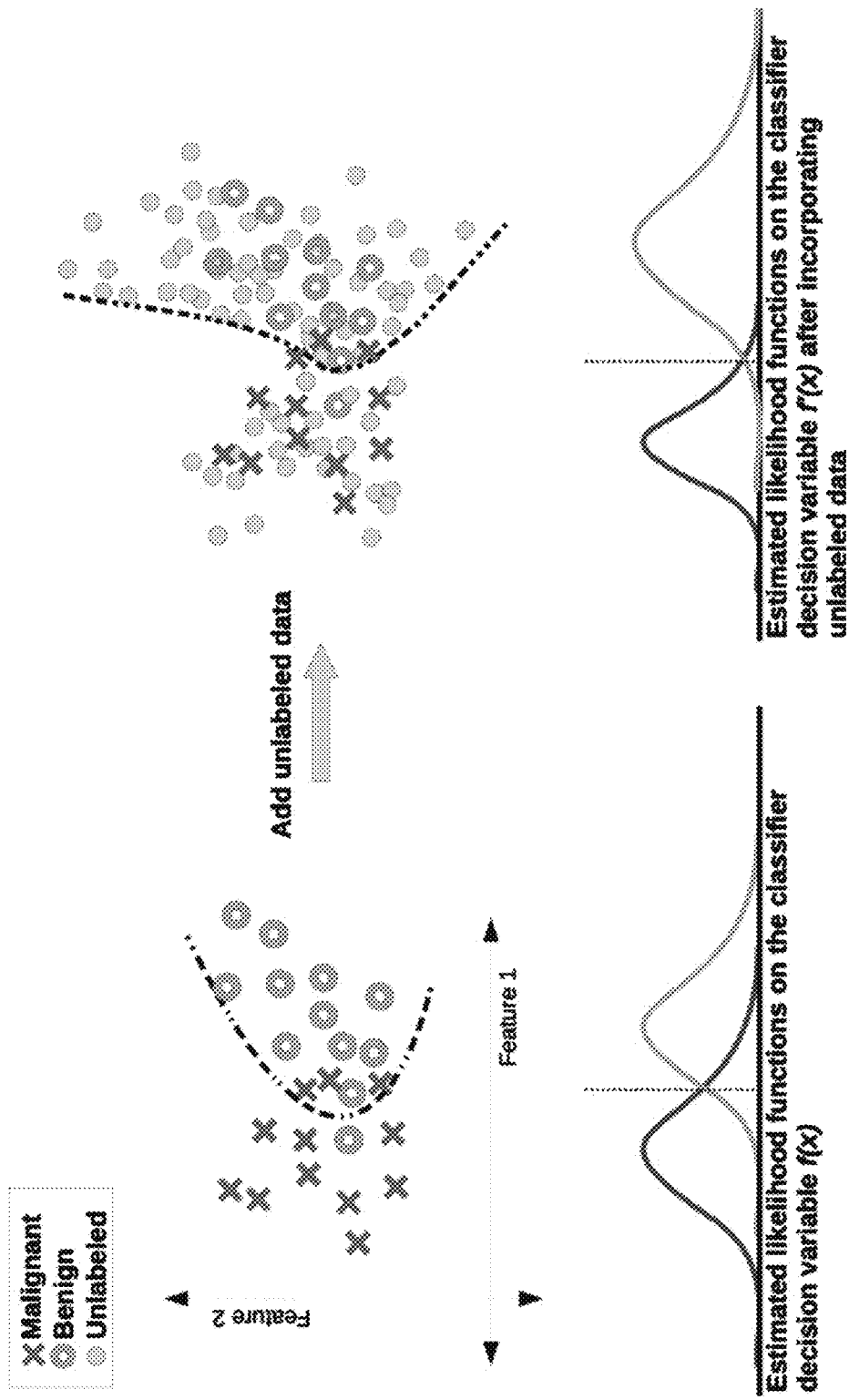
FIG. 24 is a schematic illustrating a simplified example of how the use of unlabeled data can improve CADx classifier regularization, where: the upper-left section displays a number of labeled samples from a hypothetical 2D feature space; the upper-right-hand section depicts the same data, plus unlabeled samples which provide additional structural information, therefore altering the classifier and decision boundary; and the lower section illustrates the class-conditional density functions of the classifier output decision variables obtained by applying the two trained classifiers as described above to the population.
Figure 25:
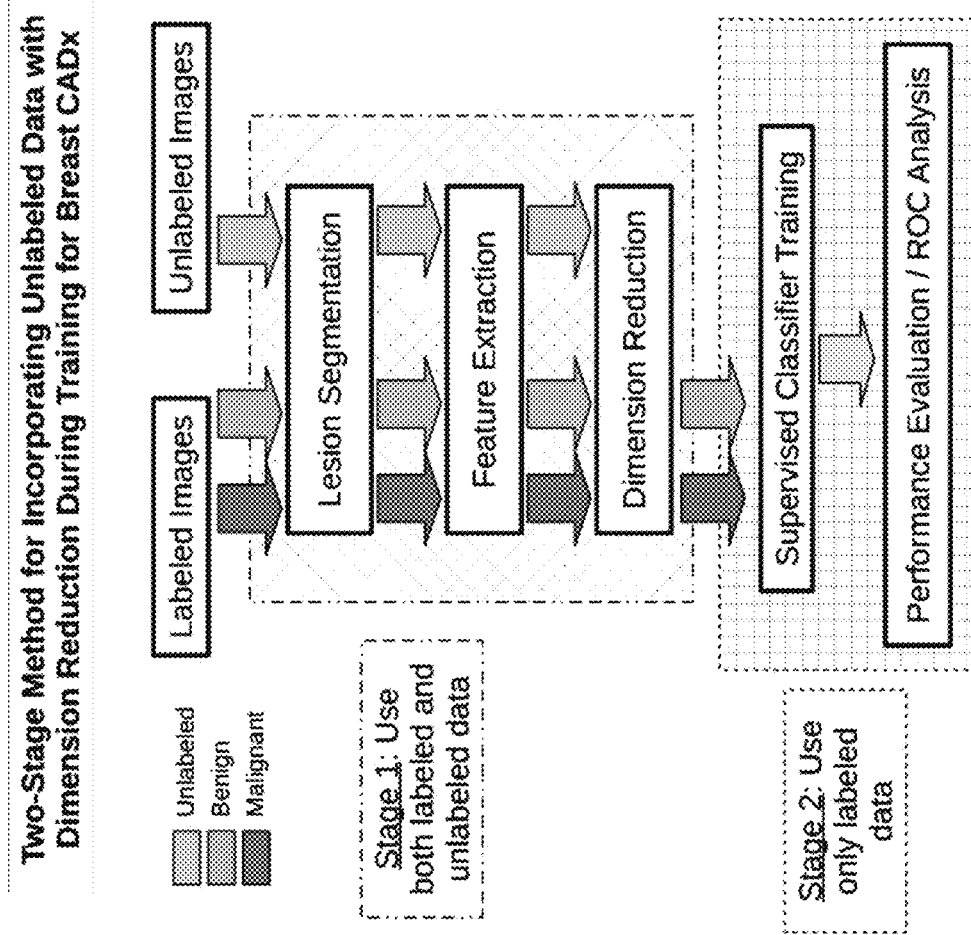
FIG. 25 illustrates an algorithmic process, by way of a flowchart, by way of a breast CADx algorithm for a two-stage process for incorporating unlabeled data with the use of dimension reduction.

Here, the use of unlabeled image data in the workstation interface is discussed. FIG. 24 illustrates a simplified example illustrating how the use of unlabeled data can improve CADx classifier regularization. The upper-left section displays a number of labeled samples from a hypothetical 2D feature space. The upper-right-hand section depicts the same data, plus unlabeled samples, which provide additional structural information, therefore altering the classifier and decision boundary. The lower section illustrates the class-conditional density functions of the classifier output decision variables obtained by applying the two trained classifiers as described above to the population. FIG. 25 demonstrates a breast CADx algorithm work flow outline illustrating a two-stage method for incorporating unlabeled data with the use of dimension reduction. Concerning FIGS. 24-25, see Jamieson A R, Giger M L, Drukker K, Pesce L, "Enhancement of breast CADx with unlabeled data," Medical Physics, 37: 4155-4172, 2010.

Figure 26:
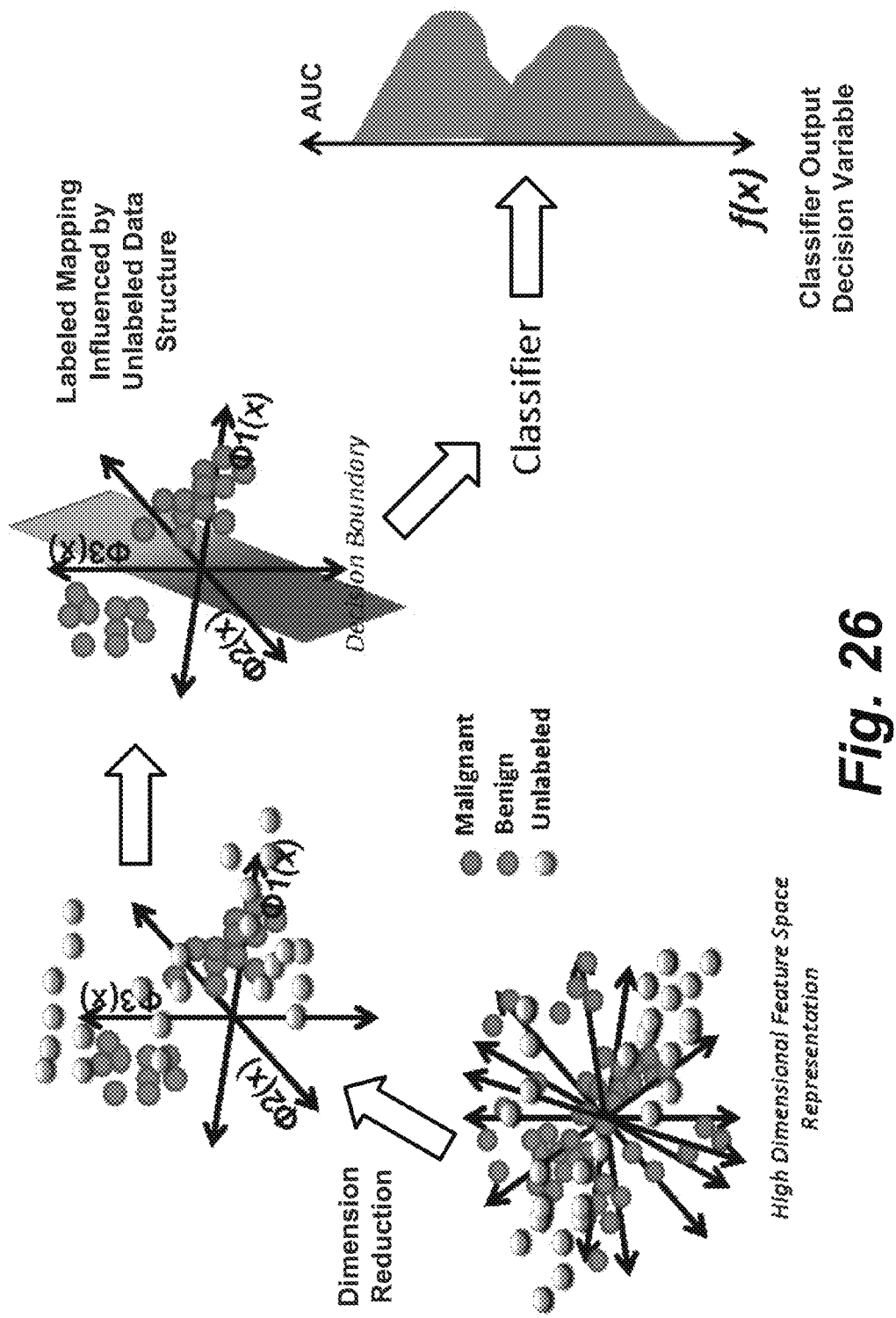
FIG. 26 is a schematic illustration of how unlabeled data (cases) can be included in an unsupervised dimension reduction prior to supervised training of the classifier with just the labeled cases.

FIG. 26 demonstrates schematically how unlabeled data (cases) can be included in the unsupervised dimension reduction prior to the supervised training of the classifier with just the labeled cases. Note that the "cloud" of labeled and unlabeled data (cases) can both be included in the interface of the workstation, similar to that shown in FIGS. 21-23.

Objective D

Another component of the workstation that can be chosen uses the dimension reduction of characteristics (features) of the lesion (tumor) as a means for conducting similarity searches based on linear and/or nonlinear dimension-reduction techniques to yield similar cases/images for presentation and use. The prior workstation discussed in U.S. Pat. Nos. 6,901,156 and 7,184,582, which are both incorporated herein by reference, note that choosing similar images can be incorporated into the interface to add in the interpretation of the unknown case as well as to contribution to the training of the radiologist users, since the similar cases included the histopathology information. Here, it is noted that the use of the dimension reduction can yield similar images by assessing how "close" the unknown case is (see FIGS. 21-23) to other cases in the reduced dimension space. This can be conducted in general either by only displaying those cases within a given Euclidean distance or radius, or by displaying a fixed number of cases. Note here for the retrieval of similar cases, only labeled cases might be used.

Figure 27:
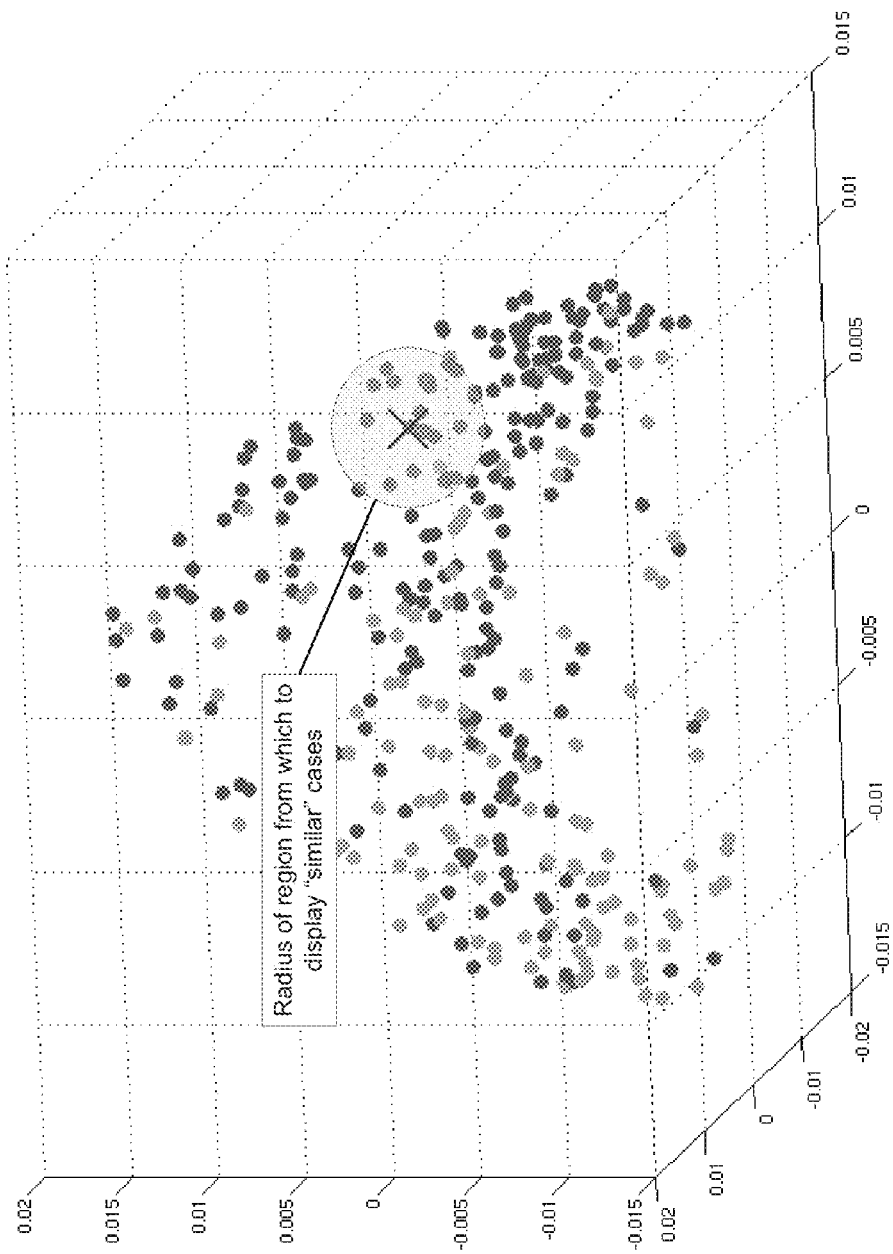
FIG. 27 is a graph of the data shown in FIG. 22, including a radius of region from which to display similar cases.

FIG. 27 illustrates how cases within a certain distance in the dimension-reduced space would be selected for displaying on the interface as "similar cases." In this example, a set radius is used to define the region as a sphere around the subject case. However, other methods could also be used. Note that if unlabeled cases were used in determining the dimension reduction mapping (i.e., from high dimension of features to lower dimension of pseudo features), those also could be shown as similar cases but they would be noted as being unlabeled.

The above-discussed drawing figures show the workings of the new breast cancer analysis workstation for image-based biomarkers (image-based phenotypes). Discussed below with references to FIGS. 28-47 are examples of characterizing a lesion in terms of individual lesion features (size/volumetrics/surface area, morphological, kinetics), of probability of malignancy, types of prognostic indicators (invasiveness, lymph node involvement, tumor grade, although others can be used such as HER2neu, etc., response to therapy), probability color maps, and dimension reduction displays.

Figure 28:
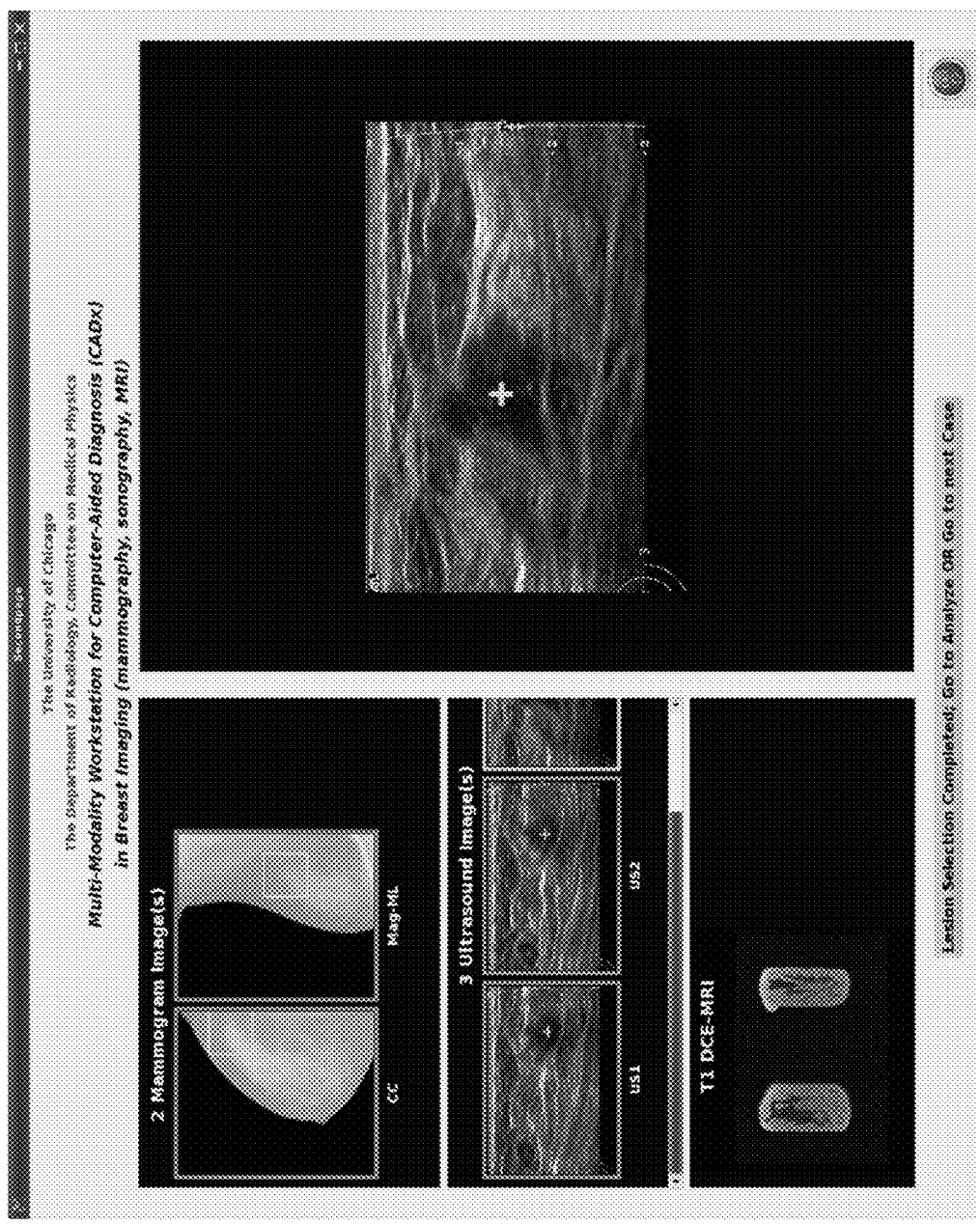
FIGS. 28-47 are screenshots showing examples of characterizing a lesion in terms of individual lesion features (both kinetic and morphological or only kinetic) of probability of malignancy.
Figure 29:
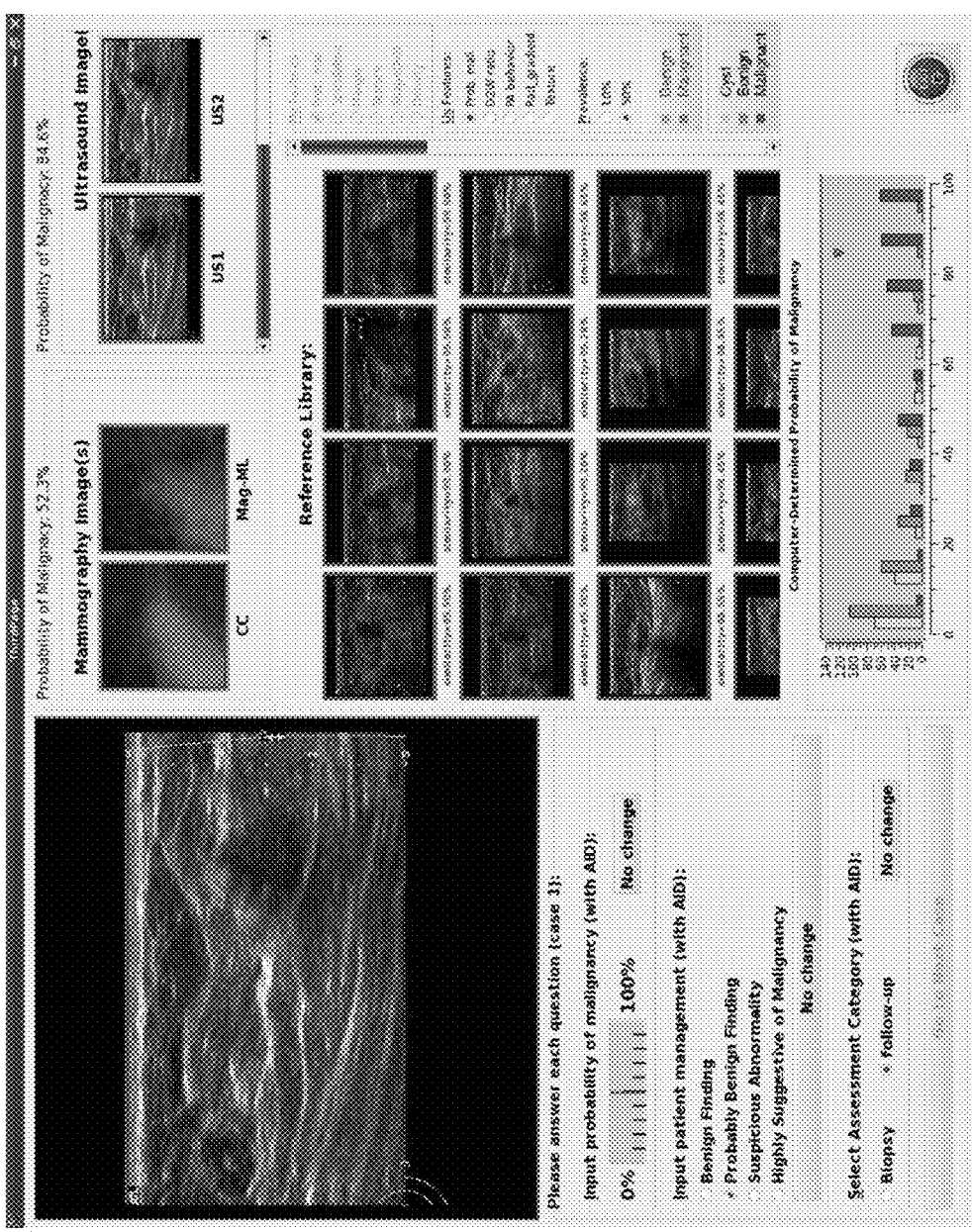

FIG. 28 is an entry screenshot for a user to select lesions for analysis on Mammography, Sonography, and/or MRI. FIG. 29 is an output screenshot showing a probability of malignancy, similar cases, and a histogram of known cases with an arrow indicating the output on the unknown case (i.e., the case in question, the case being interpreted).

Figure 30:
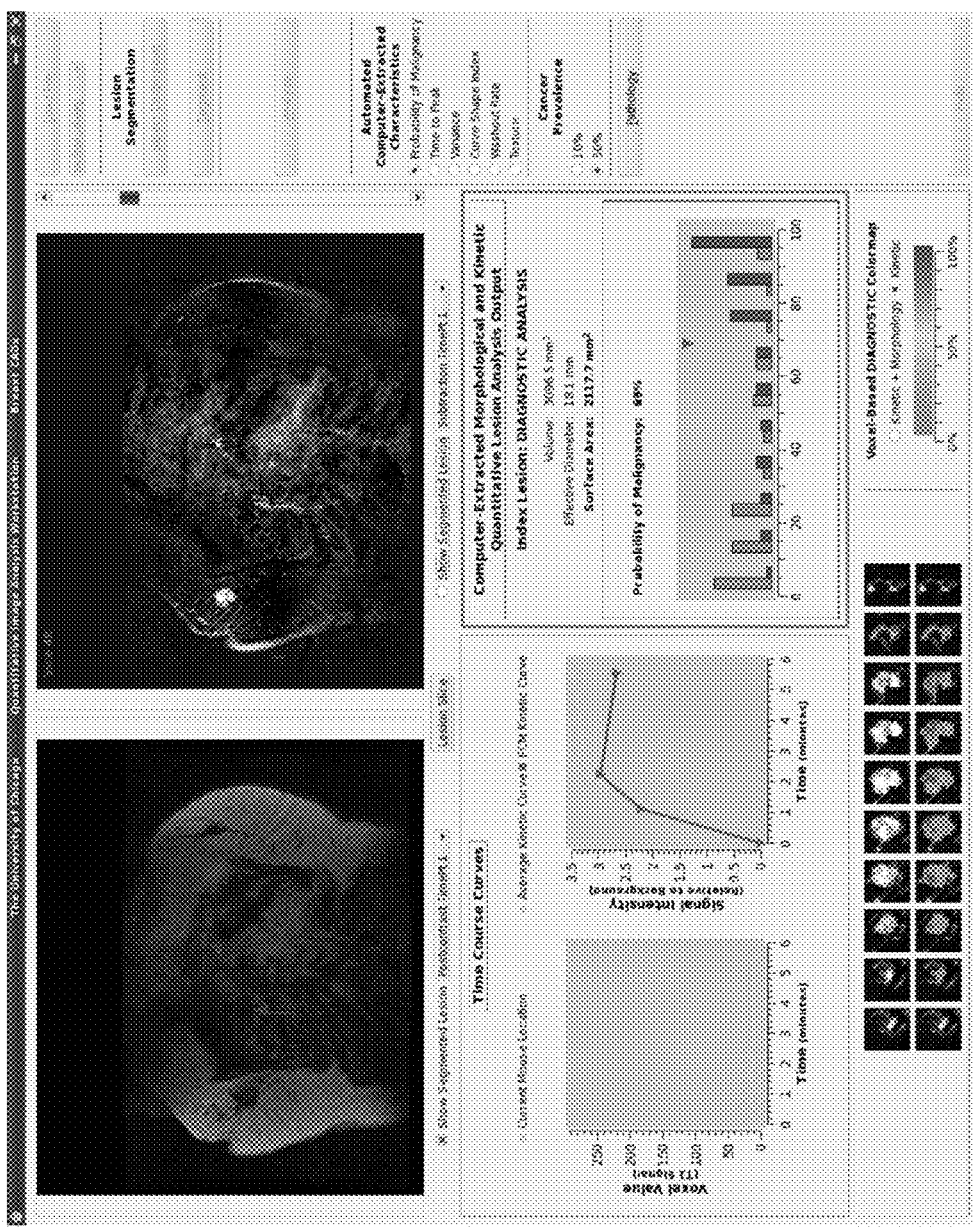

FIG. 30 is a screenshot a CADx output on the MRI images. One can scroll through the slices, chose subtracted or unsubtracted images, chose whether or not to see the computer determined lesion margin outline, and window/level. Beside the histogram, a voxel-based diagnostic color map (along with the modified heat scale) is shown for kinetic features only for this malignant case (a 50% cancer prevalence).

Figure 31:
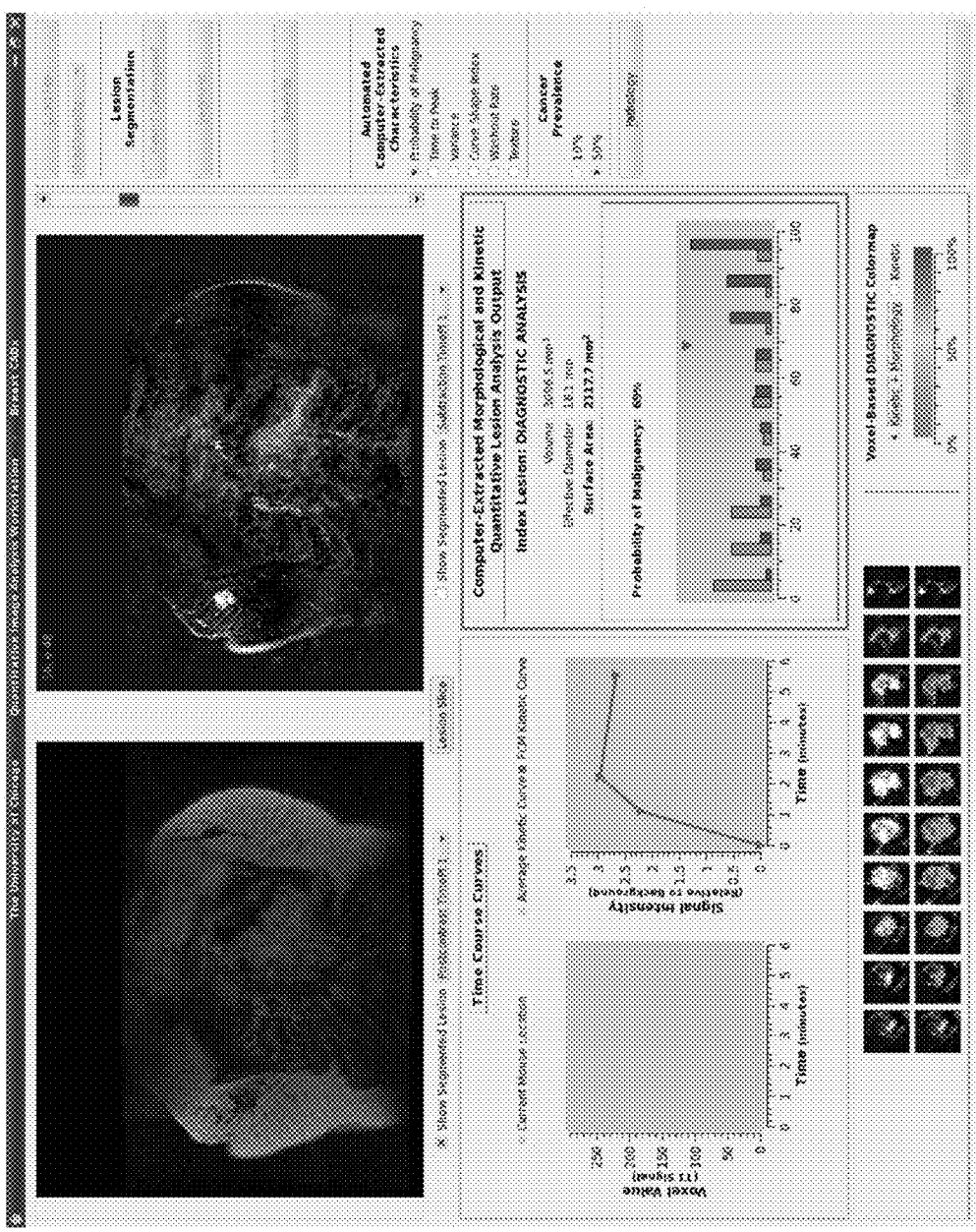
Figure 32:
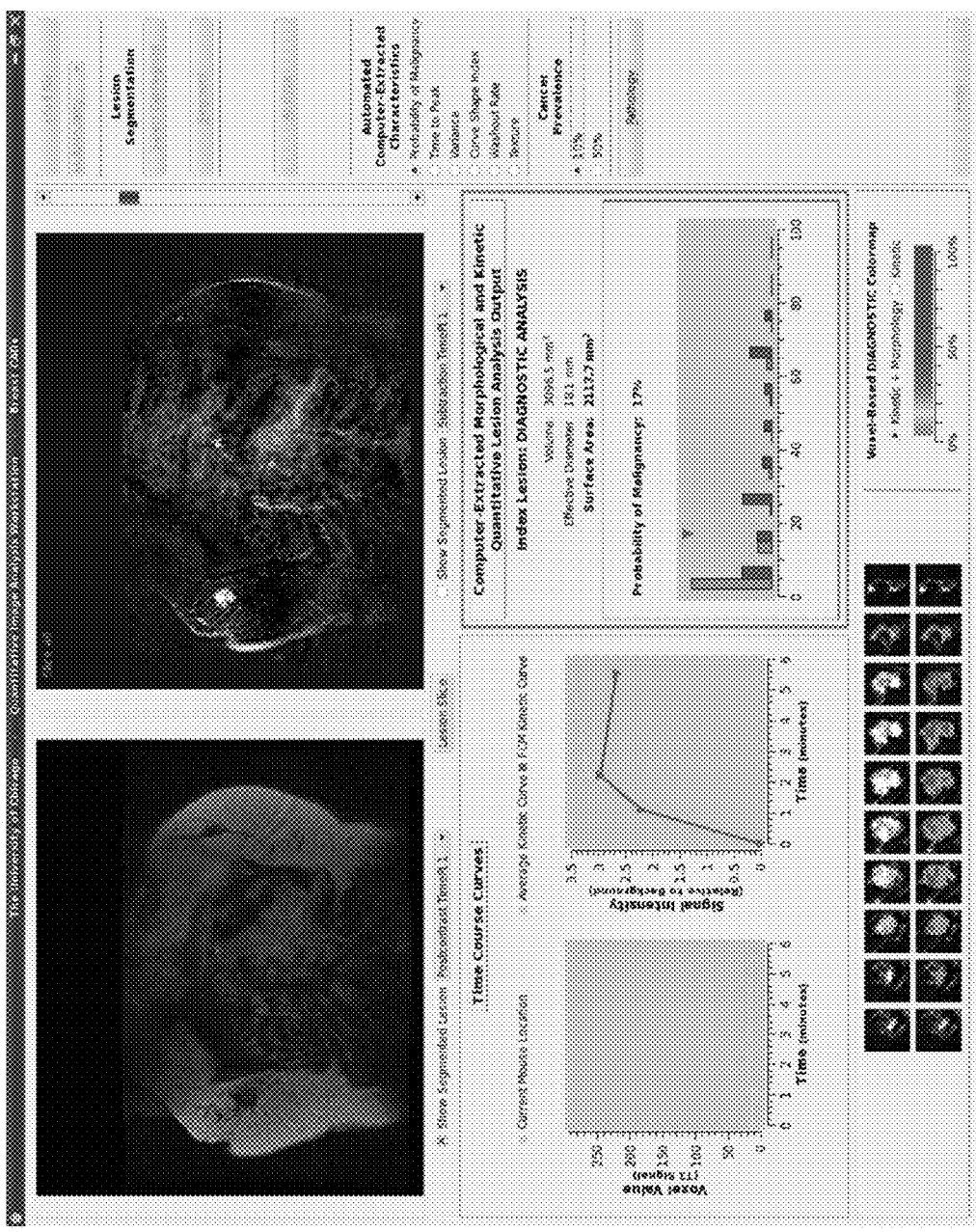

In FIG. 31, beside the histogram, a voxel-based diagnostic color map is shown for both morphological and kinetic features for this malignant case (50% cancer prevalence setting). In FIG. 32, beside the histogram, the voxel-based diagnostic color map is shown for both morphological and kinetic features for this malignant case (10% cancer prevalence setting).

Figure 33:
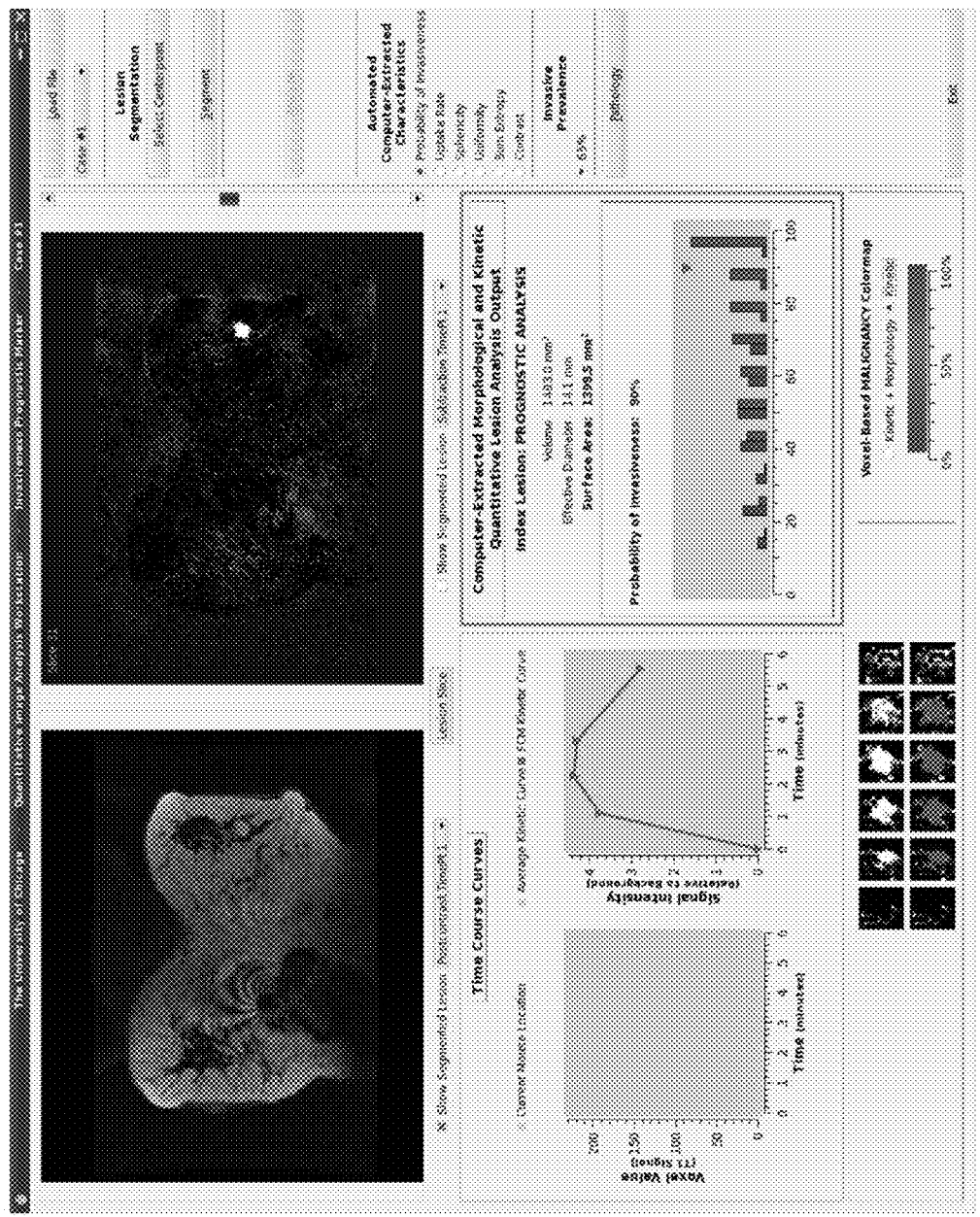
Figure 34:
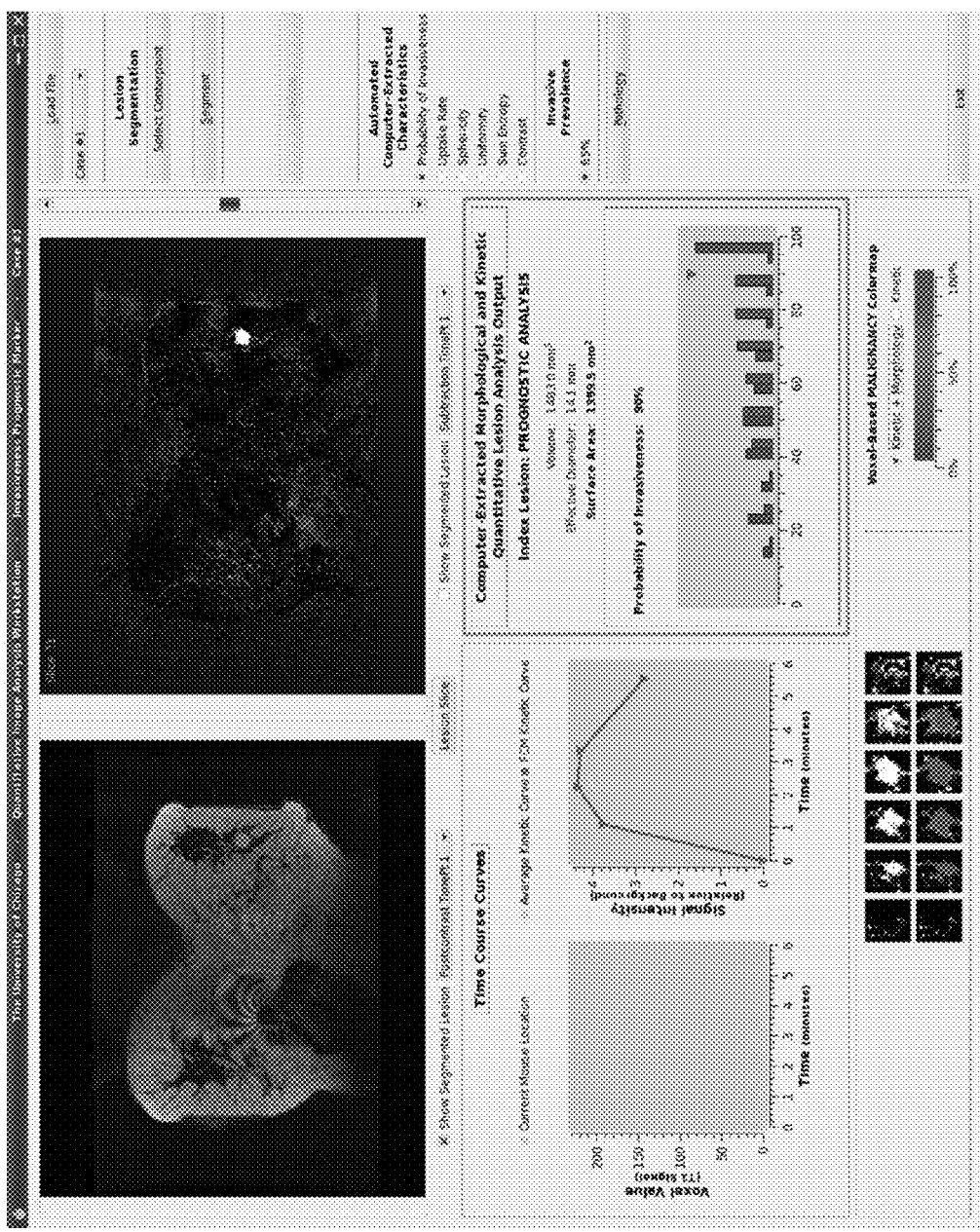

FIG. 33 is a screenshot showing a computer-aided/quantitative image analysis prognostic output on the MRI images for probability of invasiveness. One can scroll through the slices, chose subtracted or unsubtracted images, chose whether or not to see the computer determined lesion margin outline, and window/level. Beside the histogram, a voxel-based diagnostic color map is shown for only kinetic features for this invasive case. In FIG. 34, beside the histogram, the voxel-based diagnostic color map is shown for both morphological and kinetic features for this invasive case.

Figure 35:
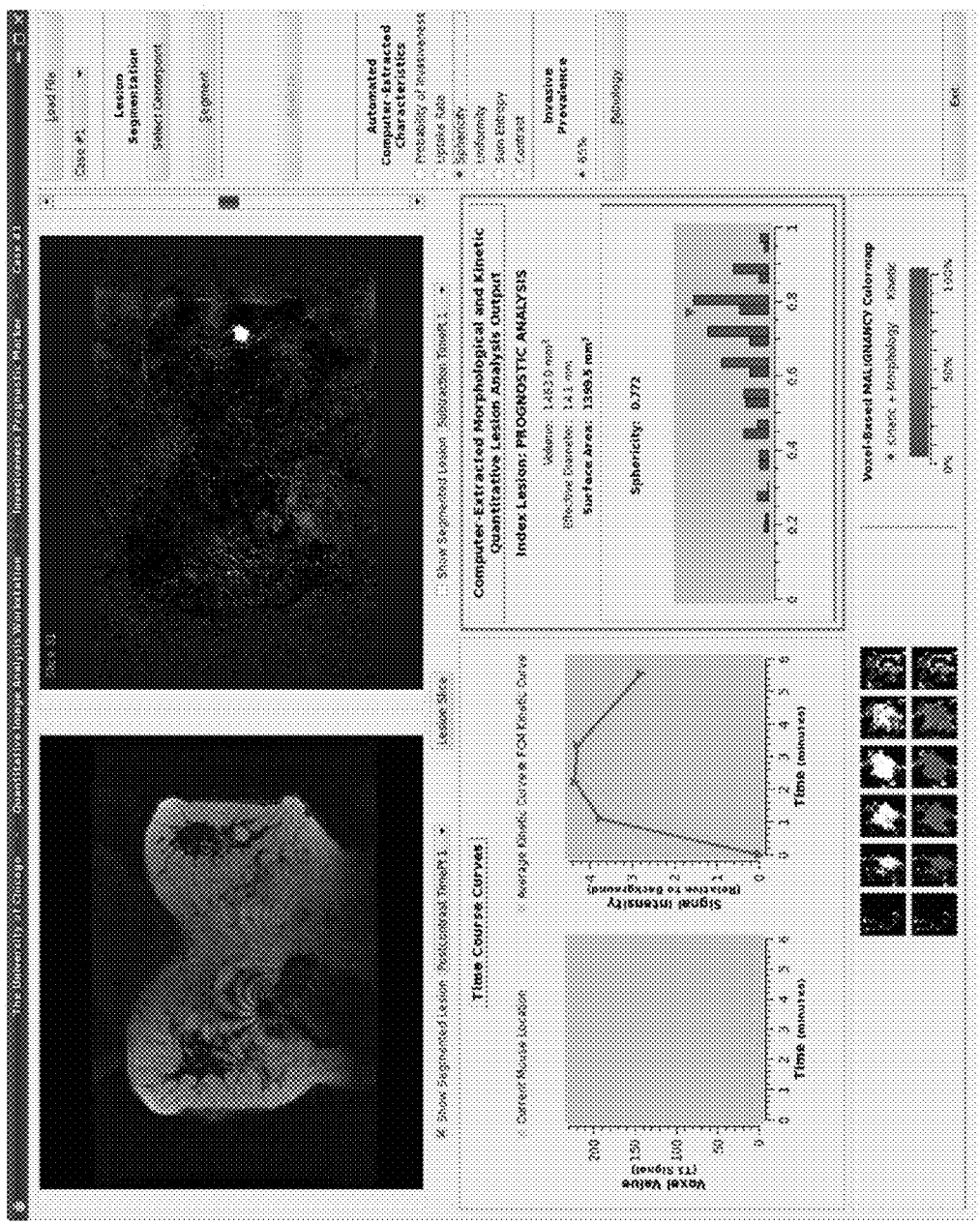

FIG. 35 is a screenshot showing a computer-aided/quantitative image analysis sphericity feature on the MRI images. One can scroll through the slices, chose subtracted or unsubtracted images, chose whether or not to see the computer determined lesion margin outline, and window/level. Beside the histogram, a voxel-based diagnostic color map is shown for both morphological and kinetic features for this invasive case.

Figure 36:
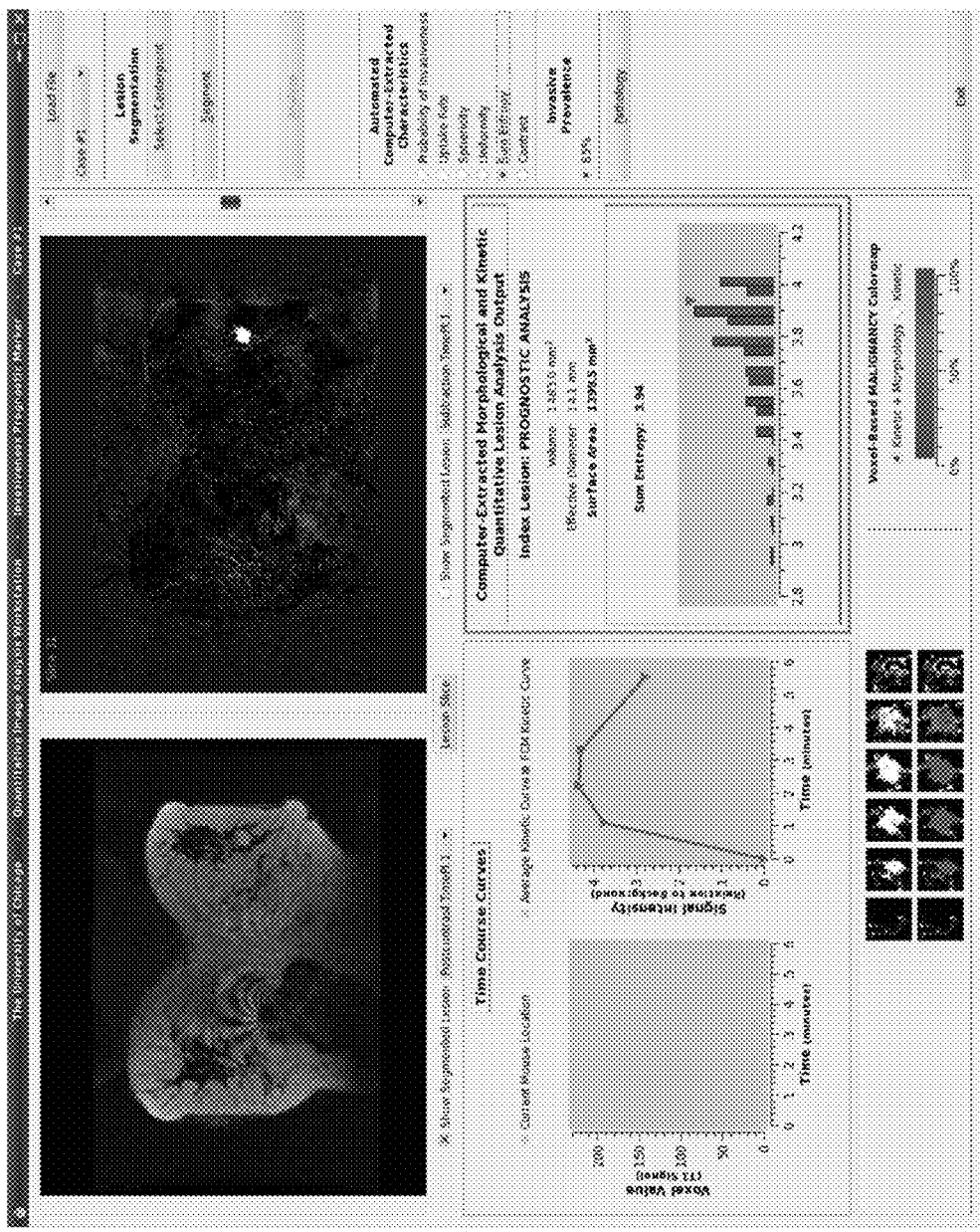
Figure 37:
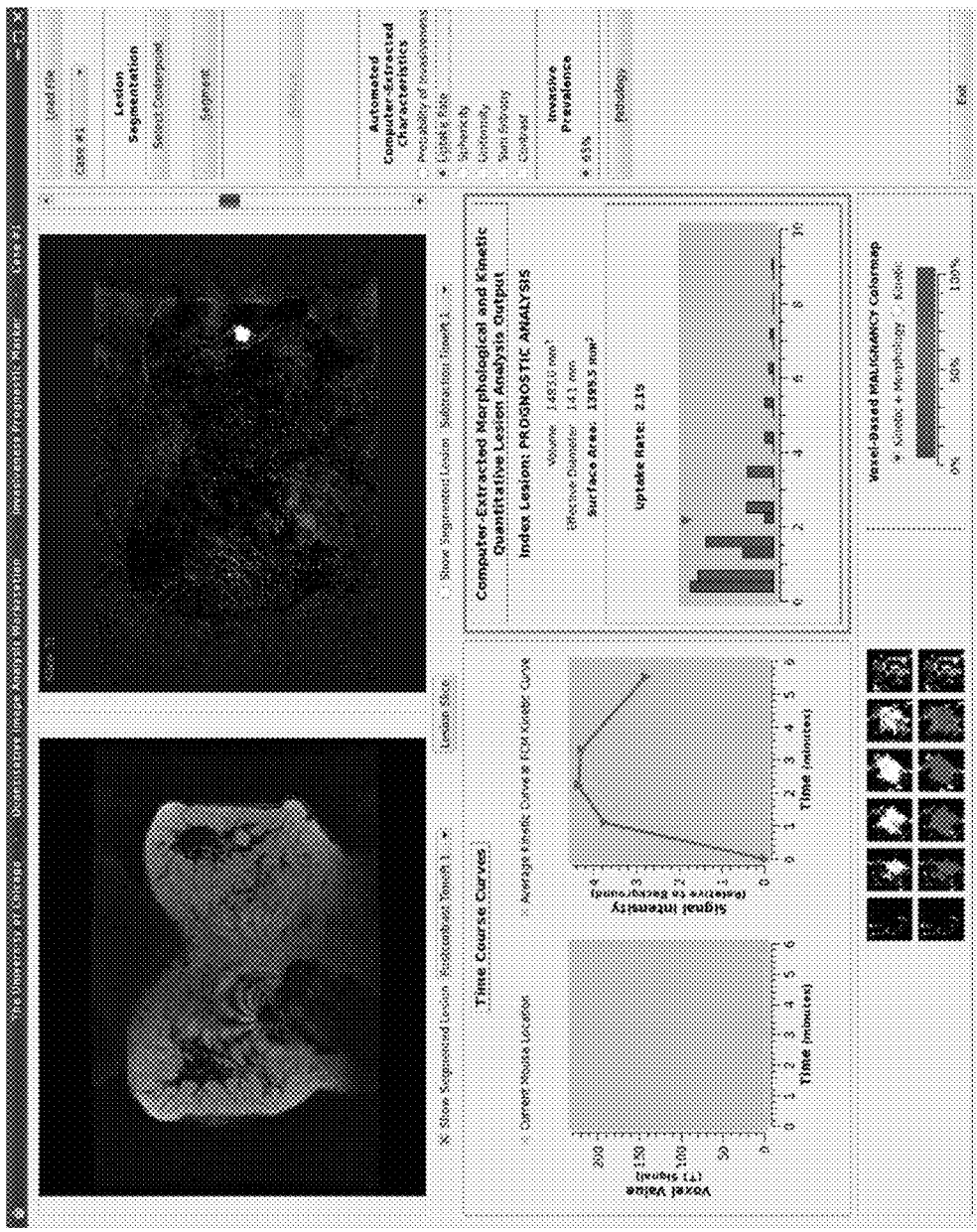
Figure 38:
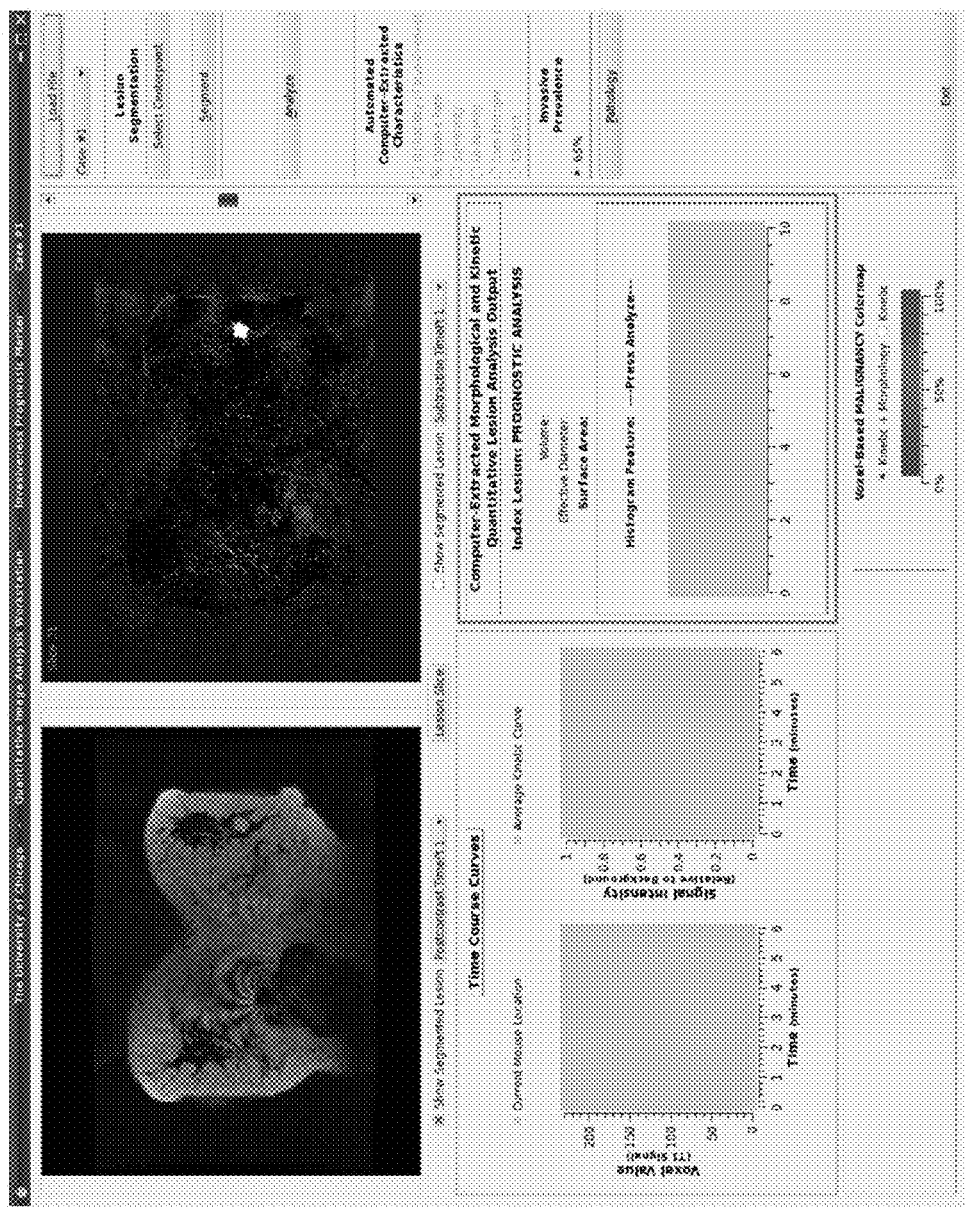

FIG. 36 is similar to FIG. 35, but is directed to a computer-aided/quantitative image analysis sum entropy texture features on the MRI images. Likewise, FIG. 37 is directed to a computer-aided/quantitative image analysis uptake kinetic feature on the MRI images. FIG. 38 shows a pre-analysis page for an invasive case with respect to FIGS. 33-47.

Figure 39:
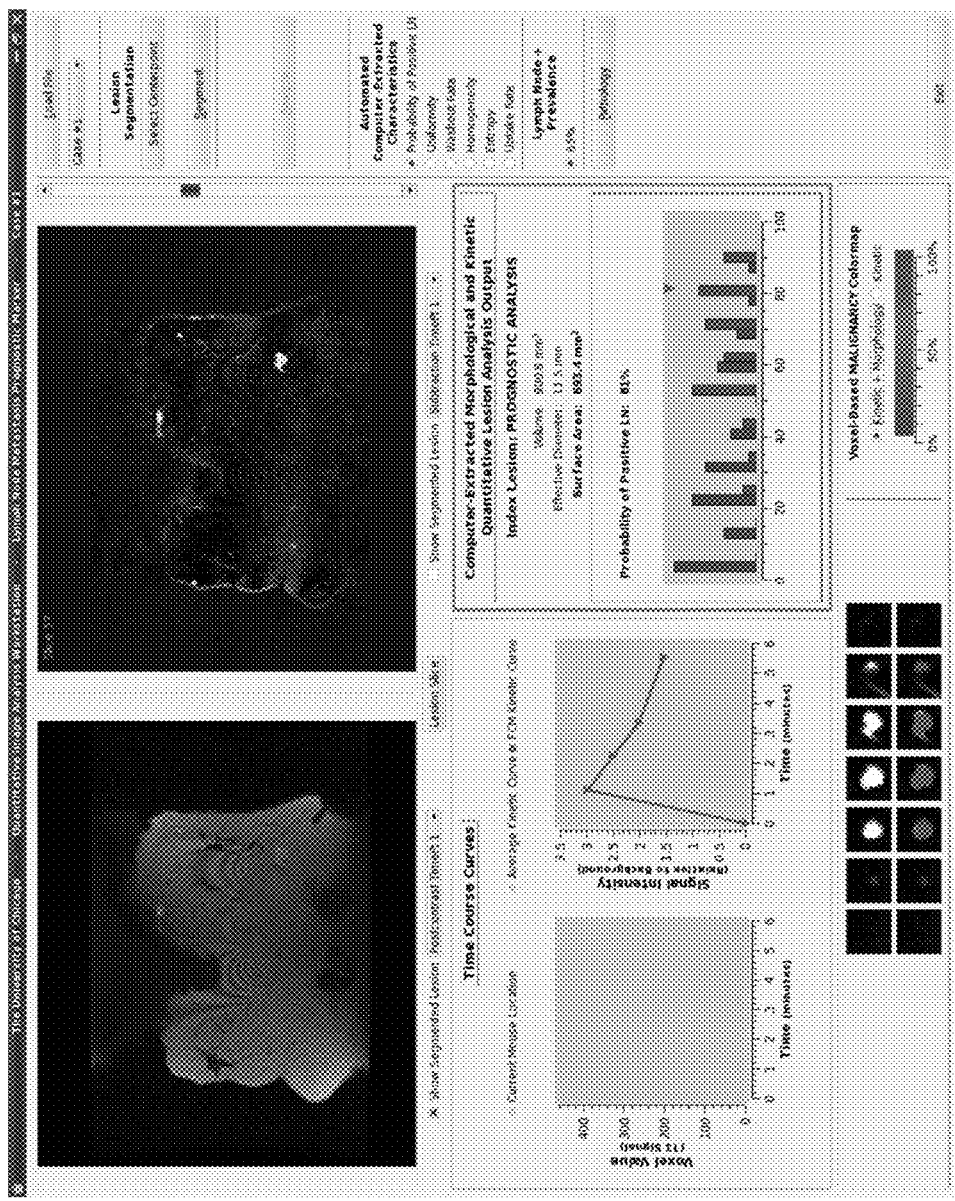
Figure 40:
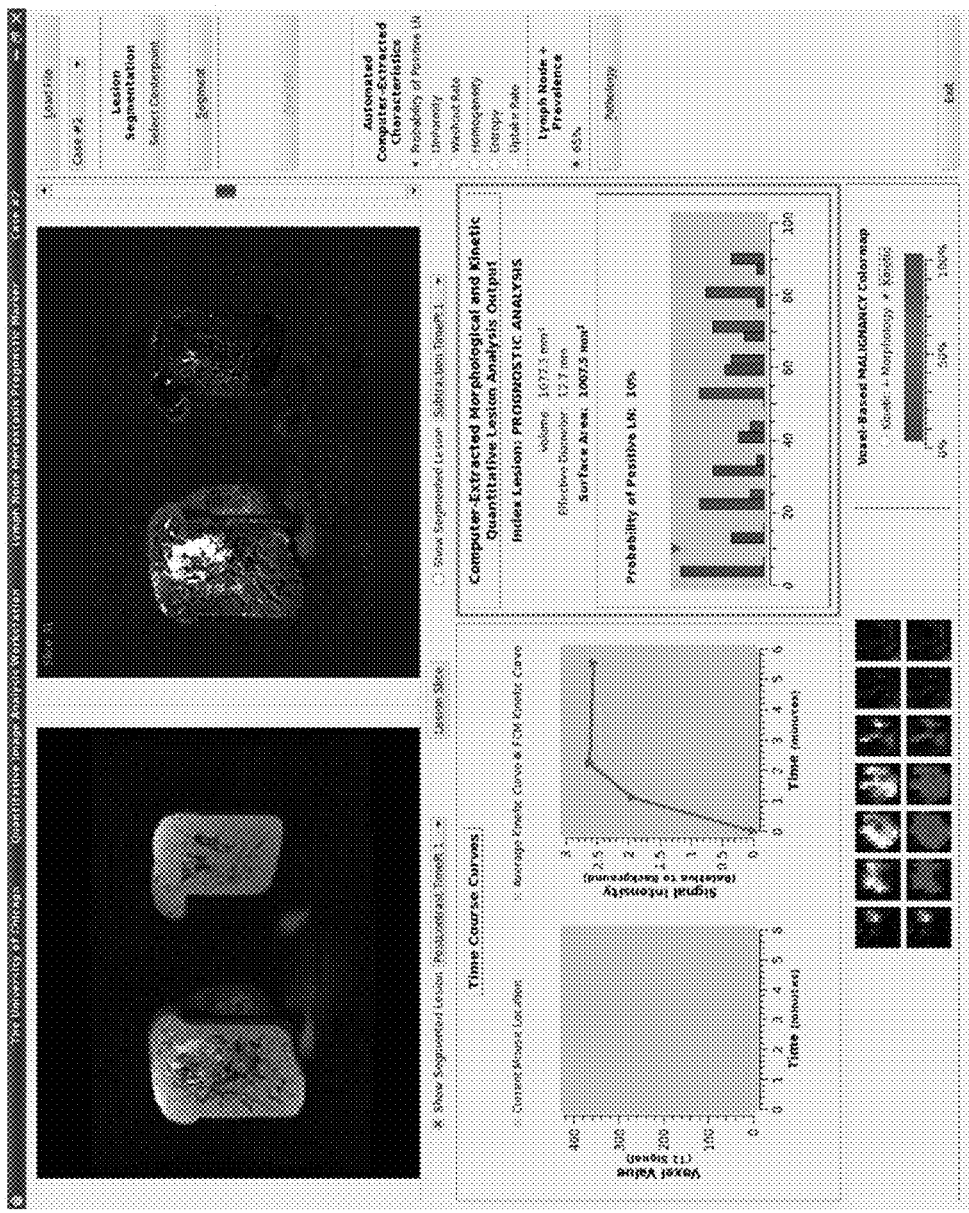

FIG. 39 is a screenshot of a computer-aided/quantitative image analysis prognostic output on the MRI images for probability of presence of a positive lymph. One can scroll through the slices, chose subtracted or unsubtracted images, chose whether or not to see the computer determined lesion margin outline, and window/level. Beside the histogram, the voxel-based diagnostic color map is shown for both morphological and kinetic features for this case. FIG. 40 is directed to only the kinetic features.

Figure 41:
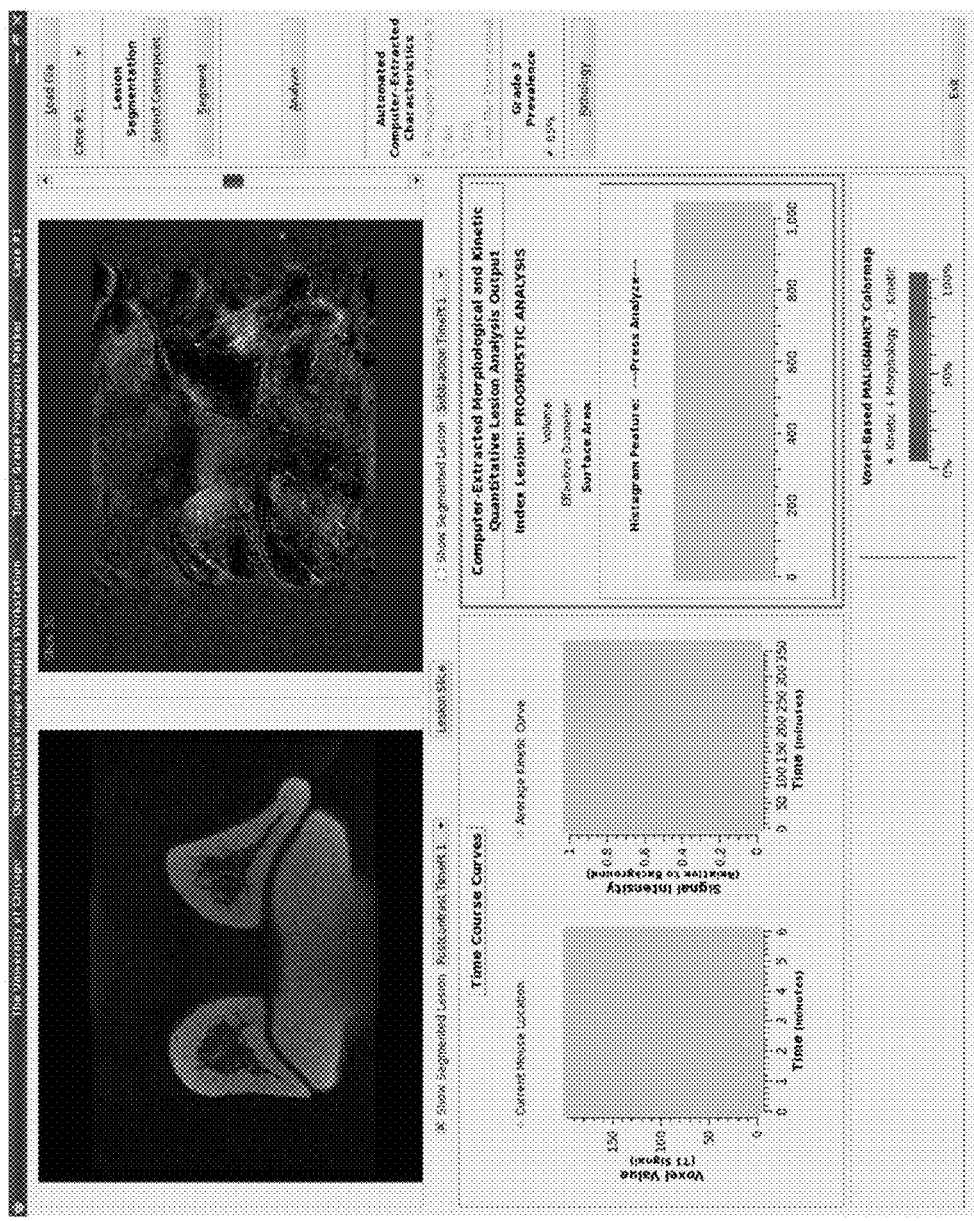
Figure 42:
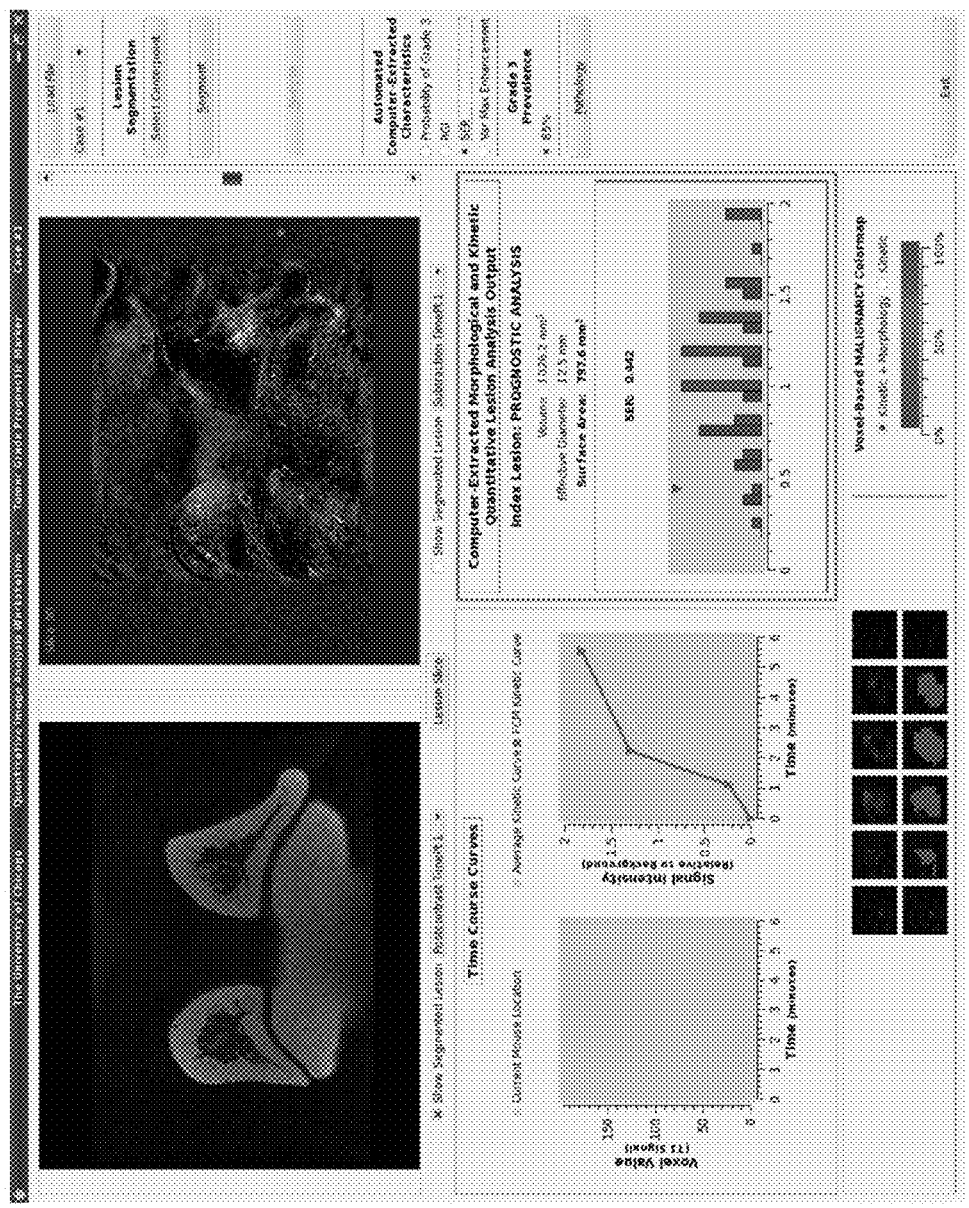
Figure 43:
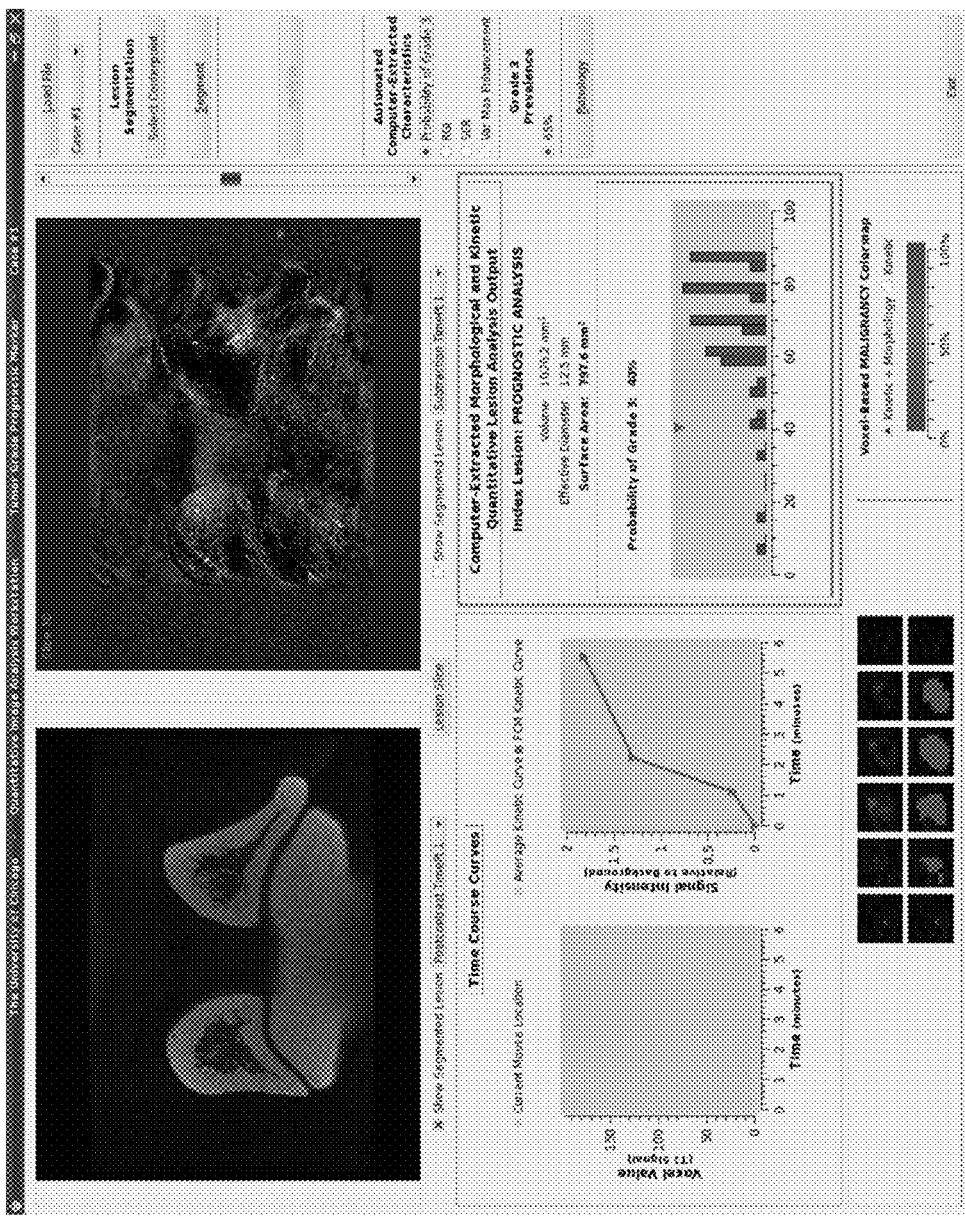

FIG. 41 illustrates a pre-analysis page for the invasive case in FIGS. 42-43. FIG. 42 is a screenshot showing a computer-aided/quantitative image analysis prognostic output on the MRI images for SER feature. One can scroll through the slices, chose subtracted or unsubtracted images, chose whether or not to see the computer determined lesion margin outline, and window/level. Beside the histogram, a voxel-based diagnostic color map is shown for both morphological and kinetic features for this case. FIG. 43 shows the probability of being Grade 3.

Figure 44:
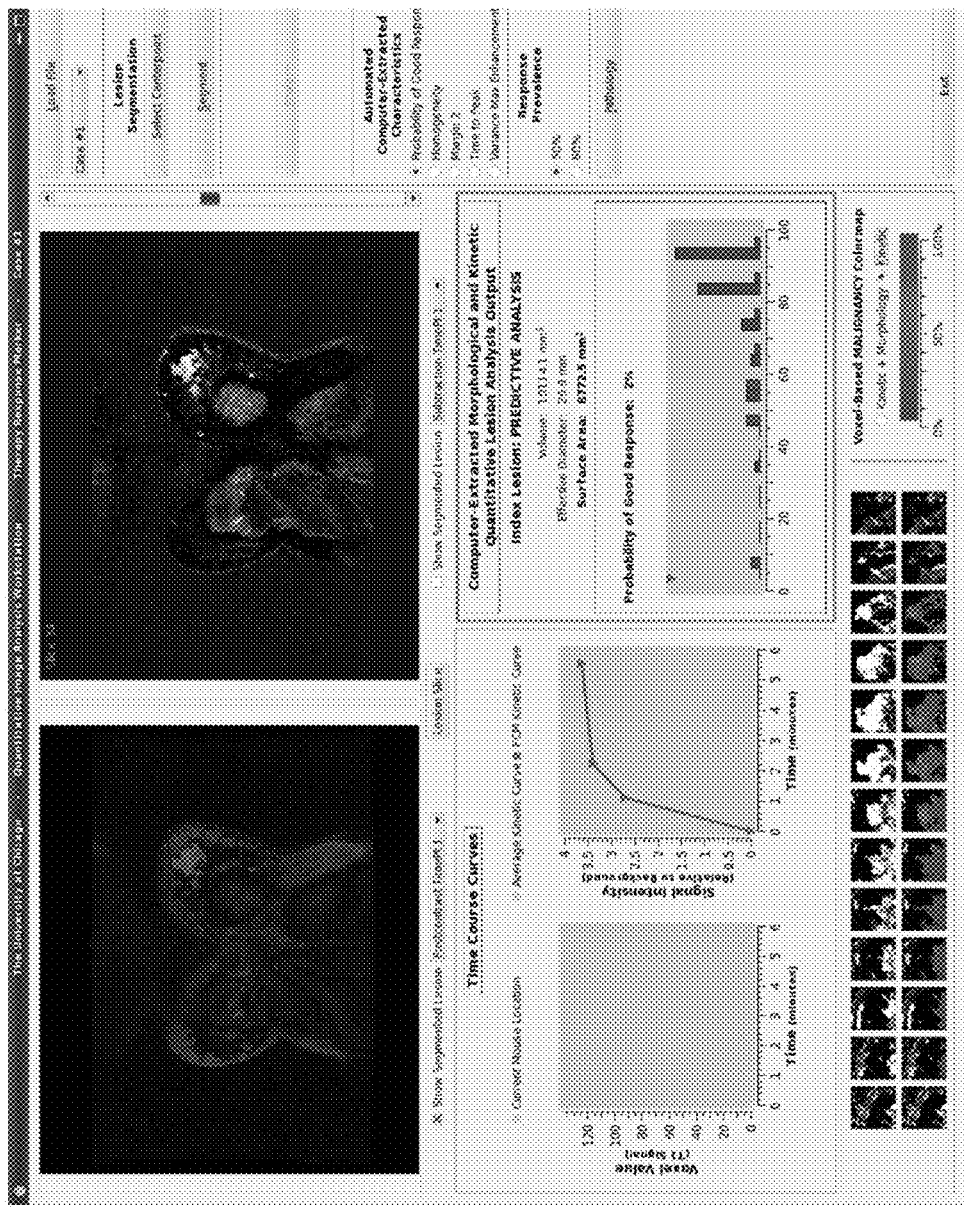
Figure 45:
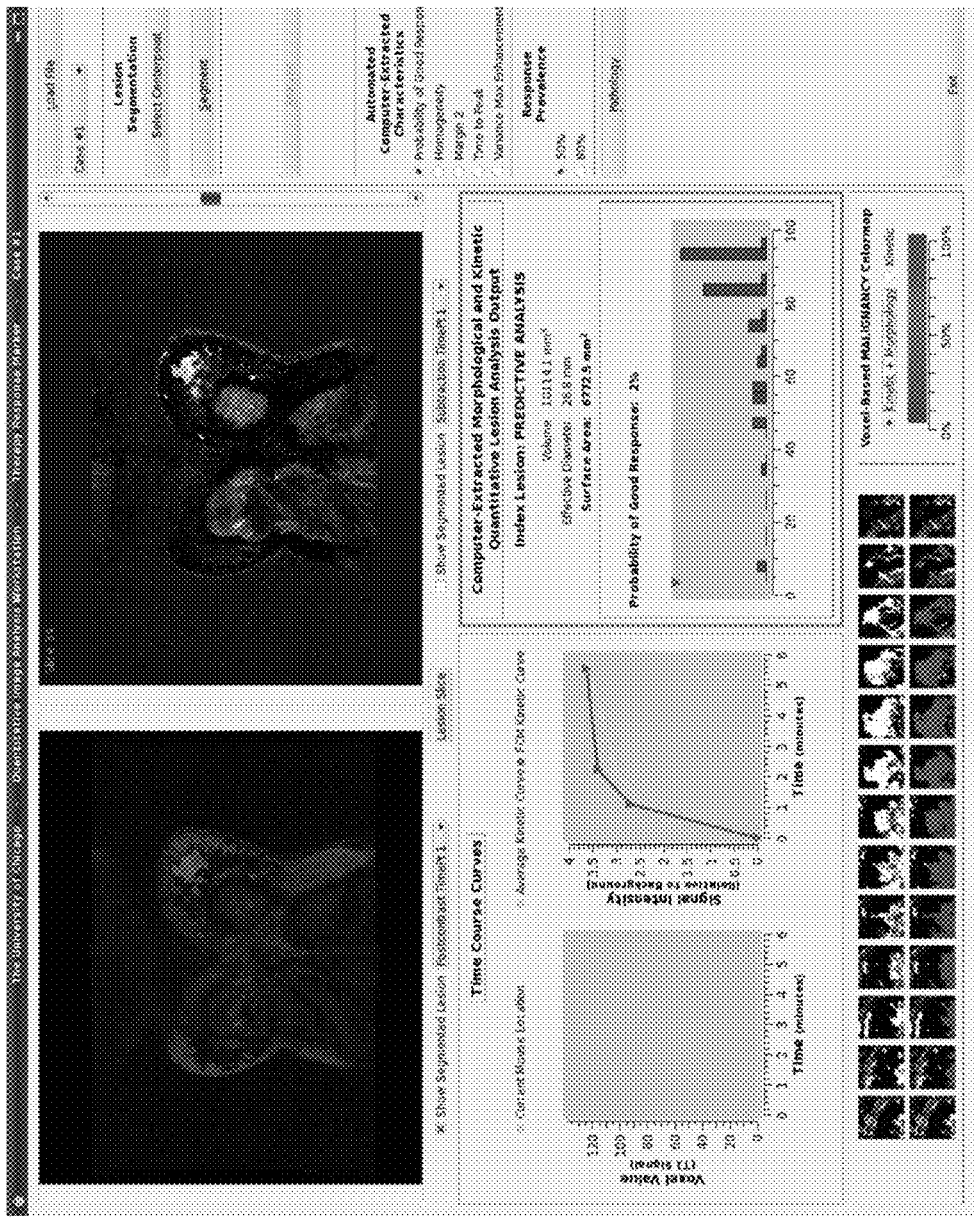

FIG. 44 is a screenshot showing a computer-aided/quantitative image analysis predictive output on the MRI images for probability of good response. One can scroll through the slices, chose subtracted or unsubtracted images, chose whether or not to see the computer determined lesion margin outline, and window/level. Beside the histogram, a voxel-based diagnostic color map is shown for only kinetic features for this case. FIG. 45 is directed to both morphological and kinetic features for this case showing good response.

Figure 46:
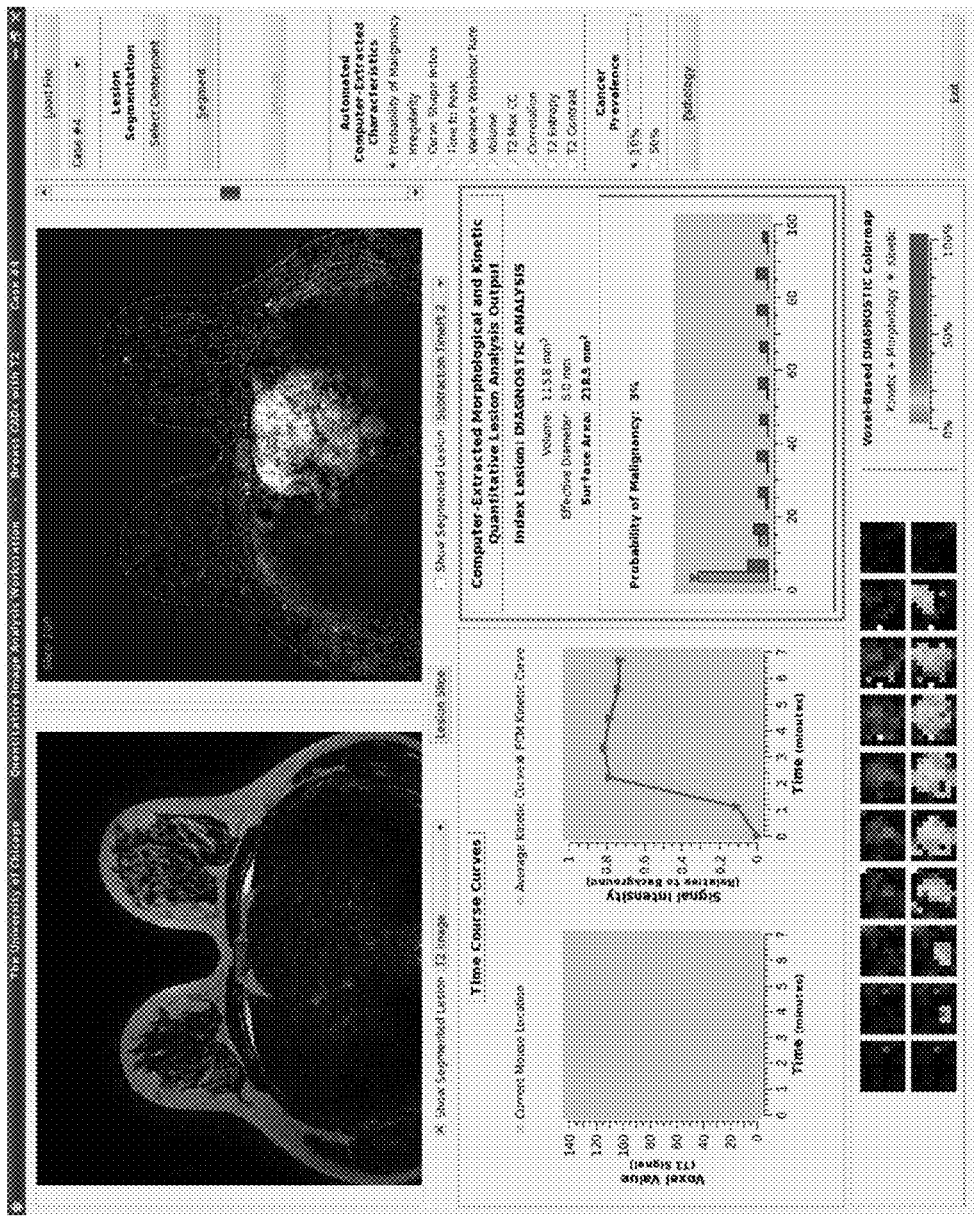
Figure 47:
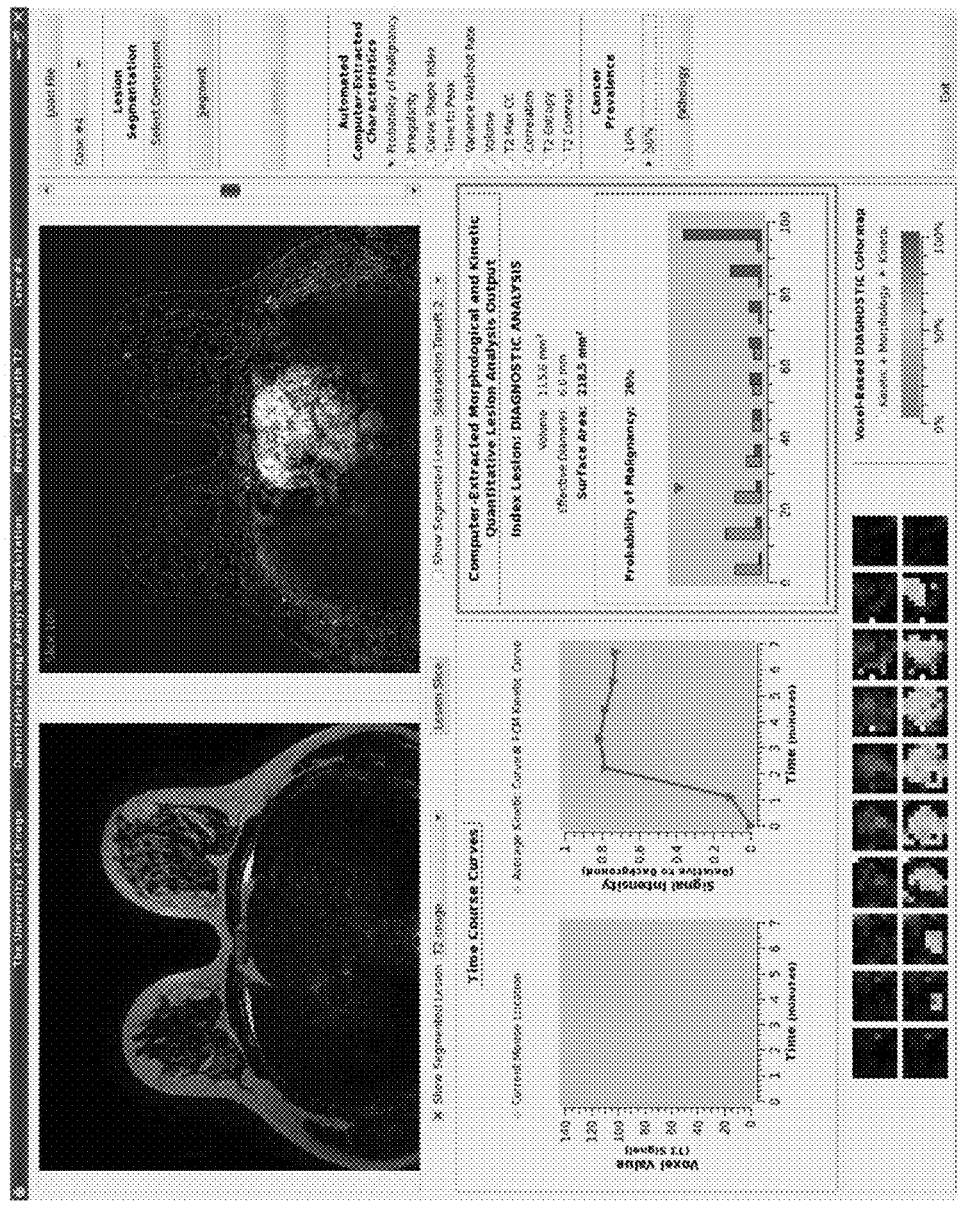

FIG. 46 is a screenshot of a CADx output on the MRI images. However, here the kinetic features come from the T1 (DCE-MRI) and the morphlogical texture features are calculated from both T1 and T2 images. The DCE T1 image is on the left and the T2 image is on the right. One can scroll through the slices, chose subtracted or unsubtracted images, chose whether or not to see the computer determined lesion margin outline, and window/level. Beside the histogram, the voxel-based diagnostic color map (along with the modified heat scale) is shown for kinetic features only for this malignant case (10% cancer prevalence). FIG. 47 illustrates, beside the histogram, the voxel-based diagnostic color map (along with the modified heat scale) shown for kinetic features only for this malignant case (50% cancer prevalence).

Figure 22:
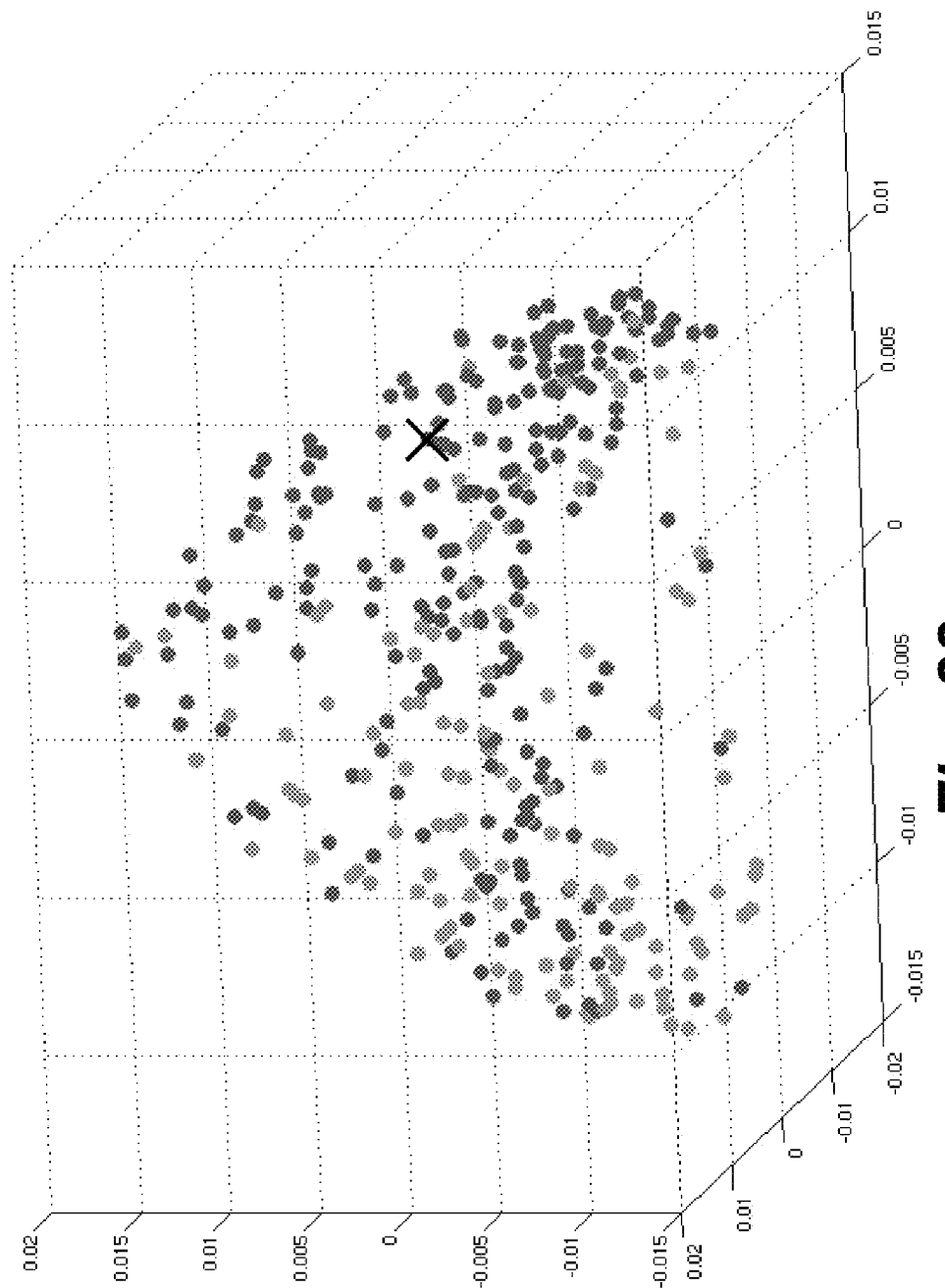
Figure 23:
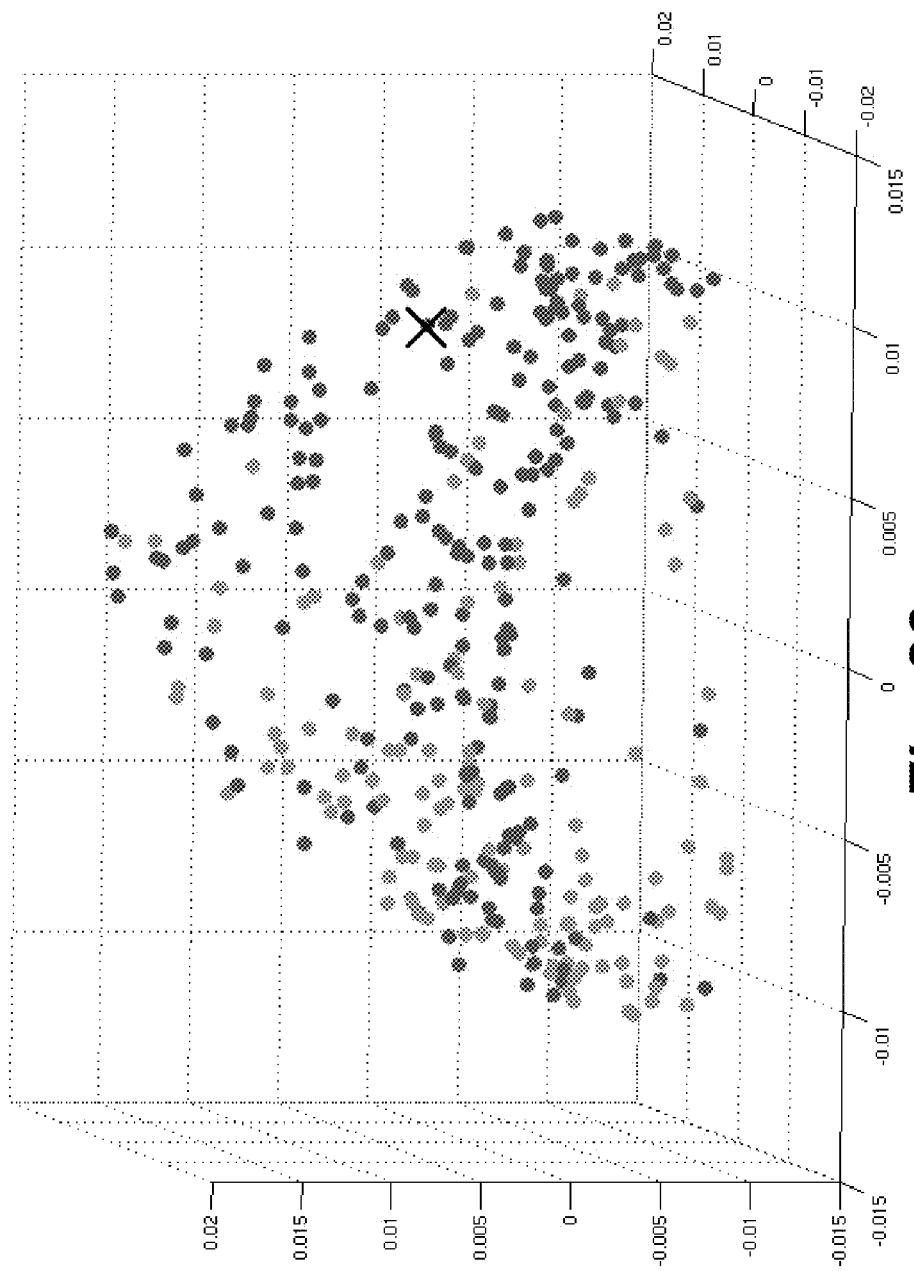

The time-course plots shown in FIGS. 28-47 can also include the 2D and 3D plots similar to those shown in FIGS. 21-23, where a user can rotate between views. Also, a radius of interest (sphere or circle depending on dimension of plot) can be added consistent with FIG. 27 to identify similar cases.

FIG. 48 illustrates a schematic diagram for a system for incorporating the new interface/workstation into a medical task of diagnosis, prognosis, or response to therapy. Initially, a means or system for acquiring the image data or patient information data is provided (imaging unit). This could be a mammographic unit, for example, which can be connected to the workstation via a network, through a network connection, or as a peripheral through a data terminal connection. The medical image/data information is then analyzed by a computer to yield a probability that a particular disease is present (e.g., breast cancer) by a computerized analysis circuit (workstation). An output device (display) is used as an option to display the computer-determined probability of disease state. Volumetrics of the lesion can also be displayed via the output device. It should be appreciated the imaging unit can also be embodied as a database of stored images or medical data, which is processed in accordance with the above-presented algorithms.

Accordingly, embodiments according to this disclosure include an automated method and system that employs/incorporates volumetrics and surface area, kinetic/probability color maps, dimensional reduction, and additional similarity measures for use in the computer-assisted interpretation of medical images based on computer-estimated likelihood of a pathological state, e.g., malignancy, prognosis, and/or response to therapy. Upon viewing an unknown case, the user has the options to view few or all of these features.

It should be noted that although the method is presented on breast image data sets, the intelligent workstation can be implemented for other medical images (such as chest radiography, magnetic resonance imaging, etc.) in which a computerized analysis of image or lesion features is performed with respect to some disease state, including response to treatment.

Additionally, embodiments according to this disclosure may be implemented using a conventional general purpose computer or micro-processor programmed according to the teachings of this disclosure, as will be apparent to those skilled in the computer art. Appropriate software can be readily prepared based on the teachings herein, as should be apparent to those skilled in the software art. In particular, the workstation described herein can be embodied as a processing system according to FIG. 49, and can include a housing may house a motherboard that contains a CPU, memory (e.g., DRAM, ROM, EPROM, EEPROM, SRAM, SDRAM, and Flash RAM), and other optional special purpose logic devices (e.g., ASICS) or configurable logic devices (e.g., GAL and reprogrammable FPGA). The computer also includes plural input devices, (e.g., keyboard and mouse), and a display controller for controlling output to a monitor. A network interface is also provided for communication via a network, such as the Internet or an intranet. In such aspects, communication between an imaging device (or an image database) can be performed via the network, or via an input/output interface (such as a USB or other data transfer connection).

Additionally, the computer may include a floppy disk drive; other removable media devices (e.g. compact disc, tape, and removable magneto-optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus. These components can be controlled by a disk controller.

Examples of computer readable media associated with this disclosure include compact discs, hard disks, floppy disks, tape, magneto-optical disks, PROMs (e.g., EPROM, EEPROM, Flash EPROM), DRAM, SRAM, SDRAM, etc. Stored on any one or on a combination of these computer readable media, the present invention includes software for controlling both the hardware of the computer and for enabling the computer to interact with a human user. Such software may include, but is not limited to, device drivers, operating systems and user applications, such as development tools. Computer program products according to this disclosure include any computer readable medium which stores computer program instructions (e.g., computer code devices) which when executed by a computer causes the computer to perform the method of the present invention. The computer code devices of this disclosure may be any interpretable or executable code mechanism, including but not limited to, scripts, interpreters, dynamic link libraries, Java classes, and complete executable programs. Moreover, parts of the processing of this disclosure may be distributed (e.g., between (1) multiple CPUs or (2) at least one CPU and at least one configurable logic device) for better performance, reliability, and/or cost. For example, an outline or image may be selected on a first computer and sent to a second computer for remote diagnosis, utilizing network connections and the Internet.

Aspects of this disclosure may also be implemented by the preparation of application specific integrated circuits or by interconnecting an appropriate network of conventional component circuits, as will be readily apparent to those skilled in the art.

Numerous modifications and variations of the present invention are possible in light of the above teachings. It is therefore to be understood that within the scope of the appended claims, the invention may be practiced otherwise than as specifically described herein.

The invention claimed is:

1. A non-transitory computer-readable medium storing thereon executable instructions, that when executed by a computer, cause the computer to execute a process for determining a probability of a disease state of a patient, the process comprising:
   obtaining medical data including at least one of a medical image, medical image data, and data representative of a clinical examination of the patient, the medical data including data points for a lesion which are spatially and temporally indexed;
   reducing the spatially and temporally indexed data points to remove the temporal indexing and to obtain a kinetic curve for each data point;
   extracting kinetic features of the lesion from each kinetic curve; and
   displaying the extracted kinetic features.

2. The non-transitory computer-readable medium according to claim 1, wherein the displaying includes displaying the kinetic features as a color map.

3. The non-transitory computer-readable medium according to claim 2, wherein the color map is a washout feature map, and the process further includes:
   calculating, by a fractal dimension lesion descriptor, an information dimension and a correlation dimension for the color map.

4. The non-transitory computer-readable medium according to claim 3, the process further comprising:
   displaying the information dimension and the correlation dimension for the color map with other information dimensions and correlation dimensions of other labeled lesions using lesion-specific normalization.

5. The non-transitory computer-readable medium according to claim 4, wherein the correlation dimensions are of fitted time to peak maps.

6. The non-transitory computer-readable medium according to claim 1, wherein each data point is a voxel, and each voxel has one of the kinetic curves.

7. The non-transitory computer-readable medium according to claim 6, wherein the extracting includes performing a texture analysis across the voxels, each representing a particular feature from each kinetic curve.

8. The non-transitory computer-readable medium according to claim 1, the process further comprising:
   extracting morphological features of the lesion from the data points;
   calculating volumetrics of the lesion from the extracted morphological features; and
   displaying the calculated volumetrics together with the extracted kinetic features.

9. The non-transitory computer-readable medium according to claim 8, wherein:
the data points are voxels which are spatially indexed,
the calculating the volumetrics of the lesion includes segmenting the lesion by identifying the voxels which constitute the lesion, and calculating a volume of the lesion by using volumes of the identified voxels.

10. The non-transitory computer-readable medium according to claim 9, wherein the calculating the volumetrics further includes calculating a surface area of the lesion using exterior surfaces of the identified voxels.

11. The non-transitory computer-readable medium according to claim 10, wherein the calculating the volumetrics of the lesion includes utilizing only those voxels which have most enhancing kinetic curves.

12. The non-transitory computer-readable medium according to claim 8, wherein:
the data points are voxels which are spatially indexed,
the calculating the volumetrics of the lesion includes segmenting the lesion by identifying the voxels which constitute the lesion, and calculating a volume of the lesion by summing volumes of the identified voxels.

13. The non-transitory computer-readable medium according to claim 12, wherein the calculating the volumetrics further includes calculating a surface area of the lesion by summing exterior surfaces of the identified voxels.

14. The non-transitory computer-readable medium according to claim 1, the process further comprising:
displaying, together with the extracted kinetic features, an image representing the obtained medical data.

* * * * *